(12) United States Patent
Fitzgibbon

(10) Patent No.: US 10,652,743 B2
(45) Date of Patent: May 12, 2020

(54) SECURITY SYSTEM FOR A MOVEABLE BARRIER OPERATOR

(71) Applicant: The Chamberlain Group, Inc., Oak Brook, IL (US)

(72) Inventor: James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 16/226,066

(22) Filed: Dec. 19, 2018

(65) Prior Publication Data

US 2019/0200225 A1   Jun. 27, 2019

Related U.S. Application Data

(60) Provisional application No. 62/608,977, filed on Dec. 21, 2017.

(51) Int. Cl.
*H04W 12/06* (2009.01)
*H04L 29/06* (2006.01)
(Continued)

(52) U.S. Cl.
CPC ........ *H04W 12/06* (2013.01); *G07C 9/00309* (2013.01); *G07C 9/00896* (2013.01);
(Continued)

(58) Field of Classification Search
CPC ............... H04W 12/06; G07C 9/00309; G07C 9/00896; G07C 2009/00412; G07C 2009/00769; G07C 2009/00849; G07C 2009/00888; G07C 2009/00928; G07C 2009/00388; G07C 2009/00253; G07C 2009/0049; G07C 2009/00555; G08C 2201/41; G08C 2201/62; H04L 9/32; H04L 9/3226; H04L 9/3228; H04L 9/3273;
(Continued)

(56) References Cited

U.S. PATENT DOCUMENTS 29,525 A   8/1860   Sherman
30,957 A   12/1860  Campbell
(Continued)

FOREIGN PATENT DOCUMENTS

AU   645228   2/1992
AU   710682   11/1996
(Continued)

OTHER PUBLICATIONS

Secure Terminal Interface Module for Smart Card Application, pp. 1488-1489, IBM: Technical Disclosure Bulletin, vol. 28, No. 4, (Sep. 1985).
(Continued)

*Primary Examiner* — Edwin C Holloway, III
(74) *Attorney, Agent, or Firm* — Fitch, Even, Tabin & Flannery LLP

(57) ABSTRACT

Electronic systems are provided for secure actuation of a remote device such as a moveable barrier operator. The systems address the "man in the middle" problem of persons intercepting and duplicating radio frequency signals from a control device by introducing timing parameters into a bidirectional communication sequence between at least two devices.

35 Claims, 26 Drawing Sheets

(51) Int. Cl.
  *G07C 9/00* (2020.01)
  *H04L 9/32* (2006.01)
  *H04L 12/28* (2006.01)

(52) U.S. Cl.
  CPC .............. *H04L 9/32* (2013.01); *H04L 9/3226* (2013.01); *H04L 9/3228* (2013.01); *H04L 9/3273* (2013.01); *H04L 63/0428* (2013.01); *H04L 63/0853* (2013.01); *G07C 2009/00412* (2013.01); *G07C 2009/00769* (2013.01); *G07C 2009/00849* (2013.01); *G07C 2009/00888* (2013.01); *G07C 2009/00928* (2013.01); *G08C 2201/41* (2013.01); *G08C 2201/62* (2013.01); *H04L 63/08* (2013.01); *H04L 2012/2841* (2013.01)

(58) Field of Classification Search
  CPC . H04L 63/0428; H04L 63/0853; H04L 63/08; H04L 2012/2841
  USPC .................................................. 340/5.7, 5.71
  See application file for complete search history.

(56) References Cited

U.S. PATENT DOCUMENTS

| | | |
|---|---|---|
| 35,364 A | 5/1862 | Cox |
| 2,405,500 A | 8/1946 | Gustav |
| 3,716,865 A | 2/1973 | Willmott |
| 3,735,106 A | 5/1973 | Hollaway |
| 3,792,446 A | 2/1974 | Mc |
| 3,798,359 A | 3/1974 | Feistel |
| 3,798,360 A | 3/1974 | Feistel |
| 3,798,544 A | 3/1974 | Norman |
| 3,798,605 A | 3/1974 | Feistel |
| 3,845,277 A | 10/1974 | Spetz |
| 3,890,601 A | 6/1975 | Pietrolewicz |
| 3,906,348 A | 9/1975 | Vvillmott |
| 3,938,091 A | 2/1976 | Atalla |
| 4,037,201 A | 7/1977 | Willmott |
| 4,064,404 A | 12/1977 | Willmott |
| RE29,525 E | 1/1978 | Willmott |
| 4,078,152 A | 3/1978 | Tuckerman |
| 4,097,859 A | 6/1978 | Looschen |
| 4,138,735 A | 2/1979 | Allocca |
| 4,178,549 A | 12/1979 | Ledenbach |
| 4,195,196 A | 3/1980 | Feistel |
| 4,195,200 A | 3/1980 | Feistel |
| 4,196,310 A | 4/1980 | Forman |
| 4,218,738 A | 8/1980 | Matyas |
| 4,243,976 A | 1/1981 | Warner |
| 4,255,742 A | 3/1981 | Gable |
| 4,304,962 A | 12/1981 | Fracassi |
| 4,305,060 A | 12/1981 | Apple |
| 4,316,055 A | 2/1982 | Feistel |
| 4,326,098 A | 4/1982 | Bouricius |
| 4,327,444 A | 4/1982 | Court |
| 4,328,414 A | 5/1982 | Atalla |
| 4,328,540 A | 5/1982 | Matsuoka |
| RE30,957 E | 6/1982 | Feistel |
| 4,380,762 A | 4/1983 | Capasso |
| 4,385,296 A | 5/1983 | Tsubaki |
| 4,387,455 A | 6/1983 | Schwartz |
| 4,387,460 A | 6/1983 | Boutmy |
| 4,393,269 A | 7/1983 | Konheim |
| 4,418,333 A | 11/1983 | Schwarzbach |
| 4,426,637 A | 1/1984 | Apple |
| 4,445,712 A | 5/1984 | Smagala-Romanoff |
| 4,447,890 A | 5/1984 | Duwel |
| 4,454,509 A | 6/1984 | Buennagel |
| 4,464,651 A | 8/1984 | Duhame |
| 4,468,787 A | 8/1984 | Keiper |
| 4,471,493 A | 9/1984 | Schober |
| 4,471,593 A | 9/1984 | Ragland |
| 4,491,774 A | 1/1985 | Schmitz |
| 4,509,093 A | 4/1985 | Stellberger |
| 4,529,980 A | 7/1985 | Liotine |
| 4,535,333 A | 8/1985 | Twardowski |
| 4,566,044 A | 1/1986 | Langdon |
| 4,574,247 A | 3/1986 | Jacob |
| 4,578,530 A | 3/1986 | Zeidler |
| 4,580,111 A | 4/1986 | Swanson |
| 4,581,606 A | 4/1986 | Mallory |
| 4,590,470 A | 5/1986 | Koenig |
| 4,593,155 A | 6/1986 | Hawkins |
| 4,596,898 A | 6/1986 | Pemmaraju |
| 4,596,985 A | 6/1986 | Bongard |
| 4,599,489 A | 7/1986 | Cargile |
| 4,602,357 A | 7/1986 | Yang |
| 4,611,198 A | 9/1986 | Levinson |
| 4,623,887 A | 11/1986 | Welles |
| 4,626,848 A | 12/1986 | Ehlers |
| 4,628,315 A | 12/1986 | Douglas |
| 4,630,035 A | 12/1986 | Stahl |
| 4,633,247 A | 12/1986 | Hegeler |
| 4,638,433 A | 1/1987 | Schindler |
| 4,646,080 A | 2/1987 | Genest |
| 4,652,860 A | 3/1987 | Weishaupt |
| 4,653,076 A | 3/1987 | Jerrim |
| 4,670,746 A | 6/1987 | Taniguchi |
| 4,677,284 A | 6/1987 | Genest |
| 4,686,529 A | 8/1987 | Kleefeldt |
| 4,695,839 A | 9/1987 | Barbu |
| 4,703,359 A | 10/1987 | Rumbolt |
| 4,710,613 A | 12/1987 | Shigenaga |
| 4,716,301 A | 12/1987 | Willmott |
| 4,720,860 A | 1/1988 | Weiss |
| 4,723,121 A | 2/1988 | Van |
| 4,731,575 A | 3/1988 | Sloan |
| 4,737,770 A | 4/1988 | Brunius |
| 4,740,792 A | 4/1988 | Sagey |
| 4,750,118 A | 6/1988 | Heitschel |
| 4,754,255 A | 6/1988 | Sanders |
| 4,755,792 A | 7/1988 | Pezzolo |
| 4,758,835 A | 7/1988 | Rathmann |
| 4,761,808 A | 8/1988 | Howard |
| 4,779,090 A | 10/1988 | Micznik |
| 4,794,268 A | 12/1988 | Nakano |
| 4,794,622 A | 12/1988 | Isaacman |
| 4,796,181 A | 1/1989 | Wiedemer |
| 4,799,061 A | 1/1989 | Abraham |
| 4,800,590 A | 1/1989 | Vaughan |
| 4,802,114 A | 1/1989 | Sogame |
| 4,804,938 A | 2/1989 | Rouse |
| 4,807,052 A | 2/1989 | Amano |
| 4,808,995 A | 2/1989 | Clark |
| 4,825,200 A | 4/1989 | Evans |
| 4,825,210 A | 4/1989 | Bachhuber |
| 4,829,296 A | 5/1989 | Clark |
| 4,831,509 A | 5/1989 | Jones |
| 4,835,407 A | 5/1989 | Kataoka |
| 4,845,491 A | 7/1989 | Fascenda |
| 4,847,614 A | 7/1989 | Keller |
| 4,850,046 A | 7/1989 | Philippe |
| 4,855,713 A | 8/1989 | Brunius |
| 4,856,062 A | 8/1989 | Weiss |
| 4,856,081 A | 8/1989 | Smith |
| 4,859,990 A | 8/1989 | Isaacman |
| 4,870,400 A | 9/1989 | Downs |
| 4,878,052 A | 10/1989 | Schulze |
| 4,881,148 A | 11/1989 | Lambropoulos |
| 4,885,778 A | 12/1989 | Weiss |
| 4,888,575 A | 12/1989 | De Vaulx |
| 4,890,108 A | 12/1989 | Drori |
| 4,893,338 A | 1/1990 | Pastor |
| 4,905,279 A | 2/1990 | Nishio |
| 4,910,750 A | 3/1990 | Fisher |
| 4,912,463 A | 3/1990 | Li |
| 4,914,696 A | 4/1990 | Dudczak |
| 4,918,690 A | 4/1990 | Markkula |
| 4,922,168 A | 5/1990 | Waggamon |
| 4,922,533 A | 5/1990 | Philippe |
| 4,928,098 A | 5/1990 | Dannhaeuser |
| 4,931,789 A | 6/1990 | Pinnow |

(56) References Cited

U.S. PATENT DOCUMENTS

| | | | |
|---|---|---|---|
| 4,939,792 A | 7/1990 | Urbish |
| 4,942,393 A | 7/1990 | Waraksa |
| 4,951,029 A | 8/1990 | Severson |
| 4,963,876 A | 10/1990 | Sanders |
| 4,979,832 A | 12/1990 | Ritter |
| 4,980,913 A | 12/1990 | Skret |
| 4,988,990 A | 1/1991 | Warrior |
| 4,988,992 A | 1/1991 | Heitschel |
| 4,992,783 A | 2/1991 | Zdunek |
| 4,999,622 A | 3/1991 | Amano |
| 5,001,332 A | 3/1991 | Schrenk |
| 5,021,776 A | 6/1991 | Anderson |
| 5,023,908 A | 6/1991 | Weiss |
| 5,049,867 A | 9/1991 | Stouffer |
| 5,055,701 A | 10/1991 | Takeuchi |
| 5,058,161 A | 10/1991 | Weiss |
| 5,060,263 A | 10/1991 | Bosen |
| 5,091,942 A | 2/1992 | Dent |
| 5,103,221 A | 4/1992 | Memmola |
| 5,107,258 A | 4/1992 | Soum |
| 5,126,959 A | 6/1992 | Kurihara |
| 5,136,548 A | 8/1992 | Claar |
| 5,144,667 A | 9/1992 | Pogue |
| 5,146,067 A | 9/1992 | Sloan |
| 5,148,159 A | 9/1992 | Clark |
| 5,150,464 A | 9/1992 | Sidhu |
| 5,153,581 A | 10/1992 | Hazard |
| 5,159,329 A | 10/1992 | Lindmayer |
| 5,168,520 A | 12/1992 | Weiss |
| 5,193,210 A | 3/1993 | Nicholas |
| 5,197,061 A | 3/1993 | Halbert-Lassalle |
| 5,224,163 A | 6/1993 | Gasser |
| 5,237,614 A | 8/1993 | Weiss |
| 5,252,960 A | 10/1993 | Duhame |
| 5,278,907 A | 1/1994 | Snyder |
| 5,280,527 A | 1/1994 | Gullman |
| 5,331,325 A | 7/1994 | Miller |
| 5,361,062 A | 11/1994 | Weiss |
| 5,363,448 A | 11/1994 | Koopman |
| 5,365,225 A | 11/1994 | Bachhuber |
| 5,367,572 A | 11/1994 | Weiss |
| 5,369,706 A | 11/1994 | Latka |
| 5,412,379 A | 5/1995 | Waraksa |
| 5,414,418 A | 5/1995 | Andros |
| 5,420,925 A | 5/1995 | Michaels |
| 5,442,340 A | 8/1995 | Dykema |
| 5,442,341 A | 8/1995 | Lambropoulos |
| 5,444,737 A | 8/1995 | Cripps |
| 5,463,376 A | 10/1995 | Stoffer |
| 5,471,668 A | 11/1995 | Soenen |
| 5,473,318 A | 12/1995 | Martel |
| 5,479,512 A | 12/1995 | Weiss |
| 5,485,519 A | 1/1996 | Weiss |
| 5,517,187 A | 5/1996 | Bruwer |
| 5,528,621 A | 6/1996 | Heiman |
| 5,530,697 A | 6/1996 | Watanabe |
| 5,554,977 A | 9/1996 | Jablonski |
| RE35,364 E | 10/1996 | Heitschel |
| 5,563,600 A | 10/1996 | Miyake |
| 5,565,812 A | 10/1996 | Soenen |
| 5,566,359 A | 10/1996 | Corrigan |
| 5,576,701 A | 11/1996 | Heitschel |
| 5,578,999 A | 11/1996 | Matsuzawa |
| 5,594,429 A | 1/1997 | Nakahara |
| 5,598,475 A | 1/1997 | Soenen |
| 5,600,653 A | 2/1997 | Chitre |
| 5,608,723 A | 3/1997 | Felsenstein |
| 5,635,913 A | 6/1997 | Willmott |
| 5,657,388 A | 8/1997 | Weiss |
| 5,673,017 A | 9/1997 | Dery |
| 5,678,213 A | 10/1997 | Myer |
| 5,680,131 A | 10/1997 | Utz |
| 5,686,904 A | 11/1997 | Bruwer |
| 5,699,065 A | 12/1997 | Murray |
| 5,719,619 A | 2/1998 | Hattori et al. |
| 5,745,068 A | 4/1998 | Takahashi |
| 5,774,065 A | 6/1998 | Mabuchi |
| 5,778,348 A | 7/1998 | Manduley |
| 5,838,747 A | 11/1998 | Matsumoto |
| 5,872,519 A | 2/1999 | Issa |
| 5,898,397 A | 4/1999 | Murray |
| 5,923,758 A | 7/1999 | Khamharn |
| 5,936,999 A | 8/1999 | Keskitalo |
| 5,937,065 A * | 8/1999 | Simon ................. B60R 25/24 |
| | | | 380/262 |
| 5,942,985 A | 8/1999 | Chin |
| 5,949,349 A | 9/1999 | Farris |
| 6,012,144 A | 1/2000 | Pickett |
| 6,049,289 A | 4/2000 | Waggamon |
| 6,052,408 A | 4/2000 | Trompower |
| 6,070,154 A | 5/2000 | Tavor |
| 6,094,575 A | 7/2000 | Anderson et al. |
| 6,154,544 A * | 11/2000 | Farris ................. G07C 9/00182 |
| | | | 340/5.26 |
| 6,157,719 A | 12/2000 | Wasilewski |
| 6,166,650 A | 12/2000 | Bruwer |
| 6,175,312 B1 | 1/2001 | Bruwer |
| 6,181,255 B1 | 1/2001 | Crimmins |
| 6,243,000 B1 | 6/2001 | Tsui |
| 6,275,519 B1 | 8/2001 | Hendrickson |
| 6,414,587 B1 | 7/2002 | Fitzgibbon |
| 6,414,986 B1 | 7/2002 | Usui |
| 6,456,726 B1 | 9/2002 | Yu |
| 6,463,538 B1 | 10/2002 | Elteto |
| 6,496,477 B1 | 12/2002 | Perkins |
| 6,535,544 B1 | 3/2003 | Partyka |
| 6,549,949 B1 | 4/2003 | Bowman-Amuah |
| 6,609,796 B2 | 8/2003 | Maki et al. |
| 6,640,244 B1 | 10/2003 | Bowman-Amuah |
| 6,688,518 B1 | 2/2004 | Valencia |
| 6,690,796 B1 | 2/2004 | Farris |
| 6,697,379 B1 | 2/2004 | Jacquet |
| 6,754,266 B2 | 6/2004 | Bahl |
| 6,810,123 B2 | 10/2004 | Farris |
| 6,829,357 B1 | 12/2004 | Alrabady |
| 6,842,106 B2 * | 1/2005 | Hughes ................. G06F 21/31 |
| | | | 340/10.1 |
| 6,850,910 B1 | 2/2005 | Yu |
| 6,930,983 B2 | 8/2005 | Perkins |
| 6,956,460 B2 | 10/2005 | Tsui |
| 6,963,561 B1 | 11/2005 | Lahat |
| 6,980,518 B1 | 12/2005 | Sun |
| 6,980,655 B2 | 12/2005 | Farris |
| 6,988,977 B2 | 2/2006 | Gregori |
| 6,998,977 B2 | 2/2006 | Gregori |
| 7,002,490 B2 | 2/2006 | Lablans |
| 7,039,397 B2 | 5/2006 | Chuey |
| 7,039,809 B1 | 5/2006 | Wankmueller |
| 7,042,363 B2 | 5/2006 | Katrak |
| 7,050,479 B1 | 5/2006 | Kim |
| 7,050,794 B2 | 5/2006 | Chuey et al. |
| 7,057,494 B2 | 6/2006 | Fitzgibbon |
| 7,057,547 B2 | 6/2006 | Olmsted |
| 7,068,181 B2 | 6/2006 | Chuey |
| 7,071,850 B1 | 7/2006 | Fitzgibbon |
| 7,088,218 B2 | 8/2006 | Chuey |
| 7,088,706 B2 | 8/2006 | Zhang et al. |
| 7,139,398 B2 | 11/2006 | Candelore |
| 7,161,466 B2 | 1/2007 | Chuey |
| 7,298,721 B2 | 11/2007 | Atarashi et al. |
| 7,301,900 B1 | 11/2007 | Laksono |
| 7,332,999 B2 | 2/2008 | Fitzgibbon |
| 7,333,615 B1 | 2/2008 | Jarboe |
| 7,336,787 B2 | 2/2008 | Unger |
| 7,346,163 B2 | 3/2008 | Pedlow |
| 7,353,499 B2 | 4/2008 | De Jong |
| 7,406,553 B2 | 7/2008 | Edirisooriya et al. |
| 7,412,056 B2 | 8/2008 | Farris |
| 7,415,618 B2 | 8/2008 | De Jong |
| 7,429,898 B2 | 9/2008 | Akiyama |
| 7,447,498 B2 | 11/2008 | Chuey et al. |
| 7,489,922 B2 | 2/2009 | Chuey |
| 7,492,898 B2 | 2/2009 | Farris et al. |
| 7,492,905 B2 | 2/2009 | Fitzgibbon |

(56) References Cited

U.S. PATENT DOCUMENTS

| | | |
|---|---|---|
| 7,516,325 B2 | 4/2009 | Willey |
| 7,535,926 B1 | 5/2009 | Deshpande |
| 7,545,942 B2 | 6/2009 | Cohen et al. |
| 7,548,153 B2 | 6/2009 | Gravelle et al. |
| 7,561,075 B2 | 7/2009 | Fitzgibbon |
| 7,564,827 B2 | 7/2009 | Das et al. |
| 7,598,855 B2 | 10/2009 | Scalisi et al. |
| 7,623,663 B2 | 11/2009 | Farris |
| 7,668,125 B2 | 2/2010 | Kadous |
| 7,741,951 B2 | 6/2010 | Fitzgibbon |
| 7,742,501 B2 | 6/2010 | Williams |
| 7,757,021 B2 | 7/2010 | Wenzel |
| 7,764,613 B2 | 7/2010 | Miyake et al. |
| 7,786,843 B2 | 8/2010 | Witkowski |
| 7,812,739 B2 | 10/2010 | Chuey |
| 7,839,851 B2 | 11/2010 | Kozat |
| 7,855,633 B2 | 12/2010 | Chuey |
| 7,999,656 B2 | 8/2011 | Fisher |
| 8,014,377 B2 | 9/2011 | Zhang et al. |
| 8,130,079 B2 | 3/2012 | McQuaide, Jr. et al. |
| 8,194,856 B2 | 6/2012 | Farris |
| 8,207,818 B2 | 6/2012 | Keller, Jr. |
| 8,209,550 B2 | 6/2012 | Gehrmann |
| 8,225,094 B2 | 7/2012 | Willey |
| 8,233,625 B2 | 7/2012 | Farris |
| 8,266,442 B2 | 9/2012 | Burke |
| 8,276,185 B2 | 9/2012 | Messina et al. |
| 8,284,021 B2 | 10/2012 | Farris et al. |
| 8,290,465 B2 | 10/2012 | Ryu et al. |
| 8,416,054 B2 | 4/2013 | Fitzgibbon |
| 8,422,667 B2 | 4/2013 | Fitzgibbon |
| 8,452,267 B2 | 5/2013 | Friman |
| 8,463,540 B2 | 6/2013 | Hannah et al. |
| 8,536,977 B2 | 9/2013 | Fitzgibbon |
| 8,544,523 B2 | 10/2013 | Mays |
| 8,581,695 B2 | 11/2013 | Carlson et al. |
| 8,615,562 B1 | 12/2013 | Huang et al. |
| 8,633,797 B2 | 1/2014 | Farris et al. |
| 8,634,777 B2 | 1/2014 | Ekbatani et al. |
| 8,645,708 B2 | 2/2014 | Labaton |
| 8,661,256 B2 | 2/2014 | Willey |
| 8,699,704 B2 | 4/2014 | Liu et al. |
| 8,760,267 B2 | 6/2014 | Bos et al. |
| 8,787,823 B2 | 7/2014 | Justice et al. |
| 8,830,925 B2 | 9/2014 | Kim et al. |
| 8,836,469 B2 | 9/2014 | Fitzgibbon et al. |
| 9,082,293 B2 | 7/2015 | Wellman et al. |
| 9,124,424 B2 | 9/2015 | Aldis |
| 9,142,064 B2 | 9/2015 | Muetzel et al. |
| 9,160,408 B2 | 10/2015 | Krohne et al. |
| 9,280,704 B2 | 3/2016 | Lei et al. |
| 9,317,983 B2 | 4/2016 | Ricci |
| 9,336,637 B2 | 5/2016 | Neil et al. |
| 9,396,376 B1 | 7/2016 | Narayanaswami |
| 9,413,453 B2 | 8/2016 | Sugitani et al. |
| 9,418,326 B1 | 8/2016 | Narayanaswami |
| 2001/0023483 A1 | 9/2001 | Kiyomoto |
| 2002/0034303 A1 | 3/2002 | Farris |
| 2002/0184504 A1 | 12/2002 | Hughes |
| 2002/0191785 A1 | 12/2002 | McBrearty |
| 2002/0191794 A1 | 12/2002 | Farris |
| 2003/0033540 A1* | 2/2003 | Fitzgibbon ......... G07C 9/00309 726/1 |
| 2003/0056001 A1 | 3/2003 | Mate |
| 2003/0070092 A1 | 4/2003 | Hawkes |
| 2003/0072445 A1 | 4/2003 | Kuhlman |
| 2003/0147536 A1 | 8/2003 | Andivahis |
| 2003/0177237 A1 | 9/2003 | Stebbings |
| 2003/0191949 A1 | 10/2003 | Odagawa |
| 2003/0227370 A1 | 12/2003 | Brookbank |
| 2004/0019783 A1 | 1/2004 | Hawkes |
| 2004/0081075 A1 | 4/2004 | Tsukakoshi |
| 2004/0174856 A1 | 9/2004 | Brouet |
| 2004/0179485 A1 | 9/2004 | Terrier |
| 2004/0181569 A1 | 9/2004 | Attar |
| 2005/0053022 A1 | 3/2005 | Zettwoch |
| 2005/0058153 A1 | 3/2005 | Santhoff |
| 2005/0101314 A1 | 5/2005 | Levi |
| 2005/0174242 A1 | 8/2005 | Cohen |
| 2005/0285719 A1 | 12/2005 | Stephens |
| 2006/0083187 A1 | 4/2006 | Dekel |
| 2006/0109978 A1 | 5/2006 | Farris |
| 2006/0176171 A1 | 8/2006 | Fitzgibbon |
| 2007/0005806 A1 | 1/2007 | Fitzgibbon |
| 2007/0006319 A1 | 1/2007 | Fitzgibbon |
| 2007/0018861 A1 | 1/2007 | Fitzgibbon |
| 2007/0058811 A1 | 3/2007 | Fitzgibbon |
| 2007/0245147 A1 | 10/2007 | Okeya |
| 2008/0229400 A1 | 9/2008 | Burke |
| 2008/0297370 A1 | 12/2008 | Farris |
| 2009/0016530 A1 | 1/2009 | Farris |
| 2009/0021348 A1 | 1/2009 | Farris |
| 2009/0096621 A1 | 4/2009 | Ferlitsch |
| 2009/0176451 A1 | 7/2009 | Yang et al. |
| 2009/0315672 A1 | 12/2009 | Nantz et al. |
| 2010/0060413 A1 | 3/2010 | Fitzgibbon et al. |
| 2010/0112979 A1 | 5/2010 | Chen et al. |
| 2010/0125509 A1 | 5/2010 | Kranzley et al. |
| 2010/0125516 A1 | 5/2010 | Wankmueller et al. |
| 2010/0199092 A1 | 8/2010 | Andrus et al. |
| 2010/0211779 A1 | 8/2010 | Sundaram |
| 2011/0051927 A1 | 3/2011 | Murray et al. |
| 2011/0205014 A1* | 8/2011 | Fitzgibbon ......... G07C 9/00857 340/5.6 |
| 2011/0296185 A1 | 12/2011 | Kamarthy et al. |
| 2011/0316668 A1 | 12/2011 | Laird |
| 2011/0316688 A1 | 12/2011 | Ranjan |
| 2011/0317835 A1 | 12/2011 | Laird |
| 2011/0320803 A1 | 12/2011 | Hampel et al. |
| 2012/0054493 A1 | 3/2012 | Bradley |
| 2012/0297681 A1 | 11/2012 | Krupke et al. |
| 2013/0170639 A1 | 7/2013 | Fitzgibbon |
| 2013/0268333 A1 | 10/2013 | Ovick et al. |
| 2013/0272520 A1 | 10/2013 | Noda et al. |
| 2014/0169247 A1 | 6/2014 | Jafarian et al. |
| 2014/0289528 A1 | 9/2014 | Baghdasaryan |
| 2015/0222517 A1 | 8/2015 | McLaughlin et al. |
| 2015/0358814 A1 | 12/2015 | Roberts |
| 2016/0198391 A1 | 7/2016 | Orthmann et al. |
| 2016/0261572 A1 | 9/2016 | Liu et al. |

FOREIGN PATENT DOCUMENTS

| | | |
|---|---|---|
| AU | 2006200340 | 8/2006 |
| AU | 2007203558 B2 | 2/2008 |
| AU | 2008202369 A1 | 1/2009 |
| AU | 2011202656 A1 | 1/2012 |
| AU | 2011218848 A1 | 9/2012 |
| CA | 2087722 C | 7/1998 |
| CA | 2193846 C | 2/2004 |
| CA | 2177410 C | 4/2008 |
| CA | 2443452 C | 7/2008 |
| CA | 2684658 A1 | 10/2008 |
| CA | 2708000 A1 | 12/2010 |
| CA | 2456680 C | 2/2011 |
| CA | 2742018 A1 | 12/2011 |
| CA | 2565505 C | 9/2012 |
| CA | 2631076 C | 9/2013 |
| CA | 2790940 C | 6/2014 |
| CA | 2596188 C | 7/2016 |
| CN | 101399825 A | 4/2009 |
| DE | 3234538 A1 | 3/1984 |
| DE | 3234539 A1 | 3/1984 |
| DE | 3244049 A1 | 9/1984 |
| DE | 3309802 A1 | 9/1984 |
| DE | 3309802 C2 | 9/1984 |
| DE | 3320721 | 12/1984 |
| DE | 3332721 A1 | 3/1985 |
| DE | 3407436 A1 | 8/1985 |
| DE | 3407469 A1 | 9/1985 |
| DE | 3532156 A1 | 3/1987 |
| DE | 3636822 C1 | 10/1987 |
| DE | 4204463 | 8/1992 |
| EP | 0043270 A1 | 1/1982 |

(56) References Cited

FOREIGN PATENT DOCUMENTS

| | | |
|---|---|---|
| EP | 0103790 A2 | 3/1984 |
| EP | 0154019 A1 | 9/1985 |
| EP | 0155378 A1 | 9/1985 |
| EP | 0244322 | 11/1987 |
| EP | 0244332 B1 | 11/1987 |
| EP | 0311112 A2 | 4/1989 |
| EP | 0335912 | 10/1989 |
| EP | 0372285 | 6/1990 |
| EP | 0265935 B1 | 5/1991 |
| EP | 0459781 | 12/1991 |
| EP | 0857842 | 8/1998 |
| EP | 0870889 | 10/1998 |
| EP | 0937845 A1 | 8/1999 |
| EP | 1024626 A1 | 8/2000 |
| EP | 1223700 | 7/2002 |
| EP | 1313260 | 5/2003 |
| EP | 1421728 A1 | 5/2004 |
| EP | 1625560 A1 | 2/2006 |
| EP | 1760985 A2 | 3/2007 |
| EP | 0771498 B1 | 5/2007 |
| EP | 1865656 A1 | 12/2007 |
| EP | 2293478 A2 | 3/2011 |
| EP | 2149103 B1 | 12/2011 |
| EP | 2437212 A1 | 4/2012 |
| EP | 1875333 B1 | 1/2013 |
| EP | 2290872 B1 | 6/2014 |
| EP | 2800403 A1 | 11/2014 |
| FR | 2606232 | 5/1988 |
| FR | 2607544 | 6/1988 |
| FR | 2685520 | 6/1993 |
| FR | 2737373 | 1/1997 |
| GB | 218774 | 7/1924 |
| GB | 1156279 | 6/1969 |
| GB | 2023899 | 1/1980 |
| GB | 2051442 | 1/1981 |
| GB | 2099195 | 12/1982 |
| GB | 2118614 | 11/1983 |
| GB | 2131992 | 6/1984 |
| GB | 2133073 | 7/1984 |
| GB | 2184774 | 7/1987 |
| GB | 2254461 | 10/1992 |
| GB | 2265482 | 9/1993 |
| GB | 2288261 | 10/1995 |
| GB | 2430115 | 3/2007 |
| GB | 2440816 | 2/2008 |
| GB | 2453383 A | 4/2009 |
| JP | H6205474 | 7/1994 |
| JP | 09322274 | 12/1997 |
| WO | 9300137 | 1/1993 |
| WO | 9301140 | 1/1993 |
| WO | 9320538 | 10/1993 |
| WO | 9400147 | 1/1994 |
| WO | 9411829 | 5/1994 |
| WO | 9418036 | 8/1994 |
| WO | 0010301 | 2/2000 |
| WO | 0010302 | 2/2000 |
| WO | 03010656 | 2/2003 |
| WO | 03079607 A1 | 9/2003 |
| WO | 2011106199 | 9/2011 |
| WO | 2019126453 | 6/2019 |
| ZA | 8908225 | 10/1991 |

OTHER PUBLICATIONS

Shamir, Adi. 'Embedding Cryptographic Trapdoors in Arbitrary Knapsack Systems', pp. 77-79, Information Processing Letters, 1983.
Siegenthaler, T. Decrypting a Class of Stream Ciphers Using Ciphertext Only, pp. 81-85, IEEE Transactions on Computers, vol. C-34, No. 1, (Jan. 1985).
Simmons, Gustavus, J. Message Authentication with Arbitration of Transmitter/Receiver Disputes, pp. 151-165 (1987).
Smith, J.L., et al. An Experimental Application of Crptography to a Remotely Accessed Data System, pp. 282-297, Proceedings of hte ACM, (Aug. 1972).
Smith, Jack, 'Modem Communication Circuits.' McGraw-Hill Book Company, 1986, Chapter 11, pp. 420-454.
Smith, Jack, 'Modem Communication Circuits' McGraw-Hill Book Company, 1986, Chapter 7, pp. 231-294.
Smith. J.L. The Design of Lucifer: a Cryptographic Device for Data Communications, pp. 1-65, (Apr. 15, 1971).
Soete, M. Some constructions for authentication—secrecy codes, Advances in Cryptology—Eurocrypt '88, Lecture Notes in Computer Science 303 (1988), 57-75.
Steven Dawson, Keeloq.RTM. Code Hopping Decoder Using Secure Learn, AN662, 1997 Microchip Technology, Inc., 1-16.
Svigals, J. Limiting Access to Data in an Indentification Card Having a Micro-Processor, pp. 580-581, IBM: Technical Disclosre Bulletin, vol. 27, No. 1B, (Jun. 1984).
Thatcham: The Motor Insurance Repair Research Centre, The British Insurance Industry's Criteria for Vehicle Security (Jan. 1993) (Lear 18968-19027), pp. 1-36.
Transaction Completion Code Based on Digital Signatures, pp. 1109-1122, IBM: Technical Disclosure Bulletin, vol. 28, No. 3, (Aug. 1985).
Turn, Rein. Privacy Transformations for Databank Systems, pp. 589-601, National Computer Conference, (1973).
U.S. District Court, Northern District of Illinois, Eastern Division, Civil Action No. 05-C-3449, Declaration of Robert Louis Stevenson, Jr., Jun. 26, 2009.
U.S. District Court, Northern District of Illinois, Eastern Division, Civil Action No. 05-C-3449, JCI's Local Rule 56.1 Statement of Undisputed Facts in Support of Their Motion for Summary Judgment of Infringement of the '056 Patent; Jul. 6, 2009.
U.S. District Court, Northern District of Illinois, Eastern Division, Civil Action No. 05-C-3449, JCI's Local Rule 56.1 Statement of Undisputed Facts in Support of Their Motion for Summary Judgment of Infringement of the '544 Patent; Jul. 6, 2009.
U.S. District Court, Northern District of Illinois, Eastern Division, Civil Action No. 05-C-3449, JCI's Memorandum of Law in Support of its Motion for Summary Judgment of Infringement of the '056 Patent, Jul. 6, 2009.
U.S. District Court, Northern District of Illinois, Eastern Division, Civil Action No. 05-C-3449, JCI's Memorandum of Law in Support of its Motion for Summary Judgment of Infringement of the '544 Patent, Jul. 6, 2009.
U.S. District Court, Northern District of Illinois, Eastern Division, Civil Action No. 05-C-3449, Memorandum Opinion and Order, Nov. 24, 2010.
U.S. District Court, Northern District of Illinois, Eastern Division, Civil Action No. 05-CV-3449, Defendant Lear Corporation's Answer to Plaintiffs' Second Amended Complaint, Defenses, and Counterclaim; Sep. 8, 2008.
U.S. District Court, Northern District of Illinois, Eastern Division, Civil Action No. 05-CV-3449, Defendant Lear Corporation's Reply Memorandum in Support of Its Motion to Stay Effectiveness of Any Preliminary Injunction; Apr. 17, 2007.
U.S. District Court, Northern District of Illinois, Eastern Division, Civil Action No. 05-CV-3449, Lear Corporation Memorandum of Law in Support of Its Motion for Summary Judgment of U.S. Pat. No. 7,412,056; Dec. 8, 2008.
U.S. District Court, Northern District of Illinois, Eastern Division, Civil Action No. 05-CV-3449, Lear Corporation's Answer, Affirmative Defenses and Counterclaims to Plaintiffs' Amended Complaint; Oct. 24, 2005.
U.S. District Court, Northern District of Illinois, Eastern Division, Civil Action No. 05-CV-3449, Lear Corporation's Memorandum of Law in Support of Its Emergency Motion to Stay the Effectiveness of the Preliminary Injunction Memorandum Opinion and Order Entered Mar. 30, 2007.
U.S. District Court, Northern District of Illinois, Eastern Division, Civil Action No. 05-CV-3449, Lear Corporation's Memorandum of Law in Support of Its Motion for Summary Judgment, May 22, 2008.
U.S. District Court, Northern District of Illinois, Eastern Division, Civil Action No. 05-CV-3449, Lear Corporation's Motion for

(56) References Cited

OTHER PUBLICATIONS

Reconsideration of the Court's Sep. 11, 2006 Memorandum Opinion and Order Regarding Claim Construction.
U.S. District Court, Northern District of Illinois, Eastern Division, Civil Action No. 05-CV-3449, Lear Corporation's Post-Markman Brief.
U.S. District Court, Northern District of Illinois, Eastern Division, Civil Action No. 05-CV-3449, Memorandum Opinion and Order, Apr. 25, 2007.
U.S. District Court, Northern District of Illinois, Eastern Division, Civil Action No. 05-CV-3449, Memorandum Opinion and Order, Feb. 20, 2007.
U.S. District Court, Northern District of Illinois, Eastern Division, Civil Action No. 05-CV-3449, Memorandum Opinion and Order, Sep. 11, 2006.
U.S. District Court, Northern District of Illinois, Eastern Division, Civil Action No. 05-CV-3449, Memorandum Opinion and Order; Mar. 30, 2007.
U.S. District Court, Northern District of Illinois, Eastern Division, Civil Action No. 05-CV-3449, Notice of Motion and Motion for Leave to File Defendant Lear Corporation's Sur-Reply to Chamberlain's and JCI's Reply Memorandum in Support of Motion for Preliminary Injunction; Mar. 30, 2006.
U.S. District Court, Northern District of Illinois, Eastern Division, Civil Action No. 05-CV-3449, Plaintiffs' Opposition to Lear Corporation's Motion to Stay the Effectiveness of the Preliminary Injunction Memorandum Opinion and Order Entered Mar. 30, 2007.
U.S. District Court, Northern District of Illinois, Eastern Division, Civil Action No. 05-CV-3449, Plaintiffs' Response to Lear's Mar. 2, 2007 Supplemental Memorandum.
U.S. District Court, Northern District of Illinois, Eastern Division, Civil Action No. 05-CV-3449, Plaintiffs' Response to Lear's Motion for Reconsideration of the Court's Sep. 11, 2006 Ruling Regarding Claim Construction; Oct. 4, 2006.
U.S. District Court, Northern District of Illinois, Eastern Division, Civil Action No. 05-CV-3449, Plaintiffs' Surreply Memorandum in Opposition to Lear's Motion to Stay the Preliminary Injunction, Apr. 24, 2007.
U.S. District Court, Northern District of Illinois, Eastern Division, Civil Action No. 05-CV-3449, Plaintiffs' Surreply Memorandum in Support of Motion for Preliminary Injunction.
U.S. District Court, Northern District of Illinois, Eastern Division, Civil Action No. 05-CV-3449, Reply Brief in Support of Lear's Motion for Reconsideration of the Court's Sep. 11, 2006 Ruling Regarding Claim Construction.
U.S. District Court, Northern District of Illinois, Eastern Division, Civil Action No. 05-CV-3449, Supplemental Memorandum in Support of Defendant Lear Corporation's Opposition to Plaintiffs' Motion for Preliminary Injunction; Mar. 2, 2007.
U.S. District Court, Northern District of Illinois, Eastern Division, Civil Action No. 05-CV-3449, Transcript of Deposition of Bradford L. Farris, Jan. 12, 2006
U.S. District Court, Northern District of Illinois, Eastern Division, Civil Action No. 05-CV-3449, Transcript of Deposition of Hubert E Dunsmore, Jan. 12, 2006.
U.S. District Court, Northern District of Illinois, Eastern Division, Civil Action No. 05-CV-3449, Transcript of Proceedings Before the Honorable James B. Moran, May 31, 2005.
U.S. District Court, Northern District of Illinois, Eastern Division, Civil Action No. 05-CV-3449, Transcript of Proceedings Before the Honorable James B. Moran, May 31, 2006.
U.S. Office Action dated Mar. 21, 2011 from U.S. Appl. No. 11/172,525.
U.S. Appl. No. 14/857,633; Office Action dated Jul. 19, 2018, 22 pages.
United States Court of Appeals for the Federal Circuit, Appeal from the United States District Court for the Northern District of Illinois in Case No. 05-CV-3449, Brief of Defendant-Appellant Lear Corporation.
United States Court of Appeals for the Federal Circuit, Appeal from the United States District Court for the Northern District of Illinois in Case No. 05-CV-3449, Brief of the Chamberlain Group, Inc. and Johnson Controls Interiors LLC; Aug. 8, 2007.
United States Court of Appeals for the Federal Circuit, Appeal from the United States District Court for the Northern District of Illinois in Case No. 05-CV-3449, Combined Petition for Panel Rehearing and Rehearing En Banc of Chamberlain Group, Inc.and Johnson Controls Interiors LLC; Dated Mar. 19, 2008.
United States Court of Appeals for the Federal Circuit, Appeal from the United States District Court for the Northern District of Illinois in Case No. 05-CV-3449, Reply Brief of Defendant-Appellant Lear Corporation, Aug. 29, 2007.
Keeloq.RTM. NTQ 125D Code Hopping Decoder, pp. 1-9, Nanoteq (pty.) Ltd., (Jul. 1993).
Kent, Stephen T. A Comparison of Some Aspects of Public-Key and Conventional Cryptosystems, pp. 4.3.1-5, ICC '79 Int. Conf. on Communications, Boston, MA, (Jun. 1979).
Kent, Stephen T. Comments on 'Security Problems in the TCP/IP Protocol Suite', pp. 10-19, Computer Communication Review, vol. 19, Part 3, (Jul. 1989).
Kent, Stephen T. Encryption-Based Protection Protocols for Interactive User-Computer Communication, pp. 1-121, (May 1976). (See pp. 50-53).
Kent, Stephen T. Protocol Design Consideration for Network Security, pp. 239-259, Proc. NATO Advanced Study Institute on Interlinking of Computer Networks, (1979).
Kent, Stephen T. Security Requirements and Protocols for a Broadcast Scenario, pp. 778-786, IEEE Transactions on Communications, vol. com-29, No. 6, (Jun. 1981).
Kent, Stephen T., et al. Personal Authorization System for Access Control to the Defense Data Network, pp. 89-93, Conf. Record of Eascon 82 15.sup.th Ann Electronics & Aerospace Systems Conf., Washington, D.C. (Sep. 1982).
Konheim, A.G. Cryptography: A Primer, pp. 285-347, New York, (John Wiley, 1981).
Koren, Israel, "Computer Arithmetic Algorithms" Prentice Hall, 1978, pp. 1-15.
Kruh, Louis. Device anc Machines: The Hagelin Cryptographer, Type C-52, pp. 78-82, Cryptologia, vol. 3, No. 2, (Apr. 1979).
Kruh, Louis. How to Use the German Enigma Cipher Machine: A photographic Essay, pp. 291-296, Cryptologia, vol. No. 7, No. 4 (Oct. 1983).
Kuhn, G.J., et al. A Versatile High-Speed Encryption Chip, INFOSEC '90 Symposium, Pretoria, (Mar. 16, 1990).
Kuhn. G.J. Algorithms for Self-Synchronizing Ciphers, pp. 159-164, Comsig 88, University of Pretoria, Pretoria, (1988).
Lamport, Leslie. The Synchronization of Independent Processes, pp. 15-34, Acta Informatica, vol. 7, (1976).
Lear Corporation's Memorandum of Law in Support of Its Motion for Summary Judgment; May 22, 2008.
Linn, John and Kent, Stephen T. Electronic Mail Privacy Enhancement, pp. 40-43, American Institute of Aeronautics and Astronautics, Inc. (1986).
Lloyd, Sheelagh. Counting Functions Satisfying a Higher Order Strict Avalanche Criterion, pp. 63-74, (1990).
Marneweck, Kobus. Guidelines for KeeLoq.RTM. Secure Learning Implementation, TB007, pp. 1-5, 1987 Microchip Technology, Inc.
Massey, James L. The Difficulty with Difficulty, pp. 1-4, (Updated). http://www.iacr.org/conferences/ec96/massey/html/framemassey.html.
McIvor, Robert. Smart Cards, pp. 152-159, Scientific American, vol. 253, No. 5, (Nov. 1985).
Meier, Willi. Fast Correlations Attacks on Stream Ciphers (Extended Abstract), pp. 301-314, Eurocrypt 88, IEEE, (1988).
Meyer, Carl H. and Matyas Stephen H. Cryptography: A New Dimension in Computer Data Security, pp. 237-249 (1982).
Michener, J.R. The Generalized Rotor Cryptographic Operator and Some of Its Applications, pp. 97-113, Cryptologia, vol. 9, No, 2, (Apr. 1985).
Microchip Technology, Inc., Enhanced Flash Microcontrollers with 10-Bit A/D and nano Watt Technology, PIC18F2525/2620/4525/4620 Data Sheet, 28/40/44-Pin, .COPYRGT.2008.

(56) References Cited

OTHER PUBLICATIONS

*Microchip* v. *The Chamberlain Group, Inc.,* (TCG019794-019873); Deposition of J. Fitzgibbon; Partially redacted; Dated: Jan. 7, 1999.
*Microchip* v. *The Chamberlain Group, Inc.,* (TCG019874-019918); Deposition of J. Fitzgibbon; Dated: Mar. 16, 1999.
*Microchip* v. *The Chamberlain Group, Inc.,* Civil Action No. 98-C-6138; (TCG024334-24357); Declaration of V. Thomas Rhyne; Dated: Feb. 22, 1999.
MM57HS01 HiSeC.TM. Fixed and Rolling Code Decoder, National Semiconductor, Nov. 11, 1994, 1-8.
Morris, Robert. The Hagelin Cipher Machine (M-209): Reconstruction of the Internal Settings, pp. 267-289, Cryptologia, 2(3), (Jul. 1978).
Newman, David B., Jr., et al. 'Public Key Management for Network Security', pp. 11-16, IEE Network Magazine, 1987.
Nickels, Hamilton, 'Secrets of Making and Breading Codes' Paladin Press, 1990, pp. 11-29.
Niederreiter, Harald. Keystream Sequences with a Good Linear Complexity Profile for Every Starting Point, pp. 523-532, Proceedings of Eurocrypt 89, (1989).
NM95HSO1/NM95HSO2 HiSeC.TM. (High Security Code) Generator, pp. 1-19, National Semiconductor, (Jan. 1995).
Office Action from U.S. Appl. No. 11/172,525 dated Apr. 9, 2009.
Otway, Dave and Rees, Owen. Efficient and timely mutual authentication, ACM SIGOPS Operating Systems Review, vol. 21, Issue 1, Jan. 8-10, 1987.
PCT Patent Application No. PCT/US2018/066722; International Search Report and Written Opinion; Daed Apr. 1, 2019.
Peebles, Jr., Peyton Z. and Giuma, Tayeb A.; "Principles of Electrical Engineering" McGraw Hill, Inc., 1991, pp. 562-597.
Peyret, Patrice, et al. Smart Cards Provide Very High Security and Flexibility in Subscribers Management, pp. 744-752, IEE Transactions on Consumer Electronics, 36(3), (Aug. 1990).
Postel, J. ed. 'DOD Standard Transmission Control Protocol', pp. 52-133, Jan. 1980.
Postel, Jonathon B., et al. The ARPA Internet Protocol, pp. 261-271, (1981).
Reed, David P. and Kanodia, Rajendra K. Synchronization with Eventcounts and Sequencers, pp. 115-123, Communications of the ACM, vol. 22, No. 2, (Feb. 1979).
Reynolds, J. and Postel, J. Official ARPA-Internet Protocols, Network Working Groups, (Apr. 1985).
Roden, Martin S., "Analog and Digital Communication Systems," Third Edition, Prentice Hall, 1979, pp. 282-460.
Ruffell, J. Battery Low Indicator, p. 15-165, Eleckton Electronics, (Mar. 1989). (See p. 59).
Saab Anti-Theft System: 'Saab's Engine Immobilizing Anti-Theft System is a Road-Block for 'Code-Grabbing' Thieves', pp. 1-2, Aug. 1996; http://www.saabusa.com/news/newsindex/alarm.html.
Savage, J.E. Some Simple Self-Synchronizing Digital Data Scramblers, pp. 449-498, The Bell System Tech. Journal, (Feb. 1967).
Schedule of Condfidential Non-Patent Literature Documents; Apr. 1, 2008.
Search Report Under Section 17 From British Patent Application No. GB0601795.8; Date of Search: Apr. 22, 2009.
Search Report Under Section 17, Application No. GB0715089.9; Date of Search: Nov. 27, 2007.
Seberry, J. and Pieprzyk, Cryptography—An Introduction to Computer Security, Prentice Hall of Australia, YTY Ltd, 1989, pp. 134-136.
Davis, Gregory and Palmer, Morris. Self-Programming, Rolling-Code Technology Creates Nearly Unbreakable RF Security, Technological Horizons, Texas Instruments, Inc. (ECN), (Oct. 1996).
Deavours, C. A. and Reeds, James. The Enigma, Part 1, Historical Perspectives, pp. 381-391, Cryptologia, 1(4), (Oct. 1977).
Deavours, C.A. and Kruh, L. 'The Swedish HC-9 Ciphering Machine', 251-285, Cryptologia, 13(3): Jul. 1989.
Deavours, Cipher A., et al. 'Analysis of the Hebem cryptograph Using Isomorphs', pp. 246-261, Cryptology: Yesterday, Today and Tomorrow, vol. 1, No. 2, Apr. 1977.

Denning, Dorothy E. 'Cryptographic Techniques', pp. 135-154, Cryptography and Data Security, 1982. Chapter 3.
Denning, Dorothy E. A Lattice Model of Secure Information Flow, pp. 236-238, 240, 242, Communications of the ACM, vol. 19, No. 5, (May 1976).
Diffie and Hellman, Exhaustive Cryptanalysis of the NB.S Data Encryption Standard, pp. 74-84, Computer, Jun. 1977.
Diffie, Whitfield and Hellman, Martin E. New Directions in Cryptography, pp. 644-654, IEEE Transactions on Information Theory, vol. IT-22, No. 6, (Nov. 1976).
Diffie, Whitfield and Hellman, Martin E. Privacy and Authentication: An Introduction to Cryptography, pp. 397-427, Proceedings of the IEEE, vol. 67, No. 3 (Mar. 1979).
Diffie, Whitfield and Hellman, Martin, E. 'An RSA Laboratories Technical Note', Version 1A, Revised Nov. 1, 1993.
Dijkstra, E. W. Co-Operating Sequential Processses, pp. 43-112, Programming Languages, F. Genuys. NY, undated.
Dijkstra, E.W. 'Hierarchical Ordering of Sequential Processes', pp. 115-138, Acta Informatica 1: 115-138, 1971.
Documents Having Confidential Information Cited by Third Party as Relevant to the Subject Matter (Obtained from Notice Pursuant to 35 U.S.C. .sctn.282, Mar. 4, 2011(NPL22)).
ElGamal, Taher. A Public Key Cryptosystem and a Signature Scheme Based on Discrete Logarithms, pp. 469-472, IEEE, Transactions on Information Theory, vol. IT-31, No. 4, (Jul. 1985).
ElGamal, Taher. A Subexponential Time Algorithm for Computing Discrete Logarithms, pp. 473-481, IEEE, Transactions on Information Theory, vol. IT-31, No. 4, (Jul. 1985).
Examination Report Under Section 18(3) for GB0502236.3 dated May 23, 2005.
Examination Report Under Section 18(3) From British Patent Application No. GB0601795.8; Date of Search: Jan. 28, 2010.
Examination Report Under Section 18(3) From British Patent Application No. GB0601795.8; Date of Search: Sep. 25, 2009.
Examination Report Under Section 18(3) From British Patent Application No. GB0613068.6; Date of Search: Jan. 31, 2011.
Examination Report Under Section 18(3) from British Patent Application No. GB0715089.9 dated Apr. 11, 2011.
Examination Report Under Section 18(3) From British Patent Application No. GB0715089.9; Date of Search: Sep. 30, 2010.
Examination Report Under Section 18(3) From British Patent Application No. GB0920612.9; Date of Search: Jan. 28, 2010.
Feistel, Horst, Notz, Wm. A. and Smith, J. Lynn. Some Cryptographic Techniques for Machine-to-Machine Data Communications, pp. 1545-1554, Proceedings of the IEEE, vol. 63, No. 11, (Nov. 1975).
Feistel, Horst. 'Cryptography and Computer Privacy', pp. 15-23, Scientific American, vol. 228, No. 5, May 1973.
Fenzl, H. and Kliner, A. Electronic Lock System: Convenient and Safe, pp. 150-153, Siemens Components XXI, No. 4, (1987).
Fischer, Elliot. Uncaging the Hagelin Cryptograph, pp. 89-92, Cryptologia, vol. 7, No. 1, (Jan. 1983).
Fragano, Maurizio. Solid State Key/Lock Security System, pp. 604-607, IEEE Transactions on Consumer Electronics, vol. CE-30, No. 4, (Nov. 1984).
G. Davis, Marcstar.TM. TRC1300 and TRC1315 Remote Control Transmitter/Receiver, Texas Instruments, Sep. 12, 1994. 1-24.
German Patent Application No. 10 2006 003 808.3; Official Action dated May 16, 2018; 6 pages.
German Patent Application No. 10 2006 003 808.8; Official Action dated Feb. 14, 2019 (with translation of relevant parts); 6 pages.
German Patent Application No. 10 2006 003 808.8; Official Action dated Oct. 9, 2018 (with translation of relevant parts); 7 pages.
Godlewski, Ph. and Camion P. 'Manipulations and Errors, Delection and Localization,' pp. 97-106, Proceedings of Eurocrypt 88, 1988.
Gordon, Professor J., Police Scientific Development Branch, Designing Codes for Vehicle Remote Security Systems, (Oct. 1994), pp. 1-20.
Gordon, Professor J., Police Scientific Development Branch, Designing Rolling Codes for Vehicle Remote Security Systems, (Aug. 1993), pp. 1-19.

(56) References Cited

OTHER PUBLICATIONS

Greenlee, B.M., Requirements for Key Management Protocols in the Wholesale Financial Services Industry, pp. 22 28, IEEE Communications Magazine , Sep. 1985.
Guillou, Louis C. and Quisquater, Jean-Jacques. 'A Practical Zero-Knowledge Protocol Fitted to Security Microprocessor Minimizing Both Transmission and Memory', pp. 123-128, Advances in Cryptology-Eurocrypt 88, 1988.
Guillou, Louis C. Smart Cards and Conditional Access, pp. 481-489, Proceedings of Eurocrypt, (1984).
Habermann, A. Nico, Synchronization of Communicating Processes , pp. 171 176, Communications , Mar. 1972.
Hagelin C-35/C-36 (The), (1 page) Undated. http://hem.passagen.se/tan01/C035.HTML.
Haykin, Simon, "An Introduction to Analog and Digital Communications" 213, 215 (1989).
IEEE 100; The Authoritative Dictionary of IEEE Standards Terms, Seventh Ediciton, Published by Standards Information Network, IEEE Press, Copyright 2000.
International Search Report for PCT/US03/25308 dated Mar. 25, 2004.
ISO 8732: 1988(E): Banking Key Management (Wholesale) Annex D: Windows and Windows Management, Nov. 1988.
ITC Tutorial; Investigation No. 337-TA-417; (TCG024374-24434); Dated: Jul. 7, 1999.
Jones, Anita K. Protection Mechanisms and The Enforcement of Security Policies, pp. 228-251, Carnegie-Mellon University, Pittsburgh, PA, (1978).
Jueneman, R.R. et al. 'Message Authentication', pp. 29-40, IEEE Communications Magazine, vol. 23, No. 9, Sep. 1985.
Kahn, Robert E. The Organization of Computer Resources Into a Packet Radio Network, pp. 177-186, National Computer Conference, (1975).
Keeloq.RTM. Code Hopping Decoder, HCS500, 1997 Microchip Technology, Inc., 1-25.
Keeloq.RTM. Code Hopping Encoder, HCS300, 1996 Microchip Technology, Inc., 1-20.
Keeloq.RTM. NTQ 105 Code Hopping Encoder, pp. 1-8, Nanoteq (Pty.) Ltd., (Jul. 1993).
German Patent Application No. 10 2007 036 647.9; Official Communication dated Jul. 4, 2019, 4 pages.
USPTO; U.S. Appl. No. 14/861,633; Office Action dated Sep. 17, 2019; (pp. 1-25).
Shamir, Adi. Embedding cryptographic Trapdoors in Arbitrary Knapsak Systems, pp. 81-85, IEEE Transactions on Computers, vol. C-34, No. 1, (Jan. 1985).
'Access Transmitters-Access Security System', pp. 1-2, Undated. htpp://www.webercreations.com/access/security.htm.
Abrams, and Podell, 'Tutorial Computer and Network Security,' District of Columbia: IEEE, 1987. pp. 1075-1081.
Abramson, Norman. 'The Aloha System—Another alternative for computer communications,' pp. 281-285, University of Hawaii, 1970.
Adams, Russ, Classified, data-scrambling program for Apple II, Info-World, vol. 5, No. 3; Jan. 31, 1988.
Alexi, Werner, et al. 'RSA and Rabin Functions: Certain Parts Are As Hard As the Whole', pp. 194-209, Siam Computing, vol. 14, No. 2, Apr. 1988.
Allianz: Allianz-Zentrum for Technik GmbH—Detailed Requirements for Fulfilling the Specification Profile for Electronically Coded OEM Immobilizers, Issue 22, (Jun. 1994 (Translation Jul. 5, 1994).
Anderson, Ross. 'Searching for the Optium Correlation Attack', pp. 137-143, Computer Laboratory, Pembroke Street, Cambridge CB2 3QG, Copyright 1995.
Arazi, Benjamin, Vehicular Implementations of Public Key Cryptographic Techniques, IEEE Transactions on Vehicular Technology, vol. 40, No. 3, Aug. 1991, 646-653.
Australian Examiners First Report on Patent Application No. 2006202850 dated Feb. 25, 2010.
Australian Patent Application No. 2017265017; First Examination Report dated Oct. 8, 2018; 4 pages.
Baran, P. Distribution Communications, vol. 9, 'Security Secrecy and Tamper-free Communications', Rand Corporation, 1964.
Barbaroux, Paul. 'Uniform Results in. Polynomial-Time Security', pp. 297-306, Advances in Cryptology—Eurocrypt 92, 1992.
Barlow, Mike, 'A Mathematical Word Block Cipher,' 12 Cryptologia 256-264 (1988).
Bellovin, S.M. 'Security Problems in the TCPIIP Protocol Suite', pp. 32-49, Computer Communication Review, New Jersey, Reprinted from Computer Communication Review, vol. 19, No. 2, pp. 32-48, Apr. 1989.
Beutelspacher, Albrecht. Advances in Cryptology—Eurocrypt 87: 'Perfect and Essentially Perfect Authentication Schemes' (Extended Abstract), pp. 167-170, Federal Republic of Germany, Undated.
Bloch, Gilbert. Enigma Before Ultra Polish Work and The French Contribution, pp. 142-155, Cryptologia 11(3), (Jul. 1987).
Bosworth, Bruce, 'Codes, Ciphers, and Computers: An Introduction to Information Security' Hayden Book Company, Inc. 1982, pp. 30-54.
Brickell, Ernest F. and Stinson, Doug. 'Authentication Codes With Multiple Arbiters', pp. 51-55, Proceedings of Eurocrypt 88, 1988.
British Application No. GB1110709.1; Combined Search and Examination Report Under Sections 17 and 18(3); dated: Sep. 29, 2011.
British Combined Search and Examination Report Under Sections 17 and 18(3); British Patent Application No. GB1000541.1; dated: Jan. 28, 2010.
British Combined Search and Examination Report Under Sections 17 and 18(3); British Patent Application No. GB1104752.9; dated: Apr. 11, 2011.
British Examination Report Under Section 17(5); British Application No. GB0715089.9 dated Nov. 28, 2007.
British Examination Report Under Section 18(3); British Patent Application No. GB0601795.8; dated: Apr. 22, 2009.
British Examination Report Under Section 18(3); British Patent Application No. GB0613068.6; dated Nov. 26, 2010.
British Examination Report Under Section 18(3); British Patent Application No. GB0613068.6; dated: May 6, 2010.
British Patent Application No. GB1110710.9; Combined Search and Examination Report Under Sections 17 and 18(3); Date of Search: Sep. 30, 2011.
British Search Report Under Section 17; British Patent Application No. GB0601795.8; Date of Search: May 22, 2006.
British Search Report Under Section 17; British Patent Application No. GB0613068.6; Date of Search: Aug. 23, 2006.
British Search Report Under Section 17; British Patent Application No. GB0715089.9; Date of Search: May 9, 2008.
British Search Report Under Section 17(5); British Patent Application No. GB0613068.6; Date of Search: Oct. 12, 2006.
British Search Report Under Section 18(3); British Patent Application No. GB0613068.6; Dated: Oct. 12, 2006.
Bruwer, Frederick J. 'Die Toepassing Van Gekombineerde Konvolusiekodering en Modulasie op HF-Datakommunikasie,' District of Pretoria in South Africa Jul. 1998.
Burger, Chris R., Secure Learning RKE Systems Using KeeLoq. RTM. Encoders, TB001, 1996 Microchip Technology, Inc., 1-7.
Burmeister, Mike. A Remark on the Effiency of Identification Schemes, pp. 493-495, Advances in Cryptology—Eurocrypt 90, (1990).
Canadian Patent Application No. 2,551,295; Office Action dated May 6, 2013.
Canadian Patent Application No. 2,926,281, Canadian Office Action dated Dec. 27, 2017.
Canadian Patent Application No. 2,926,281, Canadian Office Action dated Dec. 29, 2016.
Canadian Patent Application No. 2,926,281, Canadian Office Action dated Nov. 19, 2018.
Cattermole, K.W., 'Principles of Pulse Code Modulation' Iliffe Books Ltd., 1969, pp. 30-381.
Cerf, Vinton a 'Issues in Packet-Network Interconnection', pp. 1386-1408, Proceedings of the IEEE, 66(11), Nov. 1978.

(56) References Cited

OTHER PUBLICATIONS

Cerf, Vinton G. and Kahn, Robert E. 'A Protocol for Packet Network Intercommunication', pp. 637-648, Transactions on Communications, vol. Com-22, No. 5, May 1974.
Charles Watts, How to Program the HiSec(TM) Remote Keyless Entry Rolling Code Generator, National Semiconductor, Oct. 1994, 1-4.
Combined Search and Examination Reports Under Sections 17 and 18(3); British Patent Application No. GB0920612.9; Date of Search: Dec. 16, 2009.
Computer Arithmetic by Henry Jacobowitz; Library of Congress Catalog Card No. 62-13396; Copyright Mar. 1962 by John F. Rider Publisher, Inc.
Conner, Doug, Cryptographic Techniques—Secure Your Wireless Designs, EDN (Design Feature), Jan. 18, 1996, 57-68.
Coppersmith, Don. 'Fast Evalution of Logarithms in Fields of Characteristic Two', IT-30(4): pp. 587-594, IEEE Transactions on Information Theory, Jul. 1984.
Daniels, George, 'Pushbutton Controls for Garage Doors' Popular Science (Aug. 1959), pp. 156-160.
Davies, D.W. and Price, W.C. 'Security for Computer Networks,' John Wiley and Sons, 1984. Chapter 7, pp. 175-176.
Davies, Donald W., 'Tutorial: The Security of Data in Networks,' pp. 13-17, New York: IEEE, 1981.
Davis, Ben and De Long, Ron. Combined Remote Key Conrol and Immobilization System for Vehicle Security, pp. 125-132, Power Electronics in Transportation, IEEE Catalogue No. 96TH8184, (Oct. 24, 1996).
United States Court of Appeals for the Federal Circuit, Appeal from the United States District Court, Northern District of Illinois in Case No. 05-CV-3449, Appellate Decision, Feb. 19, 2008.
United States Court, Northern District of Illinois, Eastern Division, Civil Action 05 C 3449, Notice Pursuant to 35 U.S.C. 282, Mar. 4, 2011.
United States International Trade Commission in the Matter of Certain Code Hopping Remote Control Systems, Including Components and Integrated Circuits Used Therein; Investigation No. 337-TA-417; Expert Report of Dr. V. Thomas Rhyne; (TCG019919-19959); Partially redacted; Dated Jul. 7, 1999.
United States International Trade Commission, Washington, D., Investigation No. 337-TA-417; Respondents' Answer to Complaint and Notice of Investigation, Jan. 26, 1999.
U.S. Appl. No. 11/172,524; Office Action dated Apr. 9, 2009.
Voydock, Victor L. and Kent, Stephen T. 'Security in High-Level Network Protocols', IEEE Communications Magazine, pp. 12-25, vol. 23, No. 7, Jul. 1985.
Voydock, Victor L. and Kent, Stephen T. 'Security Mechanisms in High-Level Network Protocols', Computing Surveys, pp. 135-171, vol. 15, No. 2, Jun. 1983.
Voydock, Victor L. and Kent, Stephen T. Security Mechanisms in a Transport Layer Protocol, pp. 325-341, Computers & Security, (1985).
Watts, Charles and Harper John. How to Design a HiSec.TM. Transmitter, pp. 1-4, National Semiconductor, (Oct. 1994).
Weinstein, S.B. Smart Credit Cards: The Answer to Cashless Shopping, pp. 43-49, IEEE Spectrum, (Feb. 1984).
Neissman, C. Securtiy Controls in the ADEPT-50 Time-Sharing Syustem, pp. 119-133, AFIPS Full Joint Compuer Conference, (1969).
Welsh, Dominic, Codes and Cryptography, pp. 7.0-7.1, (Clarendon Press, 1988).
Wolfe, James Raymond, "Secret Writing—The Craft of the Cryptographer" McGraw-Hill Book Company 1970, pp. 111-122, Chapter 10.
German Patent Application No. 10 2006 063 085.8; Official Action dated Nov. 7, 2019 (with translation of relevant parts); 14 pages.

\* cited by examiner

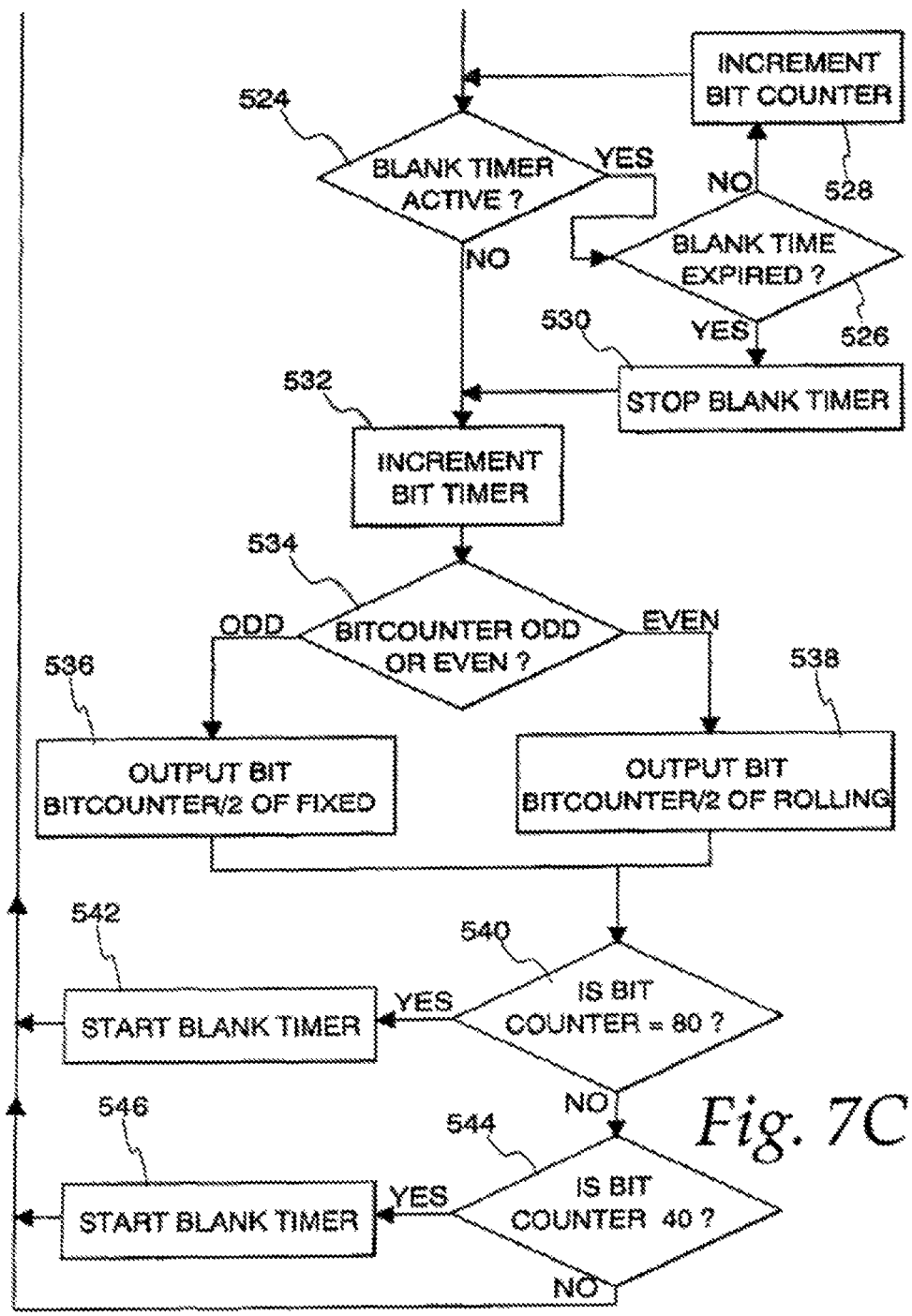

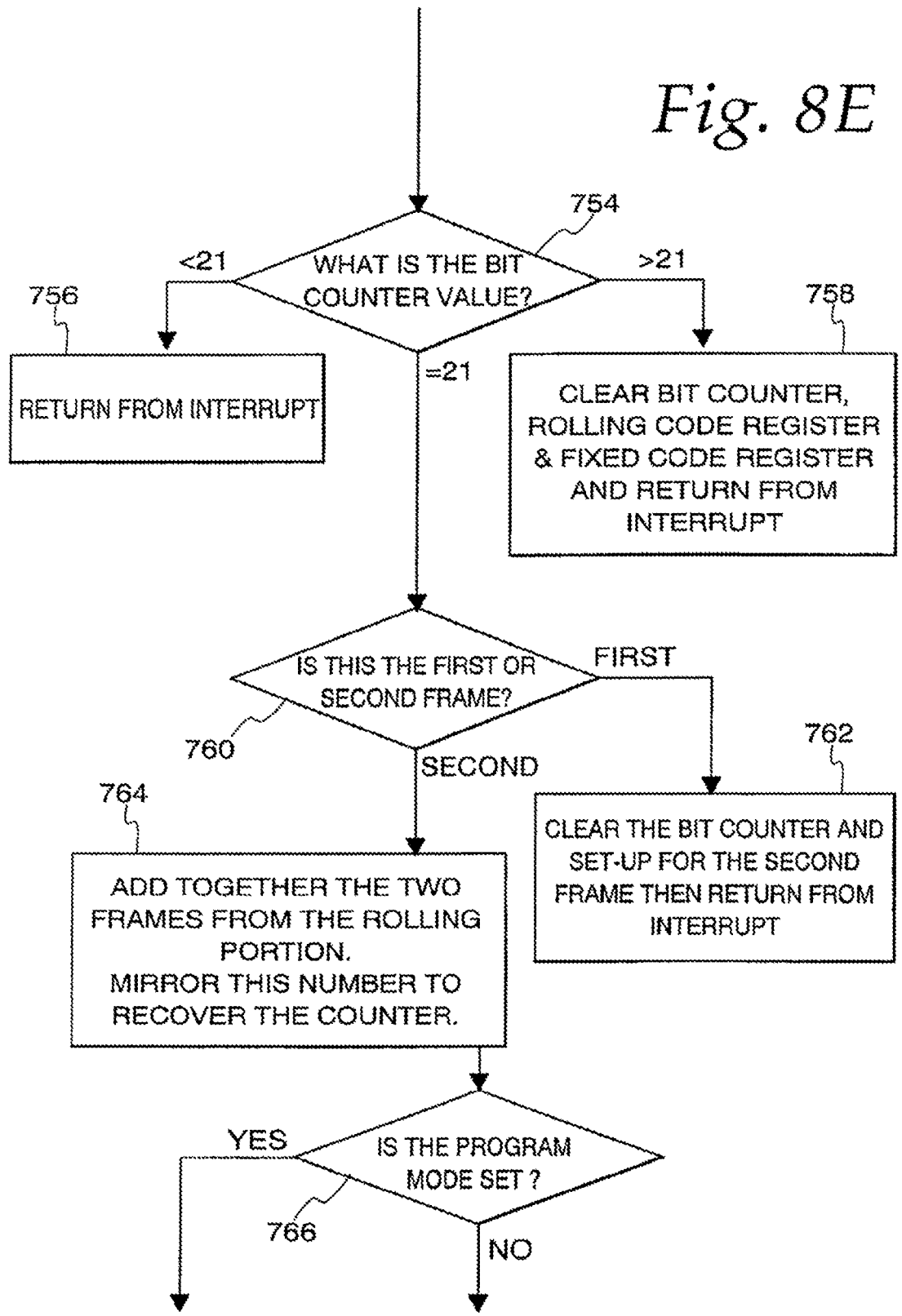

SECURITY SYSTEM FOR A MOVEABLE BARRIER OPERATOR

CROSS REFERENCE TO RELATED APPLICATION

This application claims the benefit of U.S. Provisional Patent Application No. 62/608,977, filed Dec. 21, 2017, which is hereby incorporated by reference in its entirety.

FIELD

The invention relates in general to security systems that allow operation upon the receipt of a properly coded signal. More particularly, the invention relates to a security system or to a barrier operator system, such as a garage door operator, employing a transmitter and a receiver that communicate via codes having at least a portion thereof that changes with operations of the transmitter.

BACKGROUND

It is well known in the art to provide garage door operators or other barrier operators that include an electric motor connectable through a transmission to a door or other movable barrier that is to be opened and closed. Because many of these systems are associated with residences, as well as with garages, it is important that opening of the barrier be permitted only by one who is authorized to obtain entry to the area protected by the barrier. Some garage door operator systems have in the past employed mechanical lock and key arrangements associated with electrical switches mounted on the outside of the garage. While these systems enjoy a relatively high level of security against tampering, they are inconvenient to use and may present safety concerns by requiring the user to exit their vehicle to open the garage door.

It is also well known to provide radio-controlled garage door operators, which include a garage door operator unit having a radio receiver and a motor connected to the garage door. The radio receiver is adapted to receive radio frequency signals or other electromagnetic signals having particular signal characteristics that, when received, cause the door to be opened. Such systems can include radio transmitters employing coded transmissions of multiple or three-valued digits, also known as "trinary bits" or other serial coded transmission techniques. Among these systems are U.S. Pat. No. 3,906,348 to Willmott, which employs a transmitter and receiver system wherein a plurality of mechanical switches may be used to set a stored authorization code.

U.S. Pat. No. 4,529,980 to Liotine et al. discloses a transmitter and receiver combination for use in a device such as a garage door operator wherein the transmitter stores an authorization code which is to be transmitted to and received by the receiver via a radio frequency link. In order to alter or update the authorization code contained within the transmitter, the receiver is equipped with a programming signal transmitter or light emitting diode which can send a digitized optical signal back to the transmitter where it is stored. Other systems also employing encoded transmissions are U.S. Pat. Nos. 4,037,201, 4,535,333, 4,638,433, 4,750,118 and 4,988,992.

While security systems have become more sophisticated, persons wishing to gain unauthorized access to commit property or person-related crimes have become more sophisticated as well. It is known in the security industry today that devices are being made available that can intercept or steal rolling code.

Systems are known that comprise code hopping encoders generate serial codes having fixed portions (i.e., which do not change with repeated actuation of the encoding portion) and rolling code portions which alter with each actuation of the encoding portion of the chip. In order to avoid inadvertent activation of a transmitter when out of range of the receiver causing the transmitter rolling code to be permanently out of sync with, and therefore not recognized by, a receiver, these code hopping encoders provide a window forward system, that is they are operable with systems having code receivers which recognize as a valid code not a single rolling code, but a plurality of rolling codes within a certain code window or window of values which are the values which would be generated on a relatively small number of switch closures as compared to the total number of rolling codes available. Examples include Keeloq Model NTQ105, NTQ115, NTQ125D and NTQ129 code hopping encoders by TransEquatorial Technology, Inc. and Texas Instruments Mark Star TRC1300 and TRC1315 remote control transmitter/receiver combinations. Nevertheless, if a user is away and inadvertently causes codes to be transmitted exceeding the number of codes normally allowed within the valid forward code window, the code will not be recognized by the receiver and the user must circumvent the system, possibly causing damage to the system or requiring an engineer.

More recently, many movable barrier operators, for example, garage door operators, use activation codes that change after each transmission. Such varying codes, called rolling access codes, are created by the transmitter and acted on by the receiver, both of which operate in accordance with the same method to predict a next rolling access code to be sent and received. One such rolling type access code includes four portions, a fixed transmitter identification portion, a rolling code portion, a fixed transmitter type identification portion, and a fixed switch identification portion. In this example, the fixed transmitter identification is a unique transmitter identification number. The rolling code portion is a number that changes every transmission to confirm that the transmission is not a recorded transmission. The fixed transmitter type identification is used to notify the movable barrier operator of the type and features of the transmitter. The switch identification is used to identify which switch on the transmitter is being pressed, because there are systems where the function performed is different depending on which switch is pressed.

Methods also exist for pairing remote control devices with a barrier operator so that a user may purchase additional control devices for use with a single barrier operator or utilize a control device integrated into a vehicle. When a movable barrier operator is installed, the homeowner typically receives at least one handheld transmitter that is already trained into the operator. To operate the door from a new learning transceiver, there is generally a two-step learning procedure for training the new learning transceiver. The first step is to teach the learning transceiver the type and potentially the code of the owner's handheld transmitter. While holding the handheld transmitter a few inches from the learning transceiver, the owner presses and holds the handheld transmitter's button at the same time as pressing a button on the learning transceiver to teach the access code type and frequency to the learning transceiver. The second step of the learning process is to train the learning transceiver to the operator. To do this, the learn button on the barrier operator has to be pressed, and within a given time period the learning transceiver should be activated. In another prior approach, these two steps are combined into a single step or done simultaneously. In one example, a pre-trained transmitter transmits a code to both an operator and a learning transceiver, which both save the code. Next, within a predetermined amount of time, the button is pressed on the learning transceiver to transmit a second rolling access code, which is received by the operator and compared with the first rolling type access code saved in the operator. If a predetermined correlation exists between the first rolling type access code and the second rolling type access code, the operator stores the representation of the second rolling type access code from the learning transceiver. Requiring that a user physically possess a pre-trained transmitter to train a learning transceiver to a movable barrier operator according to this approach ensures that the user is authorized to access the garage. Some systems even allow a universal transceiver to learn a credential from a movable barrier operator by establishing a bidirectional communication between the transceiver and the movable barrier operator, upon the occurrence of a predetermined event, without the use of a preprogrammed transmitter.

Yet there remains a desire for economical encoding systems that provide heightened security by using a changing or rolling code in combination with additional measures that prevent or minimize interception and copying of the code during use or pairing of devices.

SUMMARY

The invention relates in general to an electronic system for providing security for actuation of a particular device. The system may be useful, for instance, in a barrier operator system such as a garage door operator by allowing the garage door to be opened and closed in a relatively secure fashion while preventing persons who may be intercepting the radio frequency signals from being able to access the garage without authorization.

In some forms, systems and methods are provided that address the known "man in the middle" problem of persons intercepting and duplicating radio frequency signals from an authorized device, such as by use of a "code grabber," by introducing timing parameters into a bidirectional communication sequence between at least two devices. The timing parameters may be, for instance, a time delay or time window of a specified magnitude or duration. If the first device communicates with the second device and a response from the second device is sent outside of the time parameter, the response will be considered invalid or ignored by the first device. In this way, an intercepted transmission will be useless outside of (i.e. before and after) the specified time window, which may be on the order of tens or hundreds of milliseconds. By setting the devices to determine the time window based on a variable portion of the related transmission, or a portion or derivative thereof, the time window will vary from operation to operation and further increase the level of security.

In some embodiments, the system may include a first device configured to trigger a communication event and subsequent response by another device. The first device may be, for instance, a handheld or vehicle mounted transceiver, and may be user-operated or triggered by a geofence, proximity detection, or other variables. The first device may in some forms be generally configured for developing and transmitting via wireless signals a first encrypted message comprising a fixed code and a changing or variable code (such as a rolling code). The changing or variable code is changed with each actuation of the transceiver. The fixed code is static and remains the same for each actuation of the transceiver. A second device, for example an operator such as a motorized garage door opener, receives the encrypted message, validates the message by comparing the fixed code and the changing or variable code to stored values, which are preferably stored in a computer memory physically incorporated into the second device, and upon validation sends a response signal including at least a second encrypted message having a second fixed code and a second changing code. The first device then receives and attempts to validate the second encrypted message, and in some embodiments, is configured to transmit a third encrypted message to the operator device, the third encrypted message including the first fixed code and a changed version of the second changing code. This third encrypted message is configured to effect performance of an action by the operator device, such as lifting or lowering a moveable barrier structure.

In some forms, a system of secure communication between a first device and a second device is provided to effect an action by the second device. In some embodiments, the first device comprises a controller circuit; a transmitter in operative communication with the controller circuit; a receiver in operative communication with the controller circuit; and a user input device in operative communication with the controller circuit. The controller circuit of the first device may be configured to, in response to detecting an input at the user input device, control the transmitter to transmit a first encrypted message that includes at least a first fixed code and a first changing code; receive through the receiver a response from the second device, wherein the response comprises a second encrypted message including a second fixed code and a second changing code; validate the response by comparing the second fixed code and the second changing code to second stored code values; and in response to validating the response, control the transmitter to transmit a third encrypted message including at least the first fixed code and a changed version of the second changing code, wherein the third encrypted message is configured to effect performance of an action by the second device. The second device may in some embodiments comprise a controller circuit; a transmitter in operative communication with the controller circuit; a receiver in operative communication with the controller circuit; and a timer circuit in operative communication with the controller circuit. The controller circuit of the second device may be configured to enable receiving the first encrypted message by the second device's receiver; validate the first encrypted message by comparing the first fixed code and the first changing code to stored code values; determine when to transmit a response; in response to validating the first encrypted message, control transmitting the response from the second device's transmitter; enable the second device's receiver to receive the third encrypted message; validate the third encrypted message by comparing the first fixed code and the changed version of the second changing code to stored code values; and effect performance of an action in response to validating the third encrypted message.

In some embodiments, at least one time window is associated with one or more encrypted messages and provides an additional layer of security and minimize the opportunity for third parties to intercept transmissions and utilize the fixed and changing codes without the device owner's consent. Determination of the time window may be made relative to specific actions (such as activation of the first device, receipt of a transmission by the second device, etc.), or alternatively may be based on an absolute time measurement (e.g. by referencing a clock to determine the beginning and end of the window). If absolute time measurements are used, the first device and devices with which it is in communication should be synchronized so that their absolute time measurements are essentially the same. In some such embodiments, the first and second device each contain timers in operative communication with their respective controller circuits, and upon actuation the first device determines a time window in which to expect to receive a response in addition to transmitting a first encrypted message including at least a first fixed code and a first changing code. In some embodiments, the time window may be determined based on one or more code portions used to create the first encrypted message (such as the changing code portion of the message or one or more portions thereof) or based on the encrypted form of the message or one or more portions thereof. The second device receives and decrypts the first encrypted message and validates the message by comparing the fixed code and the changing or variable code thereof to stored values. The second device also determines a second time window in which to transmit a response to the user-operated transceiver based on the encrypted message. The second time window may be the same as or within the time window determined by the first device and may or may not be determined using the same portion of the encrypted message. The second time window may be a discrete point in time that lies within the first time window.

In some embodiments, after the second device validates the first encrypted message, the second device sends a response signal to the first device within the second time window. The response signal includes at least a second encrypted message created from a second fixed code and a second changing code, wherein the second changing code may be, but is not necessarily, independent from the first changing code. If the second encrypted message is received by the first device within the first time window, the first device will attempt to validate the second encrypted message by comparing the second encrypted message's fixed code and changing or variable code to a second set of stored code values. In some embodiments, the first device may compare the time of receipt of the second encrypted message to the first time window, only proceeding to analyze signals or messages that are received within the first time window. Alternatively, to conserve power, the first device may turn on and enable a receiver element at the beginning of the time window and shut off the receiver element at the end of the time window so that the first device is only able to receive transmissions from the second device within the first time window. In such embodiments, the second encrypted message will be entirely ignored if sent and received outside of the first time window. Upon validating the response from the second device, the first device in some embodiments may be configured to transmit a third encrypted message including the first fixed code and a changed version of the second changing code. This third encrypted message is configured to effect performance of an action by the second device, such as lifting or lowering a moveable barrier.

The fixed and variable codes may be of any selected length and may be adapted or altered in various ways in order to add additional layers of security. In some examples, the transmitter may be configured to produce a frame of a specified number of bits comprising a fixed portion of the code and a second frame comprising a variable portion of the code. In some embodiments, the variable portion of the code, which may be a rolling code, may then be mirrored to provide a mirrored rolling code. The mirrored rolling code may then have its most significant bit "deleted" by setting it to zero. The transmitter may then convert the fixed code and the mirrored rolling code to a three-valued or trinary bit fixed code and a three-valued or trinary bit rolling code. To provide even further security, in some embodiments the fixed code and the rolling codes may be shuffled or interleaved so that alternating bits are comprised of a fixed code bit and a rolling code bit. A single synchronization and/or identification pulse may proceed the first and second frames to indicate the start of the frame and whether it is the first frame or the second frame.

Additionally, or alternatively, in some embodiments encryption may include providing a variable code and a plurality of differing data bit order patterns, providing a plurality of differing data inversion patterns, selecting a particular one of each of the data bit order patterns and the data inversion patterns to provide selected patterns, and transmitting at least a part of the encrypted variable code using the selected patterns as transmission characteristics. In some forms, selecting a particular one of each of the data bit order patterns and the data inversion patterns to provide selected patterns comprises using the variable code to select the particular data bit order pattern and data inversion pattern to provide the selected patterns.

Also provided is a method of pairing a first device and a second device to establish secure communication between the first device and the second device to effect an action by the second device. A first device transmits to a second device a first encrypted message that includes at least a first fixed code and a first changing code. The first device optionally also determines a time window in which to expect a response from the second device, and the time window may be based on at least a portion of the first encrypted message. In some embodiments, the first device may enable a first device receiver during the time window to receive the response from the second device, or alternatively the first device receiver may remain in an on state and compare a timestamp of the response to the time window. The second device receives the first encrypted message while the second device is in a "learn" mode in which it is waiting for signals from a transmitter without information regarding the current version of the changing code of the first device. While in learn mode the second device stores the first encrypted message, and determines a time window in which to transmit a response to the first encrypted message. In some embodiments, the second device may have been placed in learn mode manually by a user, such as by pressing a button, switch, or lever on the second device, and thus in some embodiments may require simultaneous manual activation of both the first and second device. The time window as determined by the second device may depend on one or more portions of the first encrypted message. The second device transmits its response, which comprises a second encrypted message including at least a second fixed code, to the first device within the time window determined by the second device. When the responsive second encrypted message is received by the first device within the time window determined by the first device, the response is stored and the first device transmits to the second device a third encrypted message including at least the first fixed code and a changed version of the first changing code back. The second device receives and validates the third encrypted message by comparing the first fixed code and the changed versions of the first changing code to stored code values from the first encrypted message (first fixed code and first changing code), and upon validation (by confirming that the changed version of the first changing code is one change forward of the changing code from the first encrypted message) the second device then transmits a fourth encrypted message including the second fixed code and a second changing code (which may be independent of the first changing code). The first device receives the fourth encrypted message, validates the fourth encrypted message by comparing the second fixed code and the second changing code to the response stored by the first device, and stores the second fixed code and the second changing code in response to validating the fourth encrypted message.

The present system provides advantages over previous garage door operator systems and previous rolling code systems. Some systems according to the invention provide enhanced security through bidirectional communication in which first and second devices both transmit and receive independent codes to validate a transaction between devices both on the user end and operator end. Some embodiments provide enhanced security by linking information relating to timing of subsequent transmissions to the encrypted transmissions, and require receipt of responsive transmissions within a specified time window as a prerequisite for code validation. These enhanced security measures may also be used in methods of pairing and/or synchronizing devices.

BRIEF DESCRIPTION OF THE DRAWINGS

FIGS. 7A-C are flow diagrams showing examples of operation of the transmitter;

FIGS. 8A-F are flow charts showing examples of operation of a receiver of one of the first and second devices;

Figure 1:
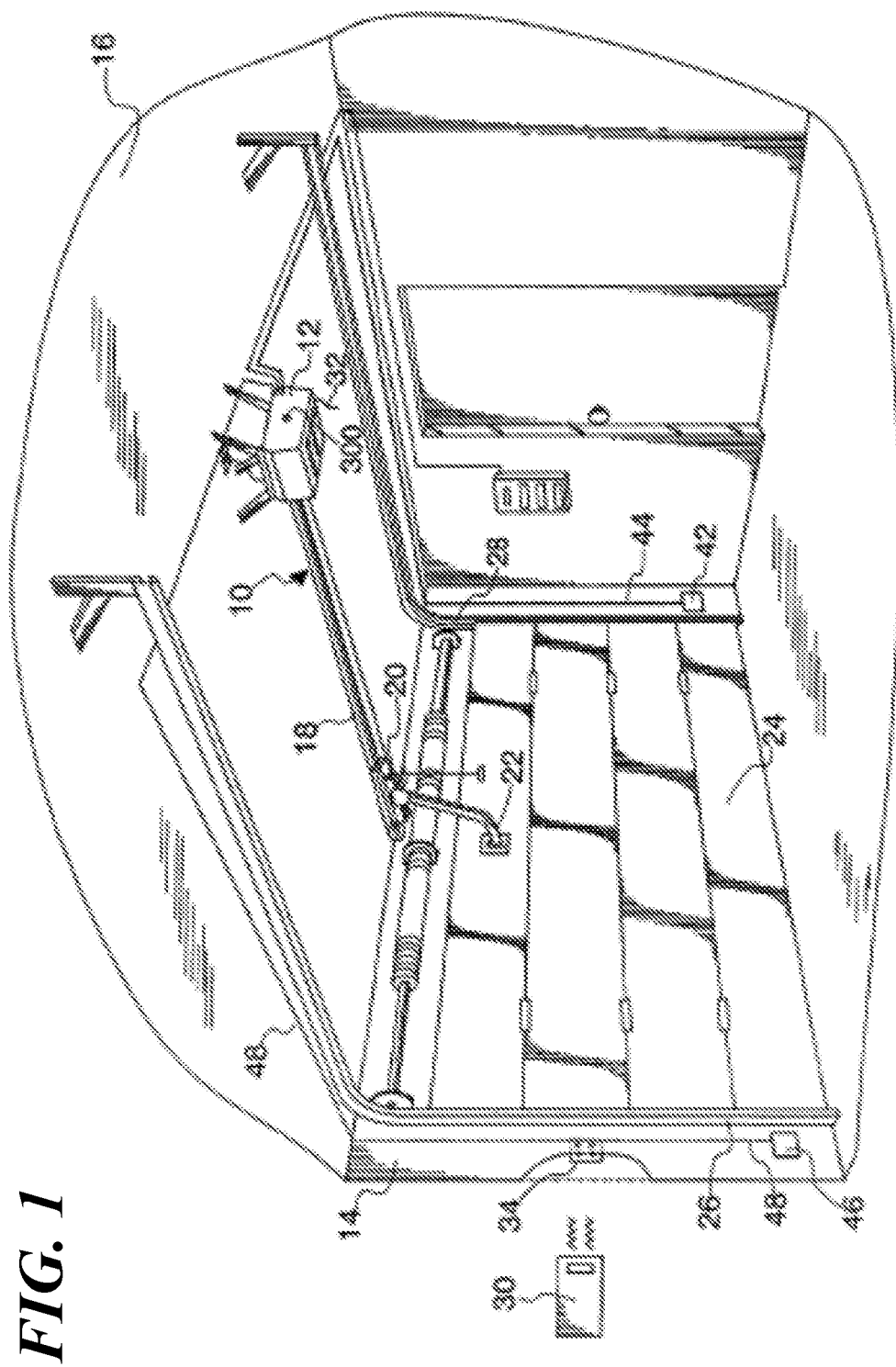
FIG. 1 is a perspective view of an example moveable barrier operator system that receives control signals from a user-operated transceiver.

Skilled artisans will appreciate that elements in the figures are illustrated for simplicity and clarity and have not necessarily been drawn to scale. Common but well-understood elements that are useful or necessary in a commercially feasible embodiment may be omitted for simplicity and/or clarity. It will further be appreciated that certain actions and/or steps may be described or depicted in a particular order of occurrence while those skilled in the art will understand that such specificity with respect to sequence is not actually required.

DETAILED DESCRIPTION

The systems and methods described herein include a user-actuated first device, for instance a handheld or vehicle mounted transceiver, generally configured for developing a first encrypted message comprising a fixed code and a changing or variable code (such as a rolling code). The changing or variable code is changed with each actuation of the transceiver according to a set sequence or protocol accessible by the first device and a second device with which it communicates. The fixed code remains the same for each actuation of the first device. The second device includes an operator mechanism, such as a motorized garage door opener, to induce one or more actions when commanded by the first device. The first and second device may be configured to communicate with one another by various techniques, for example a wired communication path, radio frequencies, or any variety of proprietary wireless platforms.

In some embodiments, the second device receives the encrypted message from the first device, validates the message by comparing the fixed code and changing or variable code to stored values and, upon validation, sends a response signal including at least a second encrypted message having a second fixed code and a second changing code that is independent from the first changing code. The stored values may represent, for instance, fixed and changing values from prior operations with a sequence or algorithm associated with the changing code to determine changing code values. In some embodiments, the second device may recognize a plurality of changing code values as valid in order to account for accidental or otherwise ineffective actuation of the first device (such as when outside of the range of the second device or when interference prevents normal communication with the second device).

The first device receives and attempts to validate the second encrypted message, and in some embodiments, is configured to transmit a third encrypted message to the second device, the third encrypted message including the first fixed code and a changed version of the second changing code. This third encrypted message is configured to effect performance of an action by the second device, such as lifting or lowering a moveable barrier. Thus, communication between the devices may involve bidirectional validation of messages wherein each of two devices are configured to both transmit and receive messages and compare them to stored values, such as values from prior communications between devices. The communication between the devices may, in some embodiments, involve additional exchanges of messages in order to further improve security, for instance transmission and validation of fourth and fifth encrypted messages containing fixed codes and changing codes.

In some embodiments, at least one time window is associated with the encrypted messages to provide an additional layer of security and minimize the opportunity for third parties to intercept transmissions and utilize the fixed and changing codes without the device owner's consent. In some such embodiments, upon actuation, the first device also determines a time window in which to expect to receive a response as it transmits the first encrypted message including at least a first fixed code and a first changing code. In some embodiments, the time window may be determined at least in part based on one or more portions of the encrypted message, so that the time window itself acts as an additional layer of encryption. For instance, specific lengths of time may be associated with specific values or digits in the fixed code portion of the message so that a specific time window is linked to the first device or associated with specific values or digits in the changing code portion of a message so that the time window varies with each actuation of the first device. The second device receives the encrypted message and validates the message by comparing the fixed code and changing or variable code to stored values. The second device then determines a second time window in which to transmit a response to the user-operated transceiver based on the encrypted message, with the second time window being the same as or within the time window determined by the first device and may or may not be determined using the same portion of the encrypted message. In some embodiments, the second time window may be a discrete point in time, with or without a margin of error, that lies within the first time window.

When the second device validates the encrypted message, the second device sends a response signal within the second time window. The response signal includes a second encrypted message, which may be, for instance, a message comprising a second fixed code and a second changing code that is independent from the first changing code. The first device may be configured to ignore responses received by the first device outside of the first time window but validate responses received within the time window calculated by the first device, thus allowing timing of response signals from the second device to act as an additional layer of security verifying that the devices are authorized to communicate with one another. If the second encrypted message is received by the first device within the first time window, the user-operated device will validate the second encrypted message by comparing its fixed code and changing or variable code to a set of stored code values. The first device may compare the time of receipt of the second encrypted message to the first time window, only proceeding to analyze signals which area received within the first time window. Alternatively, in order to conserve power the first device transceiver may turn on and enable a receiver portion to receive transmissions only within the first time window so that the second encrypted message will be entirely ignored if sent and received outside of the first time window. In some embodiments, the time window is less than about 360 milliseconds, and in some embodiments, begins tens or hundreds of milliseconds after it is determined by the first device. The time window is preferably short enough so that there is no noticeable delay to the user between actuating the transmitter device and causing the requested action.

Upon validating the response from the second device, the first device may be configured to transmit a third encrypted message, for instance one including the first fixed code and a changed version of the second changing code. This third encrypted message is configured to effect performance of an action by the operator device, such as lifting or lowering a moveable barrier structure. In some embodiments, the third message may also be associated with a time window and recognized by the second device only when received within a calculated time window. The devices may also be configured to require validation of additional messages before effecting an action by the second device.

Referring now to the drawings and especially to FIG. 1, a movable barrier operator system 10 is provided that includes moveable barrier operator 12 mounted within a garage 14 and a handheld transceiver 30. The operator 12 is mounted to the ceiling 16 of the garage 14 and includes a rail 18 extending therefrom with a releasable trolley 20 attached having an arm 22 extending to a multiple paneled garage door 24 positioned for movement along a pair of door rails 26 and 28. The handheld transceiver unit 30 is adapted to send signals to and receive signals from the operator 12. An antenna 32 may be positioned on the operator 12 and coupled to a receiver as discussed hereinafter in order to receive transmissions from the handheld transceiver 30. An external control pad 34 may also be positioned on the outside of the garage 14 having a plurality of buttons thereon and communicate via radio frequency transmission with the antenna 32 of the operator 12. An optical emitter 42 may be connected via a power and signal line 44 to the operator 12 with an optical detector 46 connected via a wire 48 to the operator 12 in order to prevent closing of the door 24 on a person or object inadvertently in the door's path. A switch 300 may be provided for switching between modes, such as operating mode and learn mode.

Figure 2:
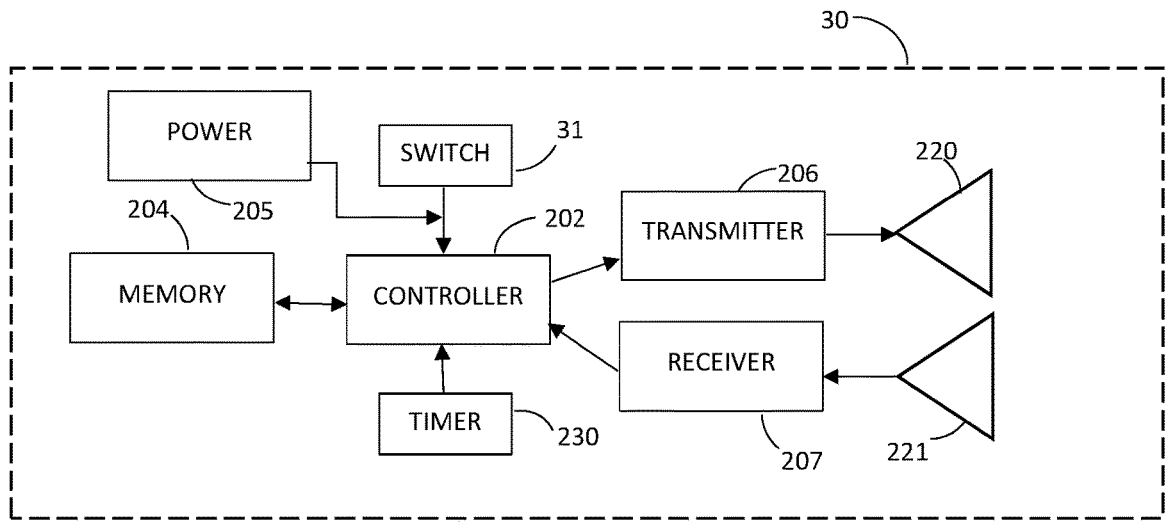
FIG. 2 is a block diagram of an example of the user-operated transceiver of FIG. 1.

Referring now to FIG. 2, a block diagram of the transceiver 30 is provided. The transceiver 30 includes both a transmitter 206 and receiver 207 (which may be combined into a single mechanism) in operative communication with antennas 220 and 221, respectively. The antennas may be positioned in, on, or extending from the user operated transceiver 30, wherein the transmitter 206 and receiver 207 are configured for wirelessly transmitting and receiving transmission signals to and from the movable barrier operator 12, including transmission signals that contain a first rolling access code with a fixed code portion and a rolling code portion. In some embodiments, both the transmitter and receiver may communicate with a single antenna or multiple antennas, and in some embodiments both device may be configured to be a single transceiver device in communication with a single antenna. The user-operated transceiver 30 also includes a controller 202 in operative communication with the transmitter 206 and a memory 204 and is configured for processing data and carrying out commands. The memory may be, for instance, a non-transitory computer readable medium, and may have stored thereon instructions that when executed by a controller circuit cause the controller circuit to perform operations. A power source 205 is coupled to the controller 202 and/or other components, and may be routed in some embodiments so that a switch 31 couples/decouples the power source to other components so that power is supplied only upon activation of the switch 31 or a specified time thereafter. The controller 202 is configured to generate and cause the transmitter 206 to transmit a first rolling access code, including at least one fixed code portion and at least one changing or rolling code portion for the transmission signal, and the receiver 207 is configured to receive responsive transmissions. A timer 230 in communication with the controller 202 provides a way to determine the time of incoming and outgoing signal transmissions, and provides reference for the controller 202 to enable and disable the transmitter 206 and/or receiver 207 of the device. The memory 204 is connected for operative communication with the controller 202 and is configured to store codes and in some embodiments other information for outgoing transmissions. The memory 204 is further configured to store fixed and/or changing or variable code values for comparison to incoming transmissions. The switch 31 may include one or more user-operable switches for inputting commands to the transceiver 30, for example to issue a barrier movement command or a learning command. The switch 31 may be associated with a button, lever, or other device to be actuated, for example by a user's hand or other actions, events, or conditions. As other examples, the switch 31 may be voice operated or operated by a user contacting a touch-sensitive screen as the location of an object displayed on the screen.

Figure 3:
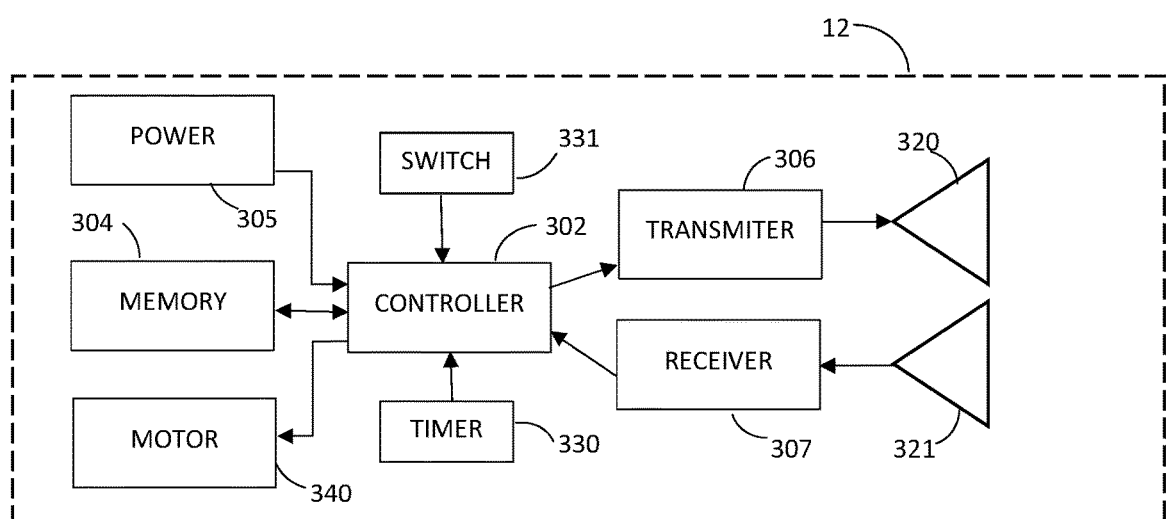
FIG. 3 is a block diagram of an example of the moveable barrier operator of the system of FIG. 1.

Referring now to FIG. 3, in one example, the operator 12 includes a controller 302 in communication with a memory 304 and is configured for storing and retrieving data to and from the memory 304 as well as processing data and carrying out commands. A power source 305, such as an AC power conduit, battery, or other known source, supplies electricity to the controller 302 in order to allow operation. The operator 12 also includes a wireless transmitter 306 and receiver 307 (or combination device) in operative communication with the controller 302. As shown, the transmitter 306 communicates with a first antenna 320 and the receiver communicates with a second antenna 321, but both devices may communicate with a single antenna or multiple antennas, and in some embodiments the device may be configured to have a single transceiver device in communication with a single antenna. The antennas may be positioned in, on, or extending from the movable barrier operator 12. In this regard, signals, such as radio frequency or other wireless transmission carriers, may be sent to and received from the user-actuated transceiver 30 according to a variety of frequencies or modulations. Signals may be modulated in a number of different ways; thus, the transceiver 30 and movable barrier operator 12 may be configured to communicate with one another via a variety of techniques. The controller 302 of the operator device 12 is also in communication with a motor 340 in order to carry out an operation such as lifting or lowering a garage door; sliding, swinging, or rotating a gate; or otherwise moving or repositioning a barrier structure. One or more switches 331 may be provided to override the controller 302 or place the controller in and out of a learning mode in which the operator 12 may be paired with a user-operated device by exchanging and storing messages.

The term controller refers broadly to any microcontroller, computer, or processor-based device with processor, memory, and programmable input/output peripherals, which is generally designed to govern the operation of other components and devices. It is further understood to include common accompanying accessory devices. The controller can be implemented through one or more processors, microprocessors, central processing units, logic, local digital storage, firmware, software, and/or other control hardware and/or software, and may be used to execute or assist in executing the steps of the processes, methods, functionality, and techniques described herein. Furthermore, in some implementations the controller may provide multiprocessor functionality. These architectural options are well known and understood in the art and require no further description here. The controllers may be configured (for example, by using corresponding programming stored in a memory as will be well understood by those skilled in the art) to carry out one or more of the steps, actions, and/or functions described herein.

Generally, the controllers 202 and 302 may be configured similarly or independently, and each can include fixed-purpose hard-wired platforms or can comprise a partially or wholly programmable platform. These architectural options are well known and understood in the art and require no further description here. The controller can be configured (for example, by using corresponding programming as will be well understood by those skilled in the art) to carry out one or more of the steps, actions, and/or functions described herein, and can store instructions, code, and the like that is implemented by the controller and/or processors to implement intended functionality. In some applications, the controller and/or memory may be distributed over a communications network (e.g. LAN, WAN, Internet) providing distributed and/or redundant processing and functionality. In some implementations, the controller can comprise a processor and a memory module integrated together, such as in a microcontroller. One or more power sources may provide power to each controller, and may be of any known type.

When a user actuates the switch 31 of the user-operated transceiver 30, such as by pressing a button designated as performing a particular action, the controller 202 activates the transmitter 206 to transmit through antenna 220 a message based on information stored in the memory component 204. The message is received by the receiver 307 of the operator device 12, and communicated to the operator's controller 302. In some embodiments, the controller 302 verifies the message by comparing it to stored information from the operator's memory module 304, and upon verification the controller 302 is configured to cause transmission of a response signal from the transmitter 306 through antenna 320. If the message from the user-actuated transceiver 30 includes information relating to timing parameters for a response, the operator's controller 302 receives time information from a timer 330 in order to determine when to transmit the response in order to comply with timing parameters of the user-actuated transceiver 30.

The user-actuated transceiver 30 may be configured to verify that the response from the operator 12 complies with transmitted timing requirements in any number of ways. In some embodiments, the controller 202 may compare a time stamp or other timing information relating to the operator's response to the transmitted time parameter using timer 230. In some embodiments, receiver 207 is generally inactive, but switched on by controller 202 only for a short time period consistent with the transmitted timing parameter. For instance, controller 202 may switch on receiver 207 for a window of time matching a time window transmitted in an outgoing message through transmitter 206, and upon expiration of the time window according to timer 230, controller 202 switches receiver 207 off again. Timing information may be either relative, for instance a specified number of seconds, milliseconds, or nanoseconds after transmission of an outgoing signal or other event, or may be absolute such as standard date and time information for a specific time zone.

Upon receiving the response of the operator 12 through receiver 207 at an appropriate time consistent with the specified timing parameter, the user-actuated transceiver 30 may validate the response by comparing it to stored information in its memory module 204. Upon validation of the response, the user-actuated device 30 may transmit another message through transmitter 206 to the operator 12. This third message is configured to cause the operator's controller 302 to activate a motor 340 in order to carry out a function associated with activation of the user-actuated device. The transceiver 30 may include multiple buttons, levers, switches, displays, microphone(s), speaker(s), or other inputs associated with different tasks to be carried out by the operator 12.

In another example, pairing of the moveable barrier operator 12 to a user-actuated transceiver may be performed. The receiver 307 of the operator 12 is configured to receive an authorization signal indicating that it is authorized to communicate with the user-actuated transceiver 30 and to provide an indication that it received the authorization signal to the controller 302. One or more switches 331 may be provided in order to turn on and/or otherwise permit the receiver 307 to receive the authorization signal. In response to receiving the authorization signal, the controller 302 is configured to generate a first rolling access code and to store a representation of the first rolling access code in the memory device 304. The controller 302 is configured with the transmitter 306 to transmit a transmission signal including the first rolling access code to the user-actuated device 30. The receiver 307 also receives a transmission signal from the user-actuated transceiver 30 including a second rolling access code, as described further below. In this example, the receiver 307 provides the transmission signal to the controller 302, which compares the second rolling access code with the representation of the first rolling access code stored in the memory device 304.

Figure 4A:
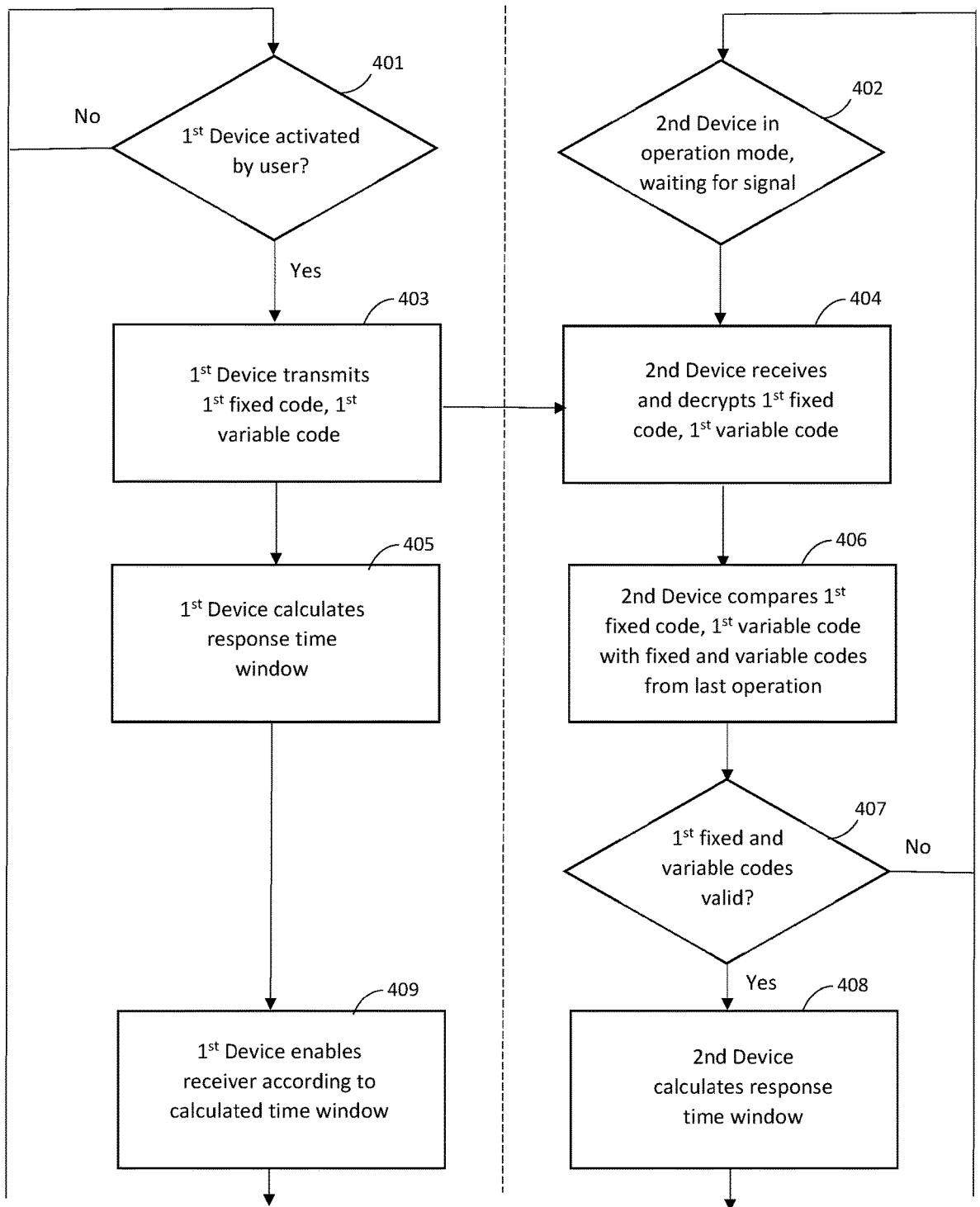
FIGS. 4A-C are flow diagrams showing an example communication flow between a first device and a second device during normal operation.
Figure 4B:
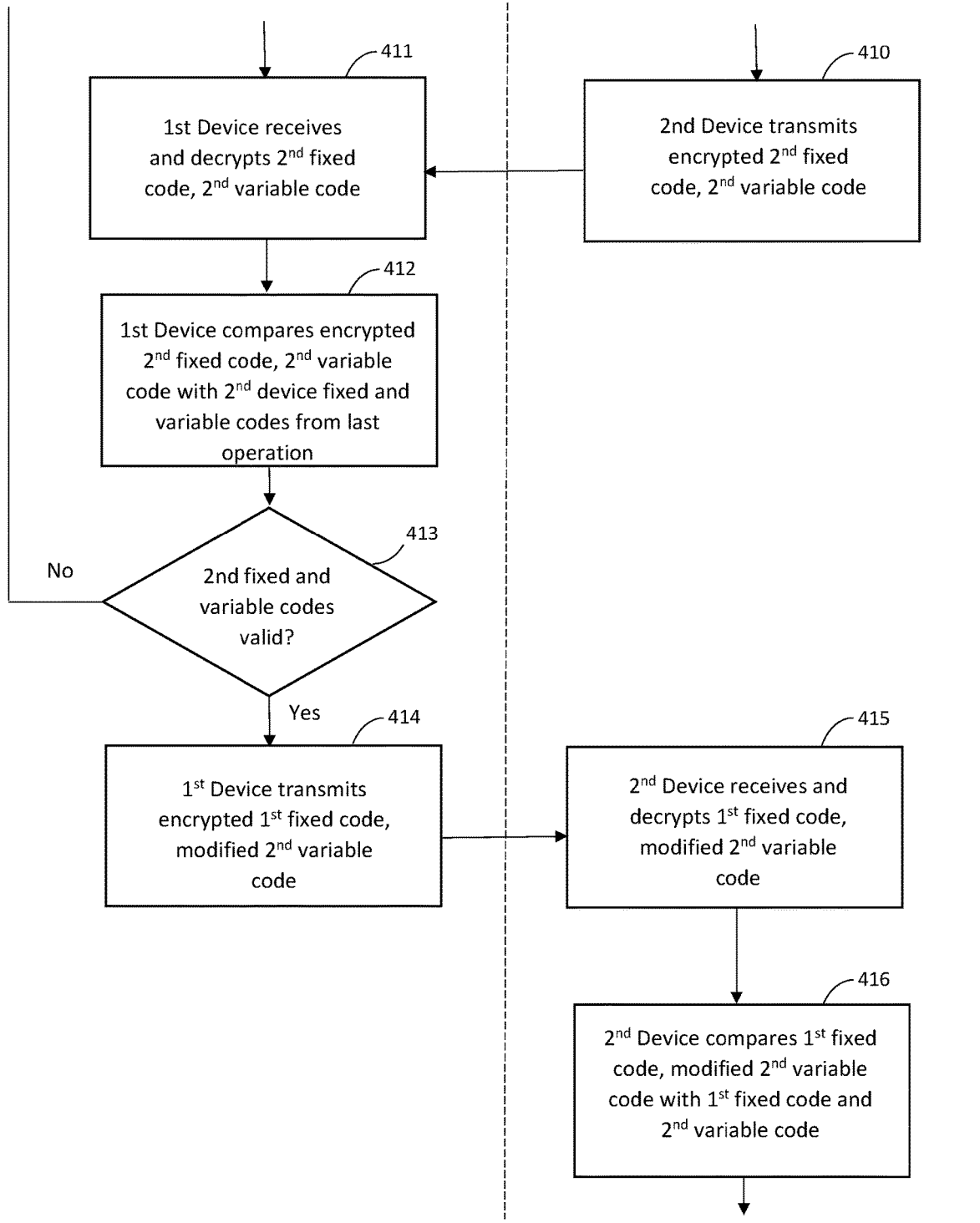
Figure 4C:
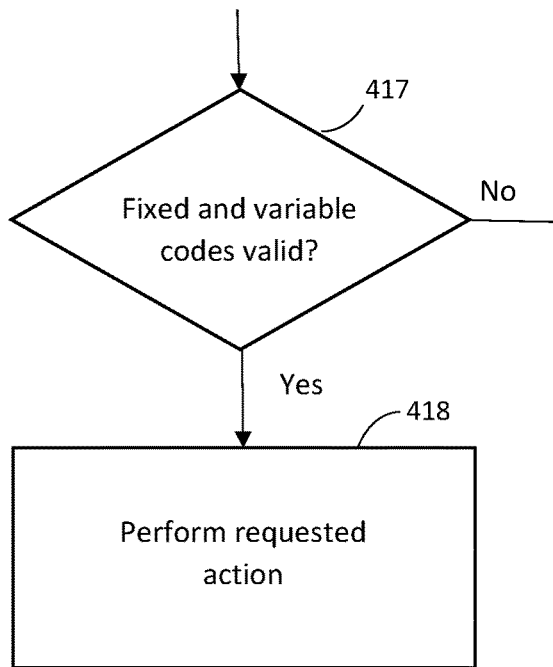

FIGS. 4A, 4B, and 4C are interconnected flow charts that demonstrate steps of one example of a process in which signals are exchanged between first and second devices to verify authorization and carry out an activity. Steps to the left of the central dashed line relate to a first device, such as a user-operated remote device, while steps to the right relate to a second device, such as a moveable barrier operator. For example, the first and second devices may be the transceiver 30 and the operator 12 discussed previously. In this example, a previous operation such as a pairing procedure or an operation sequence has been performed at an earlier time so that each of the first and second device have stored information received from the other device; a first-time operation of the device in the form of a pairing or synchronization sequence will be explained further below in connection with FIGS. 5A-5C.

Initially, the first and second devices both have stored in their memories a first fixed code and first variable code from the immediately previous operation involving the first device, as well as a second fixed code and second rolling code from the immediately previous operation involving the second device. The first device assesses 401 whether it has been activated in a manner intended to cause an action by the second device. For instance, a user pressing a button on the first device may complete an electrical circuit or effect a measurable change in at least one component of the first device. When the first device has not been activated, it continues to await activation. Once activated, the first device transmits 403 a first message that includes at least a first fixed code and a first changing or variable code that represents a modification from the first changing code in the immediately previous operation. The first fixed code and/or first variable code are now stored within the memory of the first device, and may be encrypted using one or more encryption methods. The encryption methods are not particularly limiting, and may include one or more types of public key or private key encryption, block ciphers, stream ciphers, and other techniques. In some embodiments, encryption may comprise using a predetermined number of bits of the changing code as a basis for selecting a particular data bit order pattern and particular data inversion pattern. The first device also calculates 405 a time window in which it expects to receive a response, and this calculation may take place before or after transmission of the message by the first device. In some embodiments, the time window is calculated from at least a portion of the first encrypted message or from at least a portion of the unencrypted variable code, or both.

Meanwhile, the second device has been placed in operation mode and awaits 402 a signal to effect an action, and upon receiving 404 the first message from the first device, decrypts the message to obtain the first fixed code and first variable code. The second device then stores the first fixed code and first variable code, and validates the first fixed code and first variable code by comparing 406 them to stored code values. In this step, the first fixed code and first variable code from the encrypted message are compared to the first fixed and variable code from the previous operation. If the fixed codes match and the first variable code from the encrypted message matches the previous variable code as modified according to a set of established rules for the variable code (e.g. matches a subsequent value from a predetermined sequence or algorithm), the first encrypted message will be considered validated. If the decrypted code values do not match the stored code values, the second device ignores the first message and waits 402 for further signals. On the other hand, if the code values are valid in 407, the second device calculates 408 a response time window, such as a specific window or point in time, based on the first encrypted message. The response time may or may not be identical to the response window calculated 405 by the first device, and may or may not use the same portion or portions of the first encrypted message and/or first variable code. For instance, the second device may use the same portions of the first fixed and/or first variable code to calculate the same time window calculated by the first device, or may be configured to read one or more portions of the first fixed or changing code to determine a response time that is entirely within the window calculated by the first device.

In response to validating the first encrypted message, and after determining the response time window, the second device transmits a response 410 within the time window calculated in 408. The response comprises a second encrypted message including a second fixed code and a second changing/variable code that is, in the depicted embodiment, independent from the first changing code and represents a modified version of a variable code from the immediately previous operation. The second fixed and modified second variable code values are stored in the second device's memory, so that at this stage the second device memory contains the first fixed and variable code from the previous operation, the second fixed and variable code from the previous operation, the first fixed and variable code from the first encrypted message from the first device, and the second fixed and variable code from the encrypted response.

The first device enables 409 a receiver during the time window calculated by the first device so that it is able to receive the encrypted response from the second device. If the second device sends the response outside of the time window calculated by the first device the signal will simply not be received because the first device receiver is shut off. However, if the response is sent by the second device during the calculated time window in which the first device receiver is active, the first device will receive 411 and decrypt the second encrypted message, which includes the second fixed code and second changing/variable code. The second fixed and changed variable code are stored in the first device's memory, along with the second fixed and variable code from the previous operation and the first fixed and variable code from the first encrypted message. The first codes from the previous operation are no longer needed, and may be deleted from the memory.

The first device then compares 412 the second fixed code and second variable/changing code with fixed and variable codes from the previous operation stored in the memory of the first device. If the second fixed code matches the fixed code from the prior operation and the second variable code matches the prior changing code as modified according to a set of established rules for the changing code, the response message is validated. If the second fixed and variable codes are determined 413 valid, the first device transmits 414 a third encrypted message including at least the first fixed code and a changed version of the second changing code. If the first device is unable to validate the response from the second device, the process ends and the first device returns to awaiting 401 subsequent activation.

When the second device receives 415 the third encrypted message, the second device decrypts 415 the message to determine the first fixed code and the changed version of the second variable code. The values are stored in the second device memory, which now contains the first fixed and variable codes from the previous operation, the first fixed and variable code from the first encrypted transmission, the second fixed and variable codes from the previous operation, the second fixed and variable code from the second encrypted (response) transmission, and first fixed code and changed second variable code from the third encrypted message. The second device then compares 416 the first fixed code and the changed versions of the second variable code to stored code values comprising the first fixed code and unmodified second variable code in order validate 417 the third encrypted message. While the validation step may have a forward window of values that are acceptable (validation occurs when the received version of the changing code is any one of the next several (e.g. 12) values expected in the sequence), security may be increased by reducing the size of—or completely eliminating—this forward window. Therefore, in some embodiments the third encrypted message is validated only if it contains the next variable code value in the sequence. If the third message is validated, the second device performs 418 the requested action associated with activation of the first device. If the second device is unable to validate the third message, the second device ends the process without performing the requested action and returns to awaiting 402 signals from the first device.

Figure 5A:
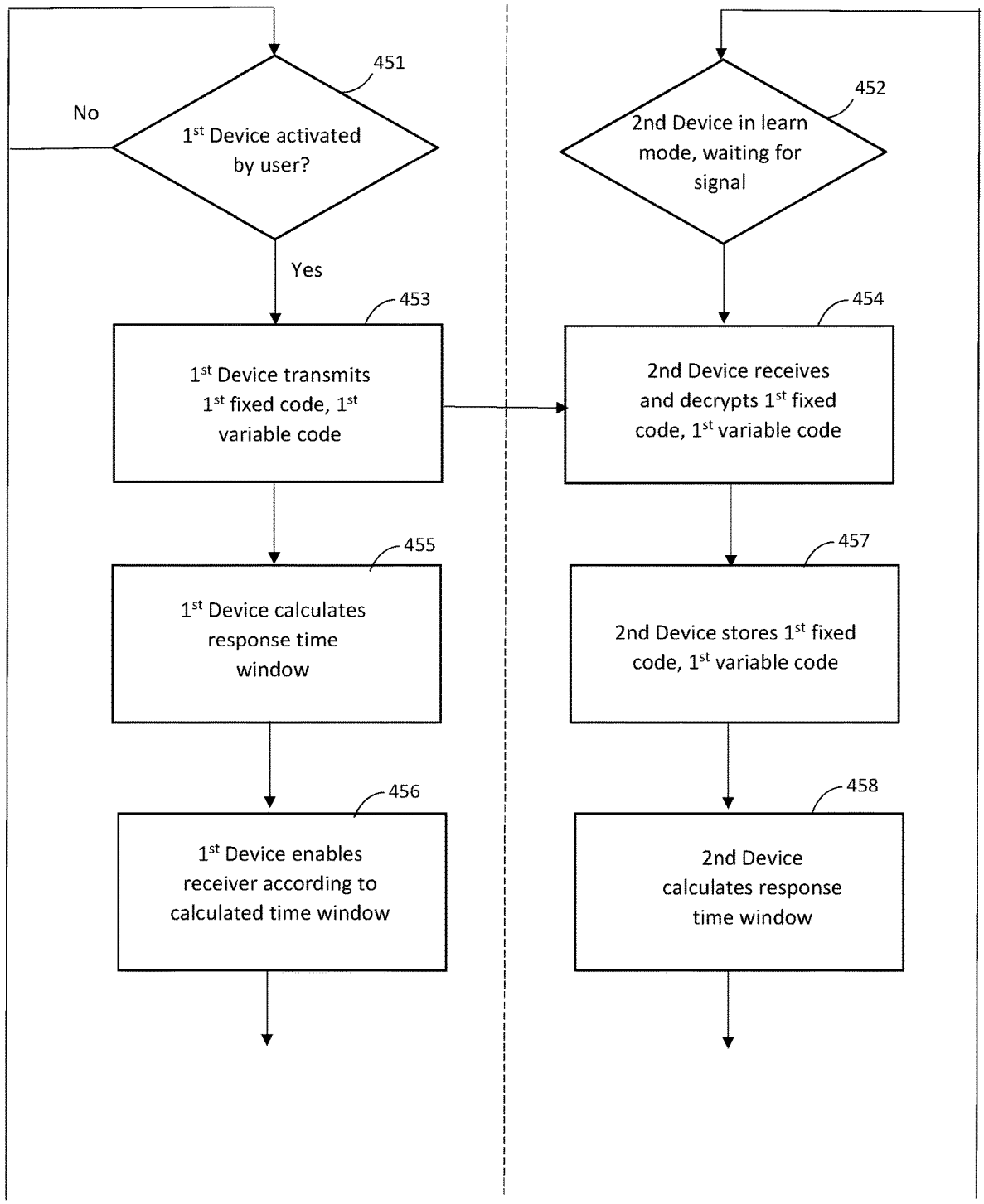
FIGS. 5A-C are flow diagrams showing an example communication flow between a first device and a second device during a learning or pairing sequence.
Figure 5B:
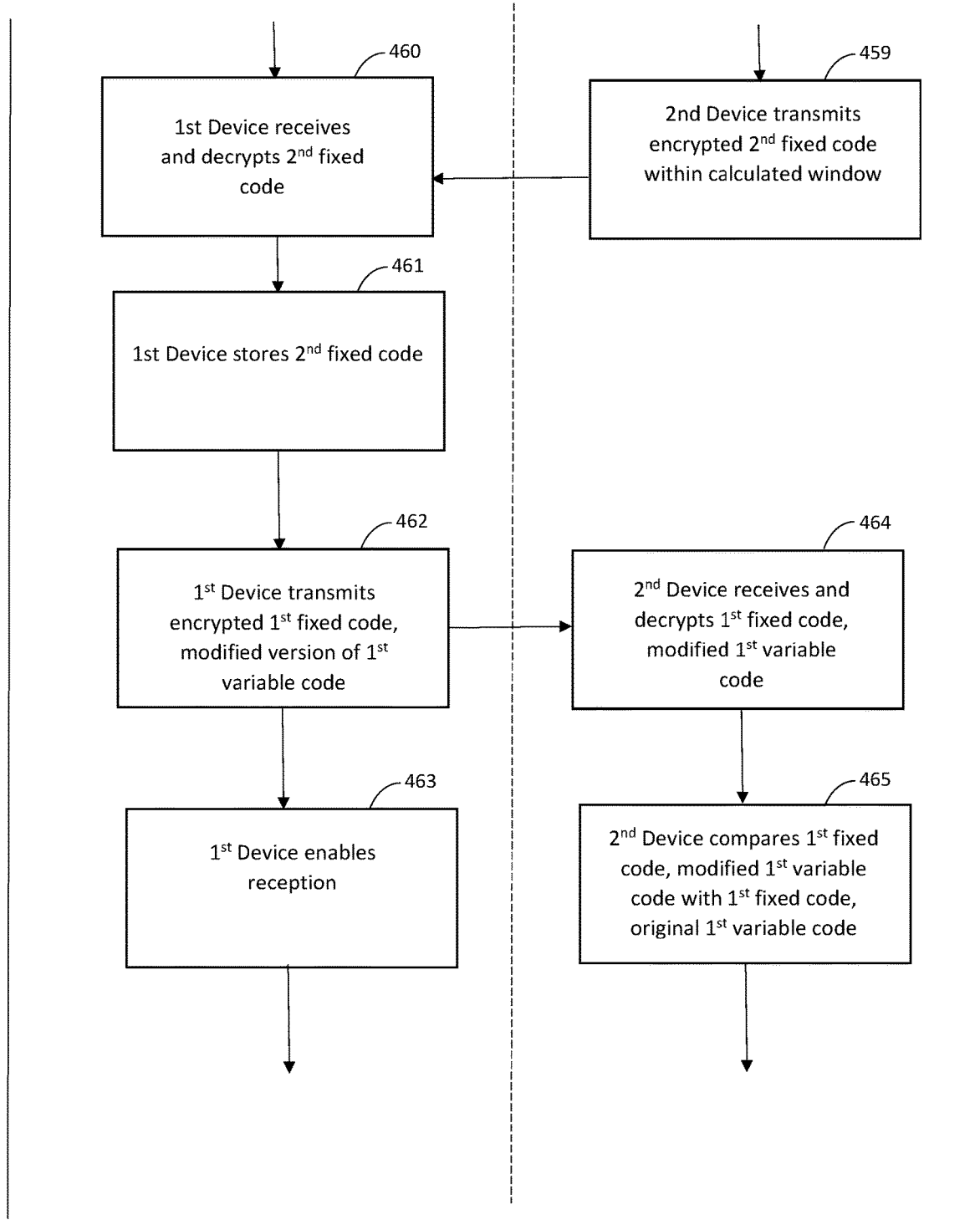
Figure 5C:
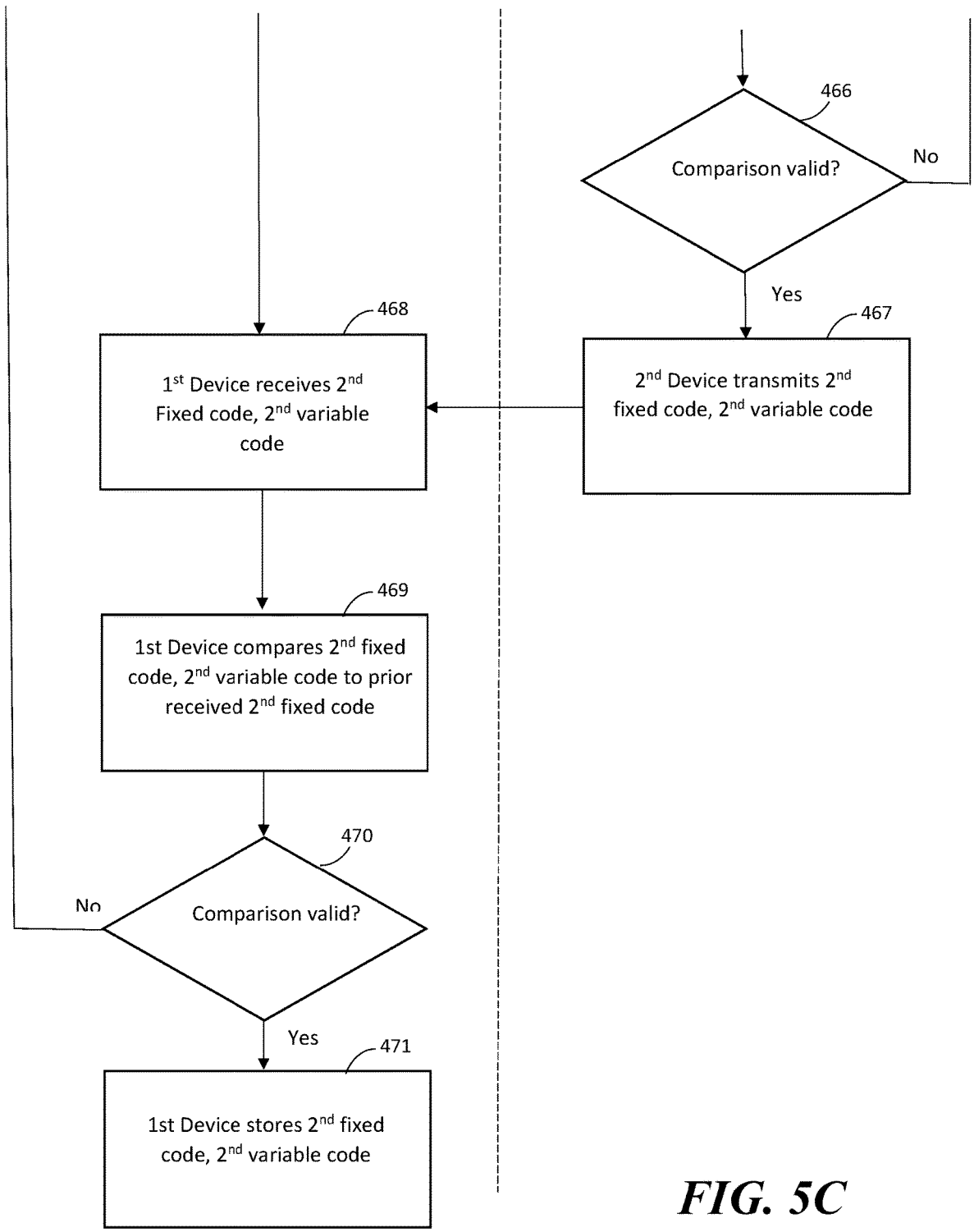

Turning now to FIGS. 5A-C, a flow diagram illustrates an example method of pairing a first device to a second device so that, for example, a user-actuated device and an operator device are synchronized in order to recognize and validate signals shared between the devices. The first device may be the transceiver 30 and the second device may be the operator 12 discussed previously. The method involves at least one of the devices learning a changing code sequence from the other device, and in some embodiments, may involve bi-directional learning so that each device receives and stores a series of fixed and changing code values from the other device. In some embodiments, the devices may be configured so that the method of pairing entails a button or other actuator being manipulated on each device, such as pressing a button on a garage door operator to set the device in learn mode and then pressing a button on the remote control device to initiate the pairing process.

In one form, the pairing method begins when a first device is activated 451 by a user while a second device has been placed 452 in "learn" mode, such as by pressing a button or switching a lever on or associated with the second device. To begin, the first device contains within its memory a first fixed code and a first variable code, and the second device contains a second fixed code and a second variable code. When the first device is activated, it transmits 453 from the first device a first encrypted message that includes at least a first fixed code and a first changing or variable code, and determines 455 based on at least a portion of the first encrypted message a time window in which to expect a response from the second device. A first device receiver is enabled 456 during the time window to receive the response from the second device. The second device, meanwhile, receives 454 the first encrypted message while the second device is in the learn mode and stores 457 in the second device's memory the decrypted first fixed and first variable codes from the first encrypted message or portions thereof. The second device determines 458 a time window, based on the first encrypted message, in which to transmit a response. The second device then transmits 459 the response within the time window, the response comprising a second encrypted message including a second fixed code from the second device. If the second encrypted message is received 460 by the first device within the time period calculated for response by the first device, the second message is decrypted and the first device stores 461 the second fixed code. If the response from the first device is not received within the time window, the message is ignored and the pairing process ceases.

After receiving within the time window the response from the second device and storing associated values, the first device then transmits 462 a third encrypted message including at least the first fixed code and a changed version of the first variable code. The first device also enables 463 a receiver of the first device in anticipation of receiving further communications from the second device. In some embodiments, this step of enabling 463 reception in the first device may include an associated time window derived from the third message.

When the second device receives 464 and decrypts the third encrypted message, the second device validates the message by comparing 465 the first fixed code and the changed versions of the first variable code to stored code values from the first encrypted message. If the second device determines 466 that the comparison is valid, the second device then transmits 467 in response to validating the third encrypted message a fourth encrypted message including the second fixed code and a second changing code from the memory of the second device.

The first device receives 468 the fourth encrypted message and validates the fourth message by comparing 469 the second fixed code and the second changing code to the response stored by the first device. If the fourth message is determined 470 to be valid, the first device stores 471 the second fixed code and the second changed version of the second variable code in response to validating the fourth encrypted message.

The variable or changing codes transmitted by the first and second devices may be selected from those known in the art, such as rolling code systems in which the changing code is modified based on a preset algorithm and/or a predefined list or sequence of numbers. When a device validates a changing code by comparison with stored values, the device will ordinarily compare the received code value to a number expected subsequent values in order to account for activations of one device that are out of range of the other device or otherwise do not result in communication with the other device. For instance, in some embodiments a device will compare a received changing code to at least twelve stored values, and in some embodiments at least 24, 48, 96, 128, or 256 stored values.

A variety of methods and/or algorithms may be used to encrypt and/or decrypt the fixed and changing codes of each message transmitted between devices. In some forms, a first device transmits an encrypted signal by generating a radio frequency oscillatory signal, generating variable binary code, generating a three-valued/trinary code responsive to the variable binary code, and modulating the radio frequency oscillatory signal with the trinary code to produce a modulated trinary coded variable radio frequency signal for operation or control of a second device. To provide even further security, in some embodiments the fixed code and the rolling codes may be shuffled or interleaved so that alternating trinary bits are comprised of a fixed code bit and a rolling code bit to yield, for example, a total of 40 trinary bits. The 40 trinary bits may then be packaged in a first 20-trinary bit frame and a second 20-trinary bit frame. A single synchronization and/or identification pulse may proceed the first and second frames to indicate the start of the frame and whether it is the first frame or the second frame. Signals may be configured to comply with local laws and regulations; for instance, immediately following each of the frames, the first device may be placed into a quieting condition to maintain the average power of the transmitter over a typical 100 millisecond interval and within local regulations (e.g. within legal limits promulgated by the United States Federal Communications Commission). The first trinary frame and the second trinary frame may be used to modulate a radio frequency carrier, for instance via amplitude modulation, to produce an amplitude modulated encrypted signal. The amplitude modulated encrypted signal may then be transmitted and may be received by the second device.

In some embodiments, the second device receives the amplitude modulated encrypted signal and demodulates it to produce a pair of trinary bit encoded frames. The trinary bits in each of the frames may be converted substantially in real-time to 2-bit or half nibbles indicative of the values of the trinary bits which ultimately may be used to form two 16-bit fixed code words and two 16-bit variable code words. The two 16-bit fixed code words may be used as a pointer to identify the location of a previously stored variable code value within the operator. The two 16-bit rolling code words may be concatenated by taking the 16-bit words having the more significant bits, multiplying it by 310 and then adding the result to the second of the words to produce a 32-bit encrypted variable code. The 32-bit encrypted code may then be compared via a binary subtraction with the stored variable code. If the 32-bit code is within a window or fixed count, the microprocessor of the second device may produce an authorization signal which may then be responded to by other portions of the second device's circuit to cause the garage door to open or close as commanded. In the event that the code is greater than the stored rolling code, plus the fixed count, indicative of a relatively large number of incrementations, a user may be allowed to provide further signals or indicia to the receiver to establish authorization, instead of being locked out, without any significant degradation of the security. This process may be accomplished by the receiver entering an alternate mode using two or more successive valid codes to be received, rather than just one. If the two or more successive valid codes are received in this example, the operator will be actuated and the garage door will open. However, in such an embodiment, to prevent a person who has previously or recently recorded a recent valid code from being able to obtain access to the garage, a trailing window is compared to the received code. If the received code is within this trailing window, the response of the system simply is to take no further action, nor to provide authorization during that code cycle due to indications that the code has been purloined.

Figure 6:
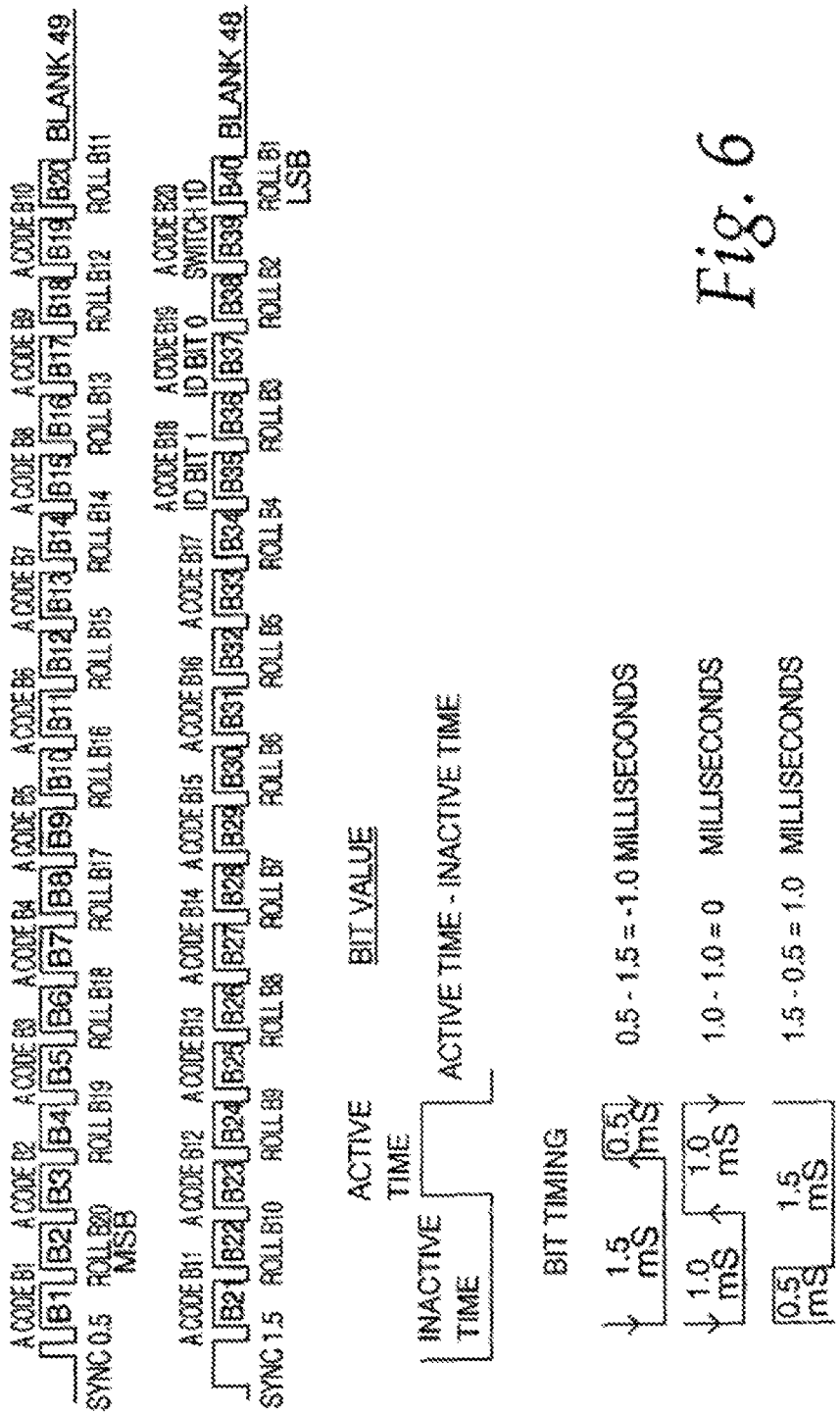
FIG. 6 is a timing diagram of examples of signals generated by a portion of a transmitter of one of the first and second devices.

FIGS. 6-8 demonstrate one potential encryption/decryption scheme. FIG. 6 is an example of trinary code which is actually used to modify the radio frequency oscillator signal. In the depicted example, the bit timing for a 0 is 1.5 milliseconds down time and 0.5 millisecond up time, for a 1, 1 millisecond down and 1 millisecond up, and for a 2, 0.5 millisecond down and 1.5 millisecond up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

Figure 7A:
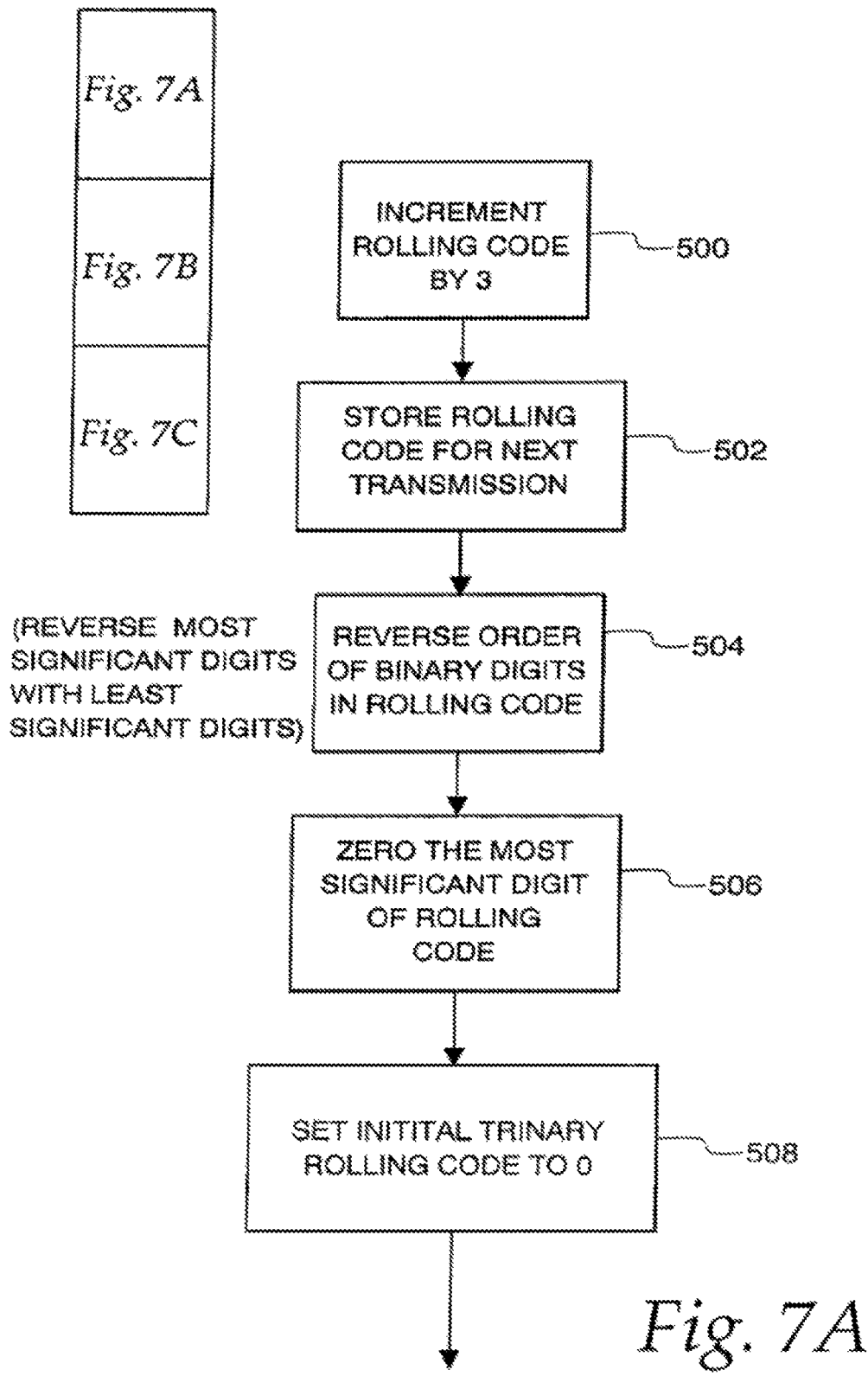
Figure 7B:
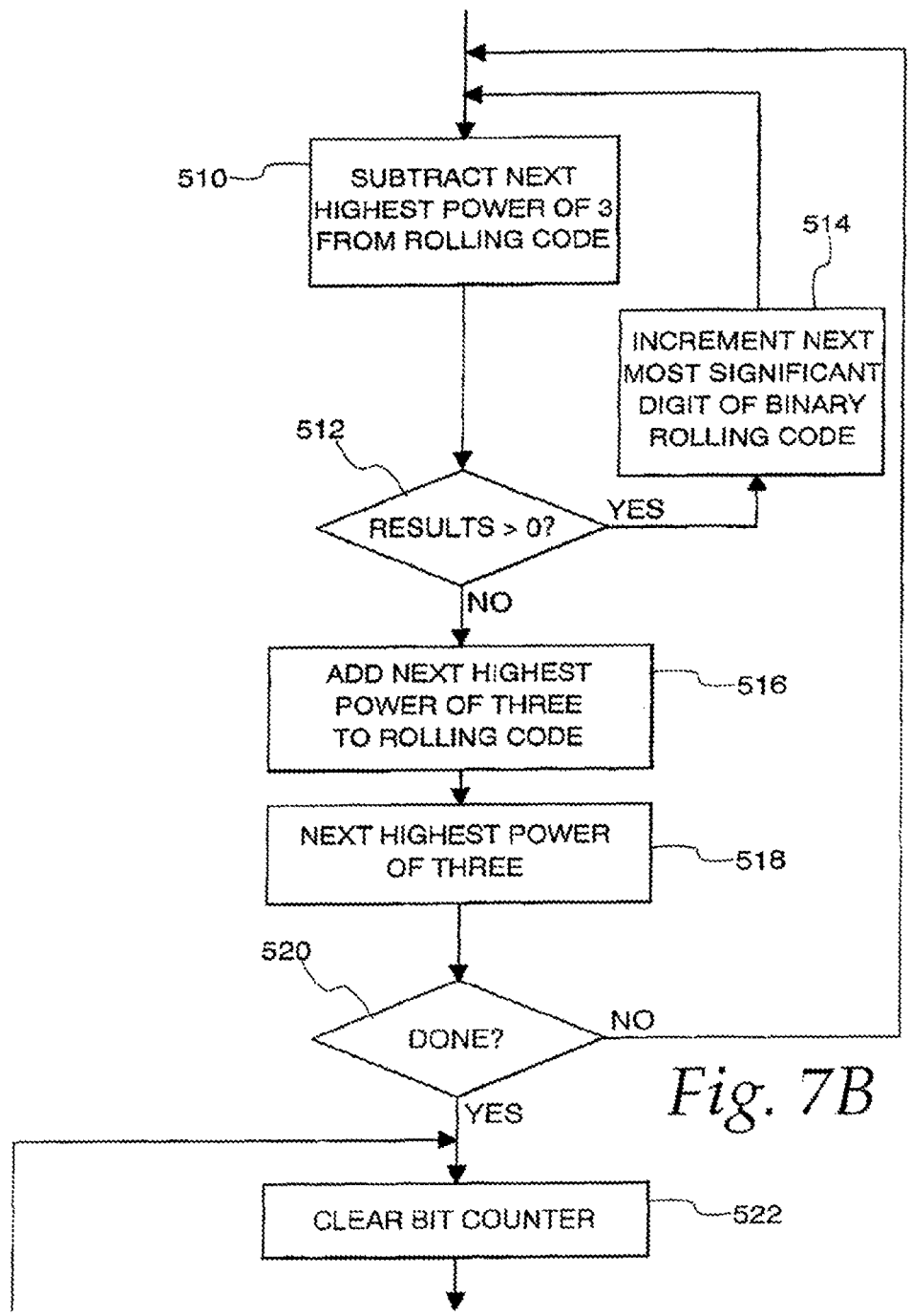

Referring now to FIGS. 7A through 7C, the flow chart set forth therein describes one form of generating a rolling code encrypted message from a first device to be transmitted to a second device. A rolling code is incremented by three in a step 500, followed by the rolling code being stored 502 for the next transmission from the device when a button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code bit is set to 0. In some forms, the trinary code is actually used to modify the radio frequency oscillator signal, and an example of trinary code is shown in FIG. 6. It may be noted that the bit timing in FIG. 6 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated or transmitted. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is greater than zero. If it is, the next most significant digit of the binary rolling code is incremented in a step 514, following which the method returns to the step 510. If the result is not greater than 0, the next highest power of 3 is added to the rolling code in step 516. In step 518, another highest power of 3 is incremented and in a step 518, another highest power of 3 is incremented and in a step 520, a test is determined as to whether the rolling code is completed. If not, control is transferred back to step 510. If the rolling code is complete, step 522 clears the bit counter. In a step 524, a blank timer is tested to determine whether it is active or not. If not, the bit counter is incremented in step 532. However, if the blank timer is active, a test is made in step 526 to determine whether the blank timer has expired. If the blank timer has not expired, control is transferred to a step 528 in which the bit counter is incremented, following which control is transferred back to the decision step 524. If the blank timer has expired as measured in decision step 526, the blank timer is stopped in a step 530 and the bit counter is incremented in a step 532. The bit counter is then tested for odd or even in a step 534. If the bit counter is not even, control is transferred to a step 536 where the output bit of the bit counter divided by 2 is fixed. If the bit counter is even, the output bit counter divided by 2 is rolling in a step 538. The bit counter is tested to determine whether it is set to equal to 80 in a step 540—if yes, the blank timer is started in a step 542, but if not, the bit counter is tested for whether it is equal to 40 in a step 544. If it is, the blank timer is tested and is started in a step 546. If the bit counter is not equal to 40, control is transferred back to step 522.

Figure 8A:
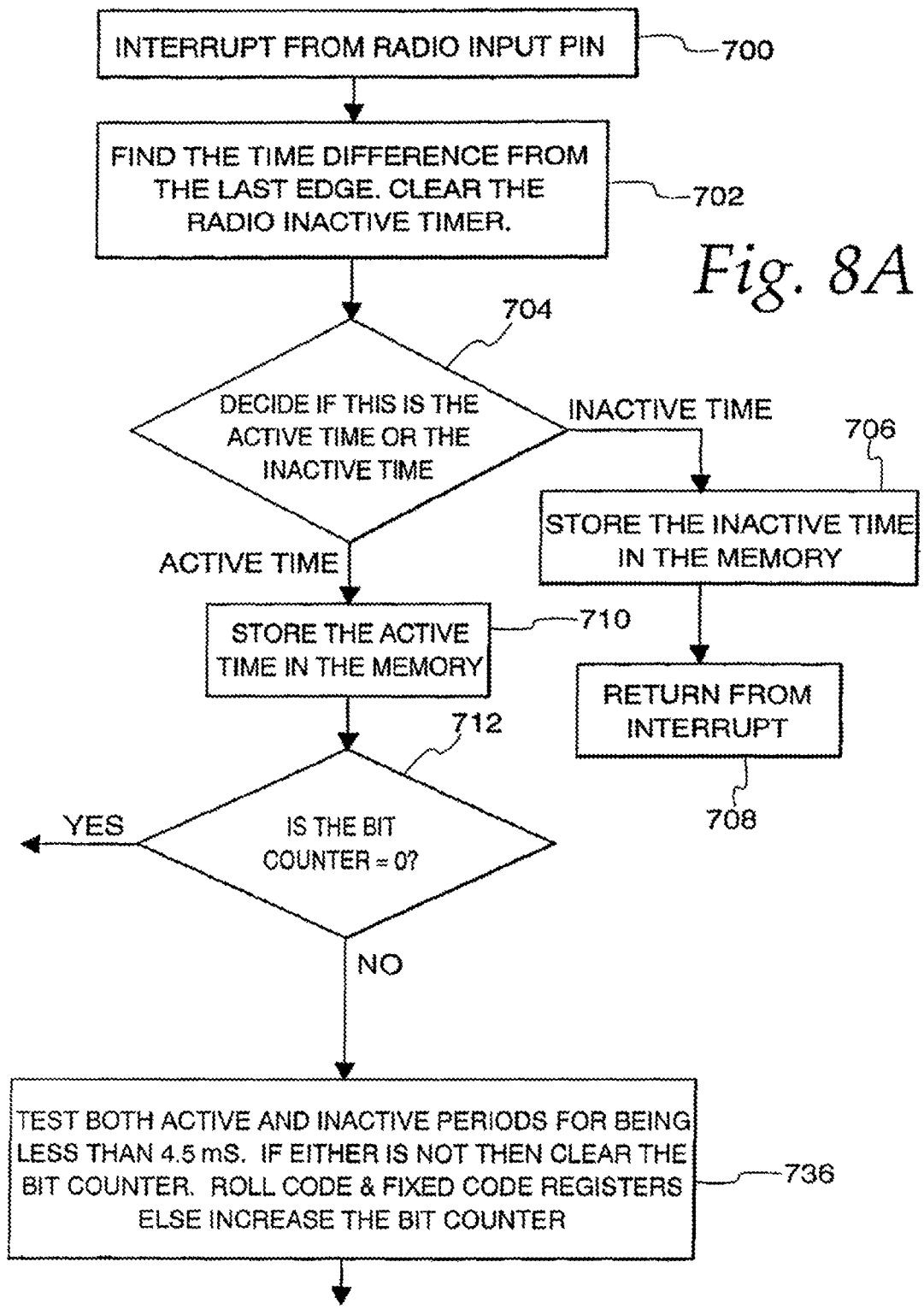
Figure 8B:
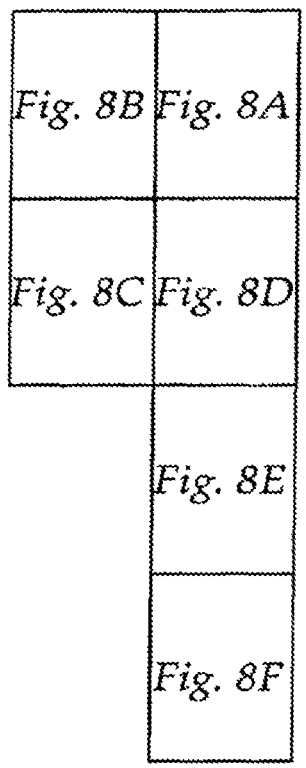
Figure 8B:
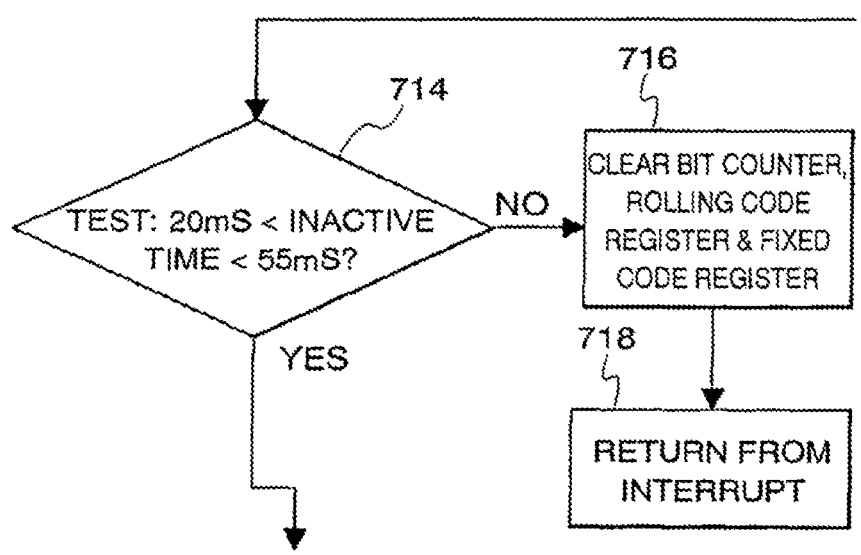

Referring now to FIGS. 8A through 8F and, in particular, to FIG. 8A, one example of processing of an encrypted message by a second device from a first device is set forth therein. In a step 700, an interrupt is detected and acted upon. The time difference between the last edge is determined and the radio inactive timer is cleared in step 702. A determination is made as to whether this is an active time or inactive time in a step 704, i.e., whether the signal is being sent with carrier or not. If it is an inactive time, indicating the absence of carrier, control is transferred to a step 706 to store the inactive time in the memory and the routine is exited in a step 708. In the event that it is an active time, the active time is stored in memory in a step 710 and the bit counter is tested in a step 712. If the bit counter is zero, control is transferred to a step 714, as may best be seen in FIG. 8B and a test is made to determine whether the inactive time is between 20 milliseconds and 55 milliseconds. If it is not, the bit counter is cleared as well as the rolling code register and the fixed code register in step 716 and the routine is exited in step 718.

Figure 8C:
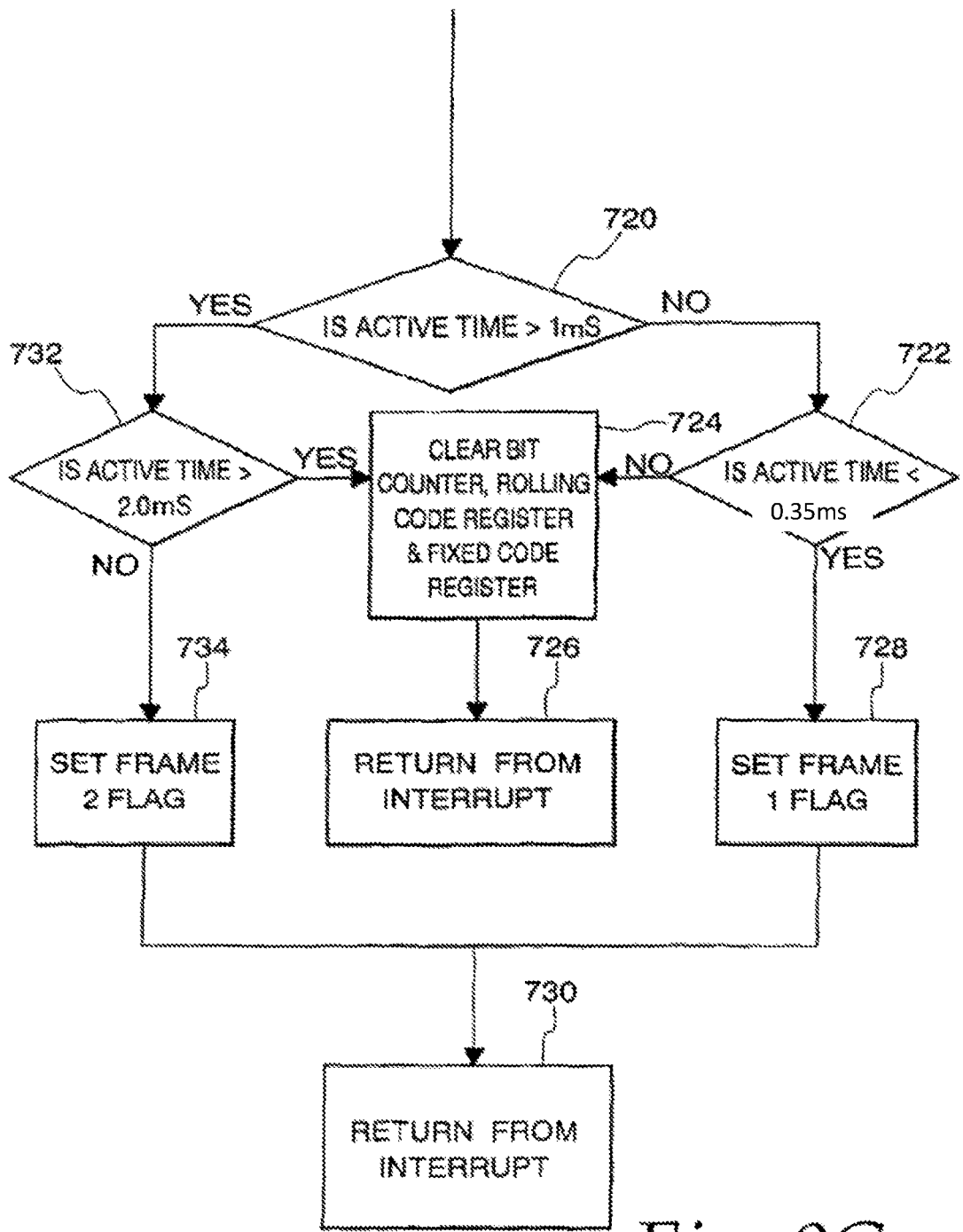

In the event that the inactive time is between 20 milliseconds and 55 milliseconds, a test is made in a step 720 to determine whether the active time is greater than 1 millisecond, as shown in FIG. 8C. If it is not, a test is made in a step 722 to determine whether the inactive time is less than 0.35 millisecond. If it is, a frame 1 flag is set in a step 728 identifying the incoming information as being associated with frame 1 and the interrupt routine is exited in a step 730. In the event that the active time test in step 722 is not less than 0.35 millisecond, in the step 724, the bit counter is cleared as well as the rolling code register and the fixed register, and the return is exited in the step 726. If the active time is greater than 1 millisecond as tested in step 720, a test is made in a step 732 to determine whether the active time is greater than 2.0 milliseconds, and if not the frame 2 flag is set in a step 734 and the routine is exited in step 730. If the active time is greater than 2 milliseconds, the bit counter rolling code register and fixed code register are cleared in step 724 and the routine is exited in step 726.

Figure 8D:
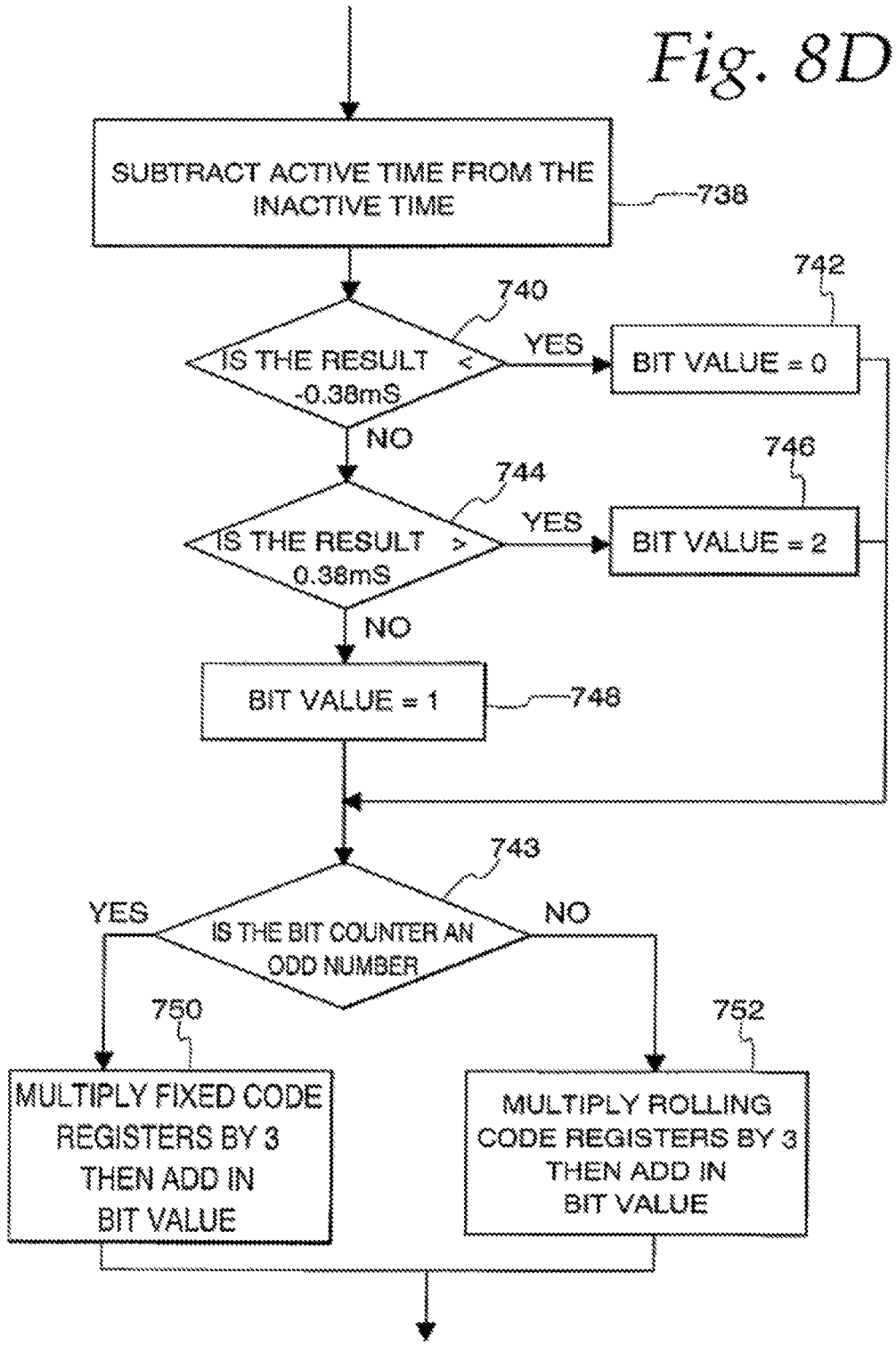

In the event that the bit counter test in step 712 indicates that the bit counter is not 0, control is transferred to setup 736, as shown in FIG. 8A. Both the active and inactive periods are tested to determine whether they are less than 4.5 milliseconds. If either period is not less than 4.5 milliseconds, the bit counter is cleared as well as the rolling code register and the fixed code registers. If both are equal to or greater than 4.5 milliseconds, the bit counter is incremented and the active time is subtracted from the inactive time in the step 738, as shown in FIG. 8D. In the step 740, the results of the subtraction are determined as to whether they are less than 0.38 milliseconds. If they are the bit value is set equal to zero in step 742 and control is transferred to a decision step 743. If the results are not less than 0.38 milliseconds, a test is made in a step 744 to determine if the difference between the active time and inactive time is greater than 0.38 milliseconds and control is then transferred to a step 746 setting the bit value equal to 2. Both of the bit values being set in steps 742 and 746 relate to a translation from the three-level trinary bits 0, 1 and 2 to a binary number.

If the result of the step 744 is in the negative, the bit value is set equal to 1 in step 748. Control is then transferred to the step 743 to test whether the bit counter is set to an odd or an even number. If it is set to an odd number, control is transferred to a step 750 where the fixed code, indicative of the fact that the bit is an odd numbered bit in the frame sequence, rather an even number bit, which would imply that it is one of the interleaved rolling code bits, is multiplied by three and then the bit value added in.

Figure 8F:
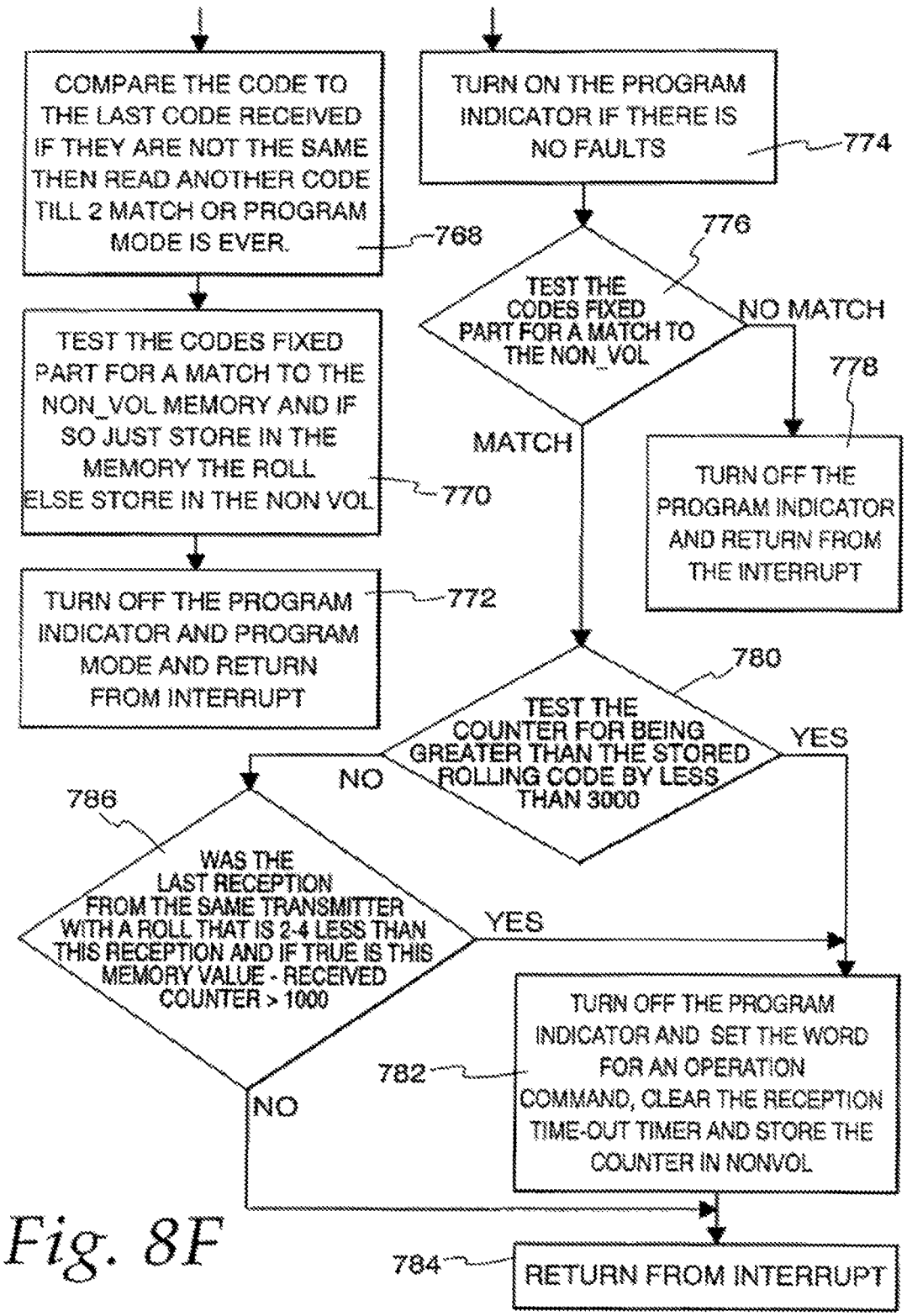

If the bit counter indicates that an odd number trinary bit is being processed, the existing rolling code registers are multiplied by three and then the trinary bit value obtained from steps 742, 746 and 748 is added in. Whether step 750 or 752 occurs, the bit counter value is then tested in the step 754, as shown in FIG. 8E. If the bit counter value is greater than 21, the bit counter rolling code register and fixed code register are cleared in the step 758 and the routine is exited. If the bit counter value is less than 21, there is a return from the interrupt sequence in a step 756. If the bit counter value is equal to 21, indicating that a sink bit plus trinary data bits have been received, a test is made in a step 760 to determine whether the sink bit was indicative of a first or second frame, if it was indicative of a first frame, the bit counter is cleared and set up is done for the second frame following which there is a return from the routine in the step 762. In the event that the second frame is indicated as being received by the decision of step 760, the two frames have their rolling contributions added together to form the complete inverted rolling code. The rolling code is then inverted or mirrored to recover the rolling code counter value in the step 764. A test is made in the step 766 to determine whether the program mode has been set. If it has been set, control is transferred to a step 768 where the code is compared to the last code received. If there is no match, then another code will be read until two successive codes match or the program mode is terminated. In a step 770, the codes are tested such that the fixed codes are tested for a match with a fixed code non-volatile memory. If there is a match, the rolling portion is stored in the memory. If there is not, the rolling portion is stored in the non-volatile memory. Control is then transferred to step 772, the program indicator is switched off, the program mode is exited and there is a return from the interrupt. In the event that the test of step 766 indicates that the program mode has not been set, the program indicator is switched on in a step 774, as shown in FIG. 8F. The codes are tested to determine whether there is a match for the fixed portion of the code in the step 776. If there is no match, the program indicator is switched off and the routine is exited in step 778. If there is a match, the counter which is indicative of the rolling code is tested to determine whether its value is greater than the stored rolling code by a factor or difference of less than 3,000 indicating an interval of 1,000 button pushes for the first device. If it is not, a test is made in the step 786 to determine whether the last transmission from the same first device is with a rolling code that is two to four less than the reception and, if true, is the memory value minus the received rolling code counter value greater than 1,000. If it is, control is transferred to a step 782 switching off the program indicator and setting the operation command word causing a commanded signal to operate the garage door operator. The reception time out timer is cleared and the counter value for the rolling code is stored in non-volatile memory, following which the routine is exited in the step 784. In the event that the difference is not greater than 1,000, in step 786 there is an immediate return from the interrupt in the step 784. In the event that the counter test in the step 780 is positive, steps 782 and 784 are then executed thereafter.

Figure 8G:
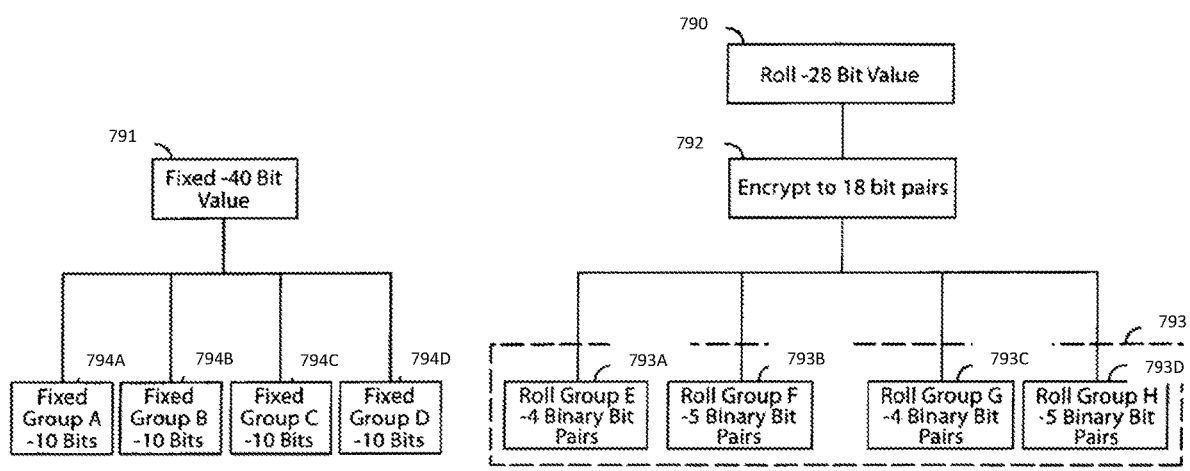
FIG. 8G is a schematic view of one example of bit processing for use in encrypting a message.
Figure 8H:
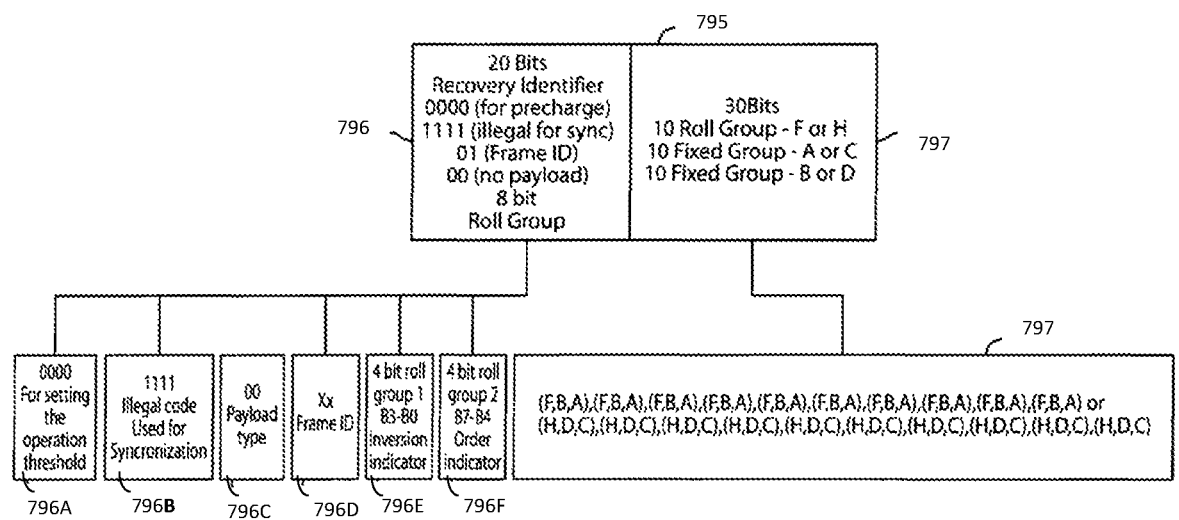
FIG. 8H is an example message diagram in accordance with one example of an encrypted message.

FIGS. 8G and 8H are schematic views of bit processing and parsing (FIG. 8G) and an example message diagram (FIG. 8H) configured in accordance with one example of forming an encrypted message. This provides one example in which a fixed code portion and variable (e.g. rolling) code portion may be used to form an encrypted message. Referring now to FIG. 8G, one illustrative embodiment of bit processing and parsing will be presented. In this example, the only substantive content to be associated and transmitted with a 28 bit rolling code 790 comprises a 40 bit value that represents fixed information 791. This fixed information 791 may serve, for example, to uniquely identify the transmitter that will ultimately transmit this information. In this embodiment, the bits comprising the rolling code 790 are encrypted 792 by mirroring the bits and then translating those mirrored bits into ternary values as suggested above to provide corresponding bit pairs (in this example, this would comprise 18 such bit pairs) to thereby provide a resultant encrypted rolling code 793. This mirroring can be applied to specific groupings of bits in the rolling code creating mirrored groups or can involve the entire value. In this illustrative example, the encrypted rolling code 793 is presented for further processing as four groups. In this example, these four groups comprise a roll group E 793A comprised of four binary bit pairs, a roll group F 793B comprised of five binary bit pairs, a roll group G 793C comprised of four binary bit pairs, and a roll group H 793D comprised of five binary bit pairs.

The 40 bit fixed information 791 is subdivided in a similar manner albeit, in this embodiment, sans encryption. This comprises, in this particular illustrative approach, forming four subgroups comprising a fixed group A 794A, a fixed group B 794B, a fixed group C 794C, and a fixed group D 794D, wherein each such group is comprised of 10 bits of the original 40 bit value.

These variously partitioned data groups can then be used as shown in FIG. 8H to effect a desired transmission. In this example, one or more joint messages 795 provide a primary vehicle by which to communicate the desired information (which includes both the encrypted rolling code and fixed information data as modified as a function of a given portion of the encrypted rolling code along with a recovery identifier that represents that given portion of the encrypted rolling code). This joint message 795 comprises, generally speaking, a first 20 bit portion 796 and a second 30 bit portion 797.

The first portion 796 comprises, in this embodiment, the following fields: "0000"—these bits 796A serve to pre-charge the decoding process and effectively establish an operational threshold; "1111"—these bits 796B comprise two bit pairs that present the illegal state "11" ("illegal" because this corresponds to a fourth unassigned state in the ternary context of these communications) and serve here as a basis for facilitating synchronization with a receiving platform; "00"—this bit pair 796C identifies a type of payload being borne by the joint message (in this embodiment, "00" corresponds to no payload other than the fixed identifying information for the transmitter itself, "01" corresponds to a supplemental data payload, and "10" corresponds to a supplemental data-only payload—further explanation regarding these payload types appears further below); "Xx"—this bit pair 796D presents a frame identifier that can be used by a receiver to determine whether all required joint messages 795 have been received and which can also be used to facilitate proper reconstruction of the transmitted data; "B3, B2, B1, B0"—these two bit pairs 796E comprise an inversion pattern recovery identifier and are selected from the bits that comprise the encrypted rolling code 793 described above; "B7, B6, B5, B4"—these two bit pairs 796F comprise a bit order pattern recovery identifier and are also selected from the bits that comprise the encrypted rolling code 793 described above.

There are various ways by which these recover identifier values can be selected. By one approach, a specified number of bits from the encrypted roll group can be selected to form a corresponding roll sub-group. These might comprise, for example, the first or the last eight bits of the encrypted roll group (in a forward or reversed order). These might also comprise, for example, any eight consecutive bits beginning with any pre-selected bit position. Other possibilities also exist. For example, only even position bits or odd position bits could serve in this regard. It would also be possible, for example, to use preselected bits as comprise one or more of the previously described roll group sub-groups.

It would also be possible to vary the selection mechanism from, for example, joint message to joint message. By one simple approach in this regard, for example, the first eight bits of the encrypted roll group 793 could be used to form the roll sub-group with the last eight bits of the encrypted roll group 793 being used in a similar fashion in an alternating manner. The bits that comprise this roll sub-group may then be further parsed to form two recovery indicators. These recovery indicators may be used in conjunction with one or more lookup tables to determine a data bit order pattern to use with respect to formatting the data as comprises the a portion of the joint message. In some embodiments, roll groups used to form the recovery indicators do not appear in the joint message.

Figure 9A:
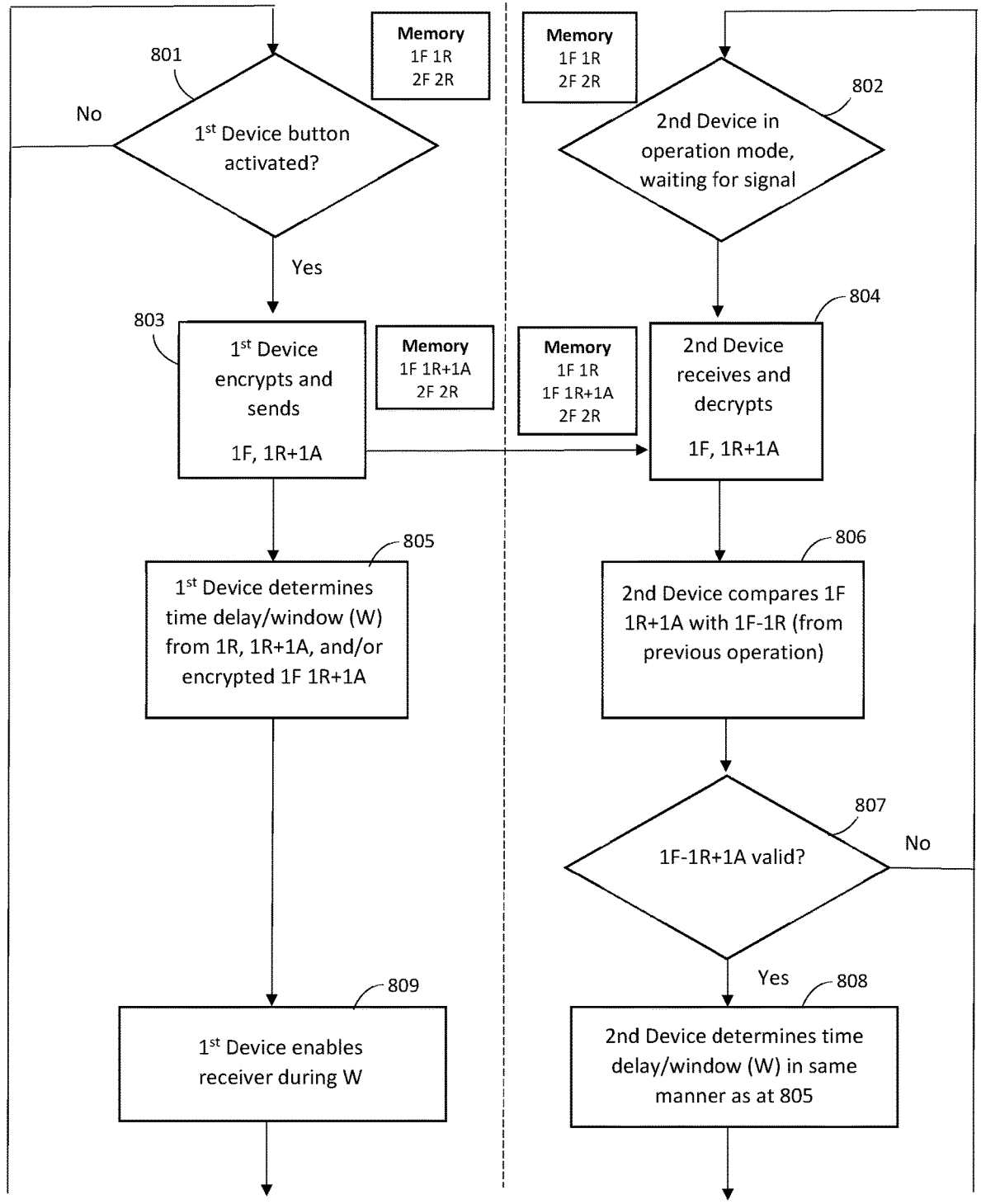
FIGS. 9A-C are flow diagrams showing another example communication flow between a first device and a second device during normal operation.
Figure 9B:
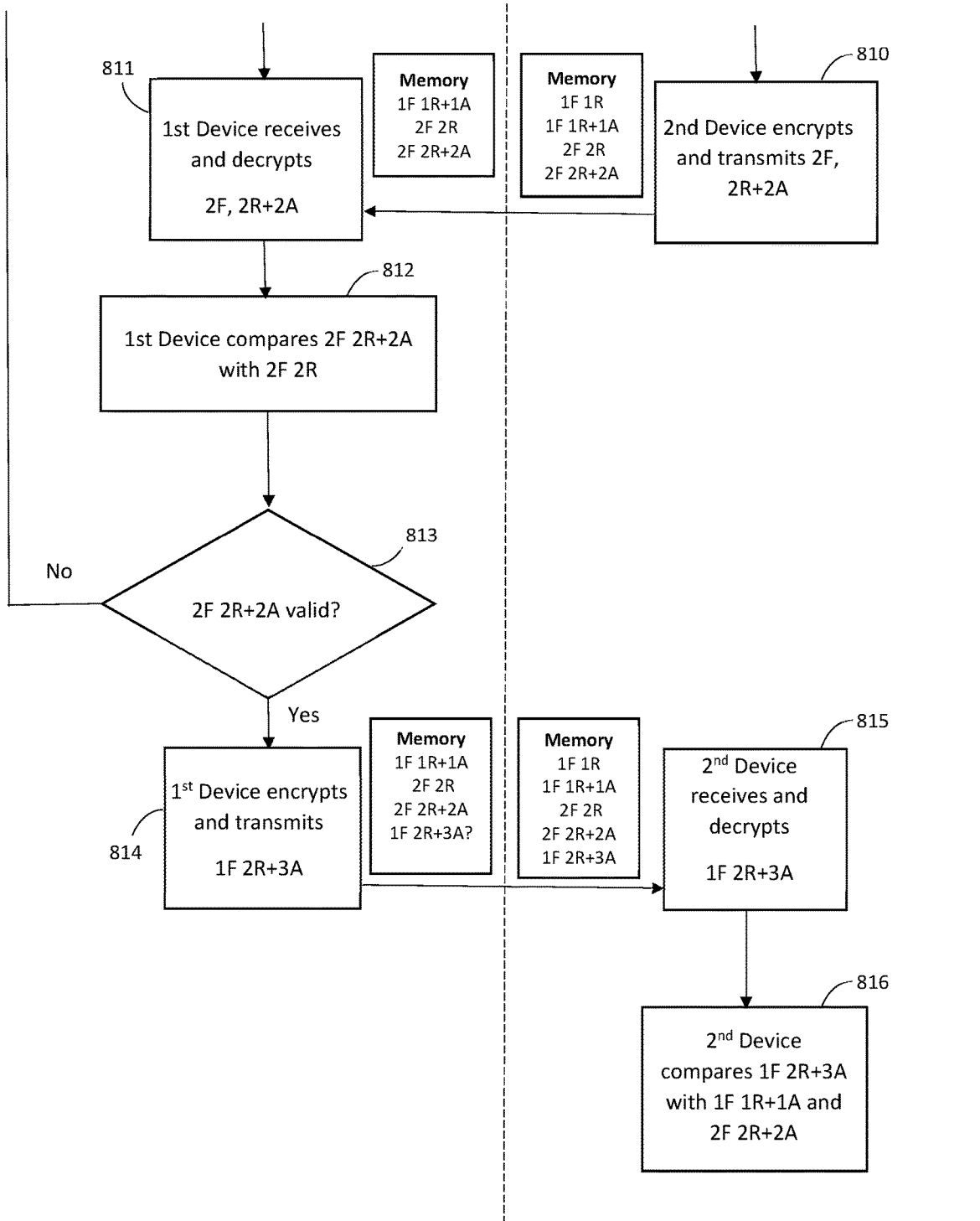
Figure 9C:
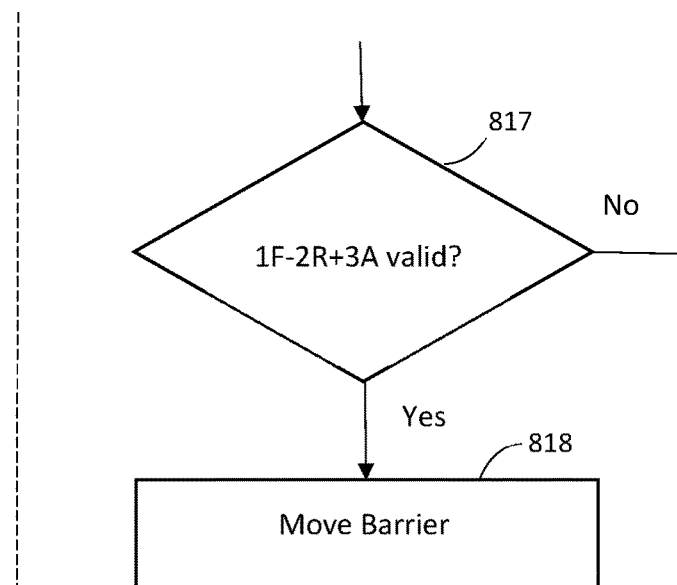

FIGS. 9A, 9B, and 9C are interconnected flow charts that demonstrate a more specific example of the process discussed above with respect to FIGS. 4A-C. In this example, a first device (such as a handheld or vehicle mounted transceiver) commands a second device (such as a garage door operator) to take an action through encrypted transmissions of rolling codes. Throughout FIGS. 9A-C, "1F" refers to a first fixed code, "1R" refers to a first rolling code, "2F" refers to a second fixed code unrelated to 1F, and "2R" refers to a second rolling code unrelated to 1R. "1A," "2A," and "3A" each refer to an "adder" that represents a value added to the rolling code or one or more rolls of the rolling code. 1A, 2A, and 3A may be the same or different.

Initially, the first and second devices both have stored in their memories a first fixed code and first variable code from the immediately previous operation involving the first device, as well as a second fixed code and second rolling code from the immediately previous operation involving the second device. When the first device is activated by a user in a manner intended to cause an action by the second device, such as by pressing an activation button (step 801), the first device creates a first message that includes a first fixed code corresponding to the first device (1F) and a first changed version of the first rolling code (1R+1A) representing the rolling code value from the previous operation as modified by a first change protocol (i.e. an algorithm that cycles through a specified number of codes in a sequence or calculates a new value from the initial rolling code value). The changed code (1F 1R+1A) is stored in the memory of the first device, and is also encrypted using one or more encryption methods for transmittal to the second device (step 803). At this point, the initial value of the rolling code (1R) may be optionally deleted from the device memory. The first device also determines 805 a time window (W) or delay in which it expects to receive a response. The time window (W) may be determined from one or both of the rolling code values (1R and/or 1R+1A) or a portion thereof, or from the encrypted message or a portion thereof. For instance, the 1R+1A may include a time within a specific portion of its sequence or the first device may apply an algorithm to 1R+1A or one or more portions thereof in order to calculate a time value for W. For instance, the transmissional characteristics of recovery identifiers (e.g. 796E and/or 796F in FIG. 8H), a portion of the encrypted changing code portion (e.g. part of 797 in FIG. 8H), and/or a portion of the decrypted changing code value may determine the beginning and end of the time window. The time window W may represent a relative time period (e.g. beginning and end points at specific time intervals from a specific action such as the initial button press or the transmission of the first encrypted signal) or an absolute time period (e.g. based on time values according to a time device of the first device (or in communication with the first device) that is synchronized with a time device of the second device (or in communication with the second device)).

The second device, which is in operation mode and awaiting signals (step 802), receives the first encrypted message from the first device, decrypts the message to obtain the first fixed code and first variable code (1F 1R+1A), and stores the new value in its memory (step 804). The second device then compares the first fixed code and first variable code received from the first device (1F 1R+1A) to expected values based on stored code values (e.g. by applying the same algorithm used by the first device to previous first device values stored in the second device's memory (1F 1R)) (step 806). When comparing the received values with stored values, the second device will perform a validation step 807. If the fixed codes match and the received first rolling code (1R+1A) matches an expected value based on the stored rolling code (1R), the second device will continue to communicate with the first device. In order to account for accidental triggering of the first and/or second devices, use of multiple first devices with the second device, or other situations in which the rolling code received from the first device may not exactly match the expected value, this validation step preferably compares the received rolling code (1R+1A) to a set number of values from a series of values that fall within a sequence before and/or after the expected value (i.e. within a window of specified size around the expected value), and consider the message from the first device valid if the received rolling code matches any value within the series. In this way, activation of one device when not in range of the other will not completely desynchronize the two devices and render communication impossible. If the decrypted code values do not match the stored code values, the second device ignores the first message and returns to step 802.

If the received message is validated, the second device calculates 808 a response time window. As depicted in FIG. 9A, the second device calculates the same time window (W) in the same manner calculated by the first device at step 805. In other embodiments, the window or delay calculated at step 808 may be different, such as a shorter time window within W, or a single point in time that falls with W, and may even be calculated or determined from different portions of 1R, 1R+1A, and/or the encrypted message.

In response to validating the first encrypted message, and after determining the response time window, the second device transmits 810 a response within the calculated response time window. The response comprises a second encrypted message derived from a second fixed code (2F) corresponding to the second device and a second rolling code (2R+2A) that is independent from the first changing code and represents a modified version of the second changing code from the immediately previous operation (2R). These values are stored in the second device's memory, so that at this stage the second device memory contains the first fixed and variable code from the previous operation (1F 1R), the second fixed and variable code from the previous operation (2F 2R), the first fixed and variable code from the first encrypted message sent by the first device (1F 1R+1A), and the second fixed and variable code from the encrypted response (2F 2R+2A).

The first device enables a receiver during the time window determined by the first device (step 809) so that it is able to receive the encrypted response from the second device if the response reaches the first device within the determined time window (W). If the response is sent outside of W or for some other reason arrives at the first device outside of W, the response will be ignored because the first device receiver is inactive or programmed to ignore incoming signals. Assuming the response is received by the first device within W, the first device will decrypt the second encrypted message to determine the second fixed code and second rolling code (2F, 2R+2A) (step 811). These values (2, 2R+2A) are stored in the first device's memory, along with the second fixed and variable code from the previous operation (2F 2R) and the first fixed and variable code from the first encrypted message (1F 1R+1A).

The first device then compares the second fixed code and second rolling code (2F 2R+2A) with fixed and variable codes from a previous operation (2F 2R) stored in the memory of the first device (step 812). The first device will then perform a validation step (step 813) similar to the validation step performed by the second device at step 807. If the second fixed code matches the fixed code from the prior operation and the second variable code (2R+2A) matches the prior changing code as modified according to a set of established rules for the changing code, taking into account a predetermined accepted amount of error (e.g. forward-looking window), the response message is considered validated. If the second fixed and variable codes (2F 2R+2A) are determined valid (step 813), the first device generates a message including at least the first fixed code and a changed version of the second rolling code (1F 2R+3A) by applying an algorithm (which may be the same or different as the algorithm used at step 803 and/or step 810) to the rolling code value received from the second device (2R+2A), encrypts the message to create a third encrypted message, stores the new values in its memory, and transmits the third encrypted message to the second device (step 814). If the first device is unable to validate the response from the second device, the process ends and the first device returns to awaiting subsequent activation (801).

The second device receives and decrypts 815 the third encrypted message to determine the first fixed code and the changed version of the second variable code (1F 2R+3A). The second device then compares the fixed codes from the first and third encrypted transmissions to confirm that they were transmitted by the same first device, and the rolling code from the third encrypted message to an expected value based on the last stored second rolling code value (2R+2A from the second encrypted message) (step 816). In a validation step similar to those discussed above, the second device then determines 817 if the third encrypted message is valid. If the third message is validated, the second device performs 818 the requested action associated with activation of the first device. If the second device is unable to validate the third message, it ends the process without performing the requested action and returns to step 802 awaiting signals from the first device.

Figure 10A:
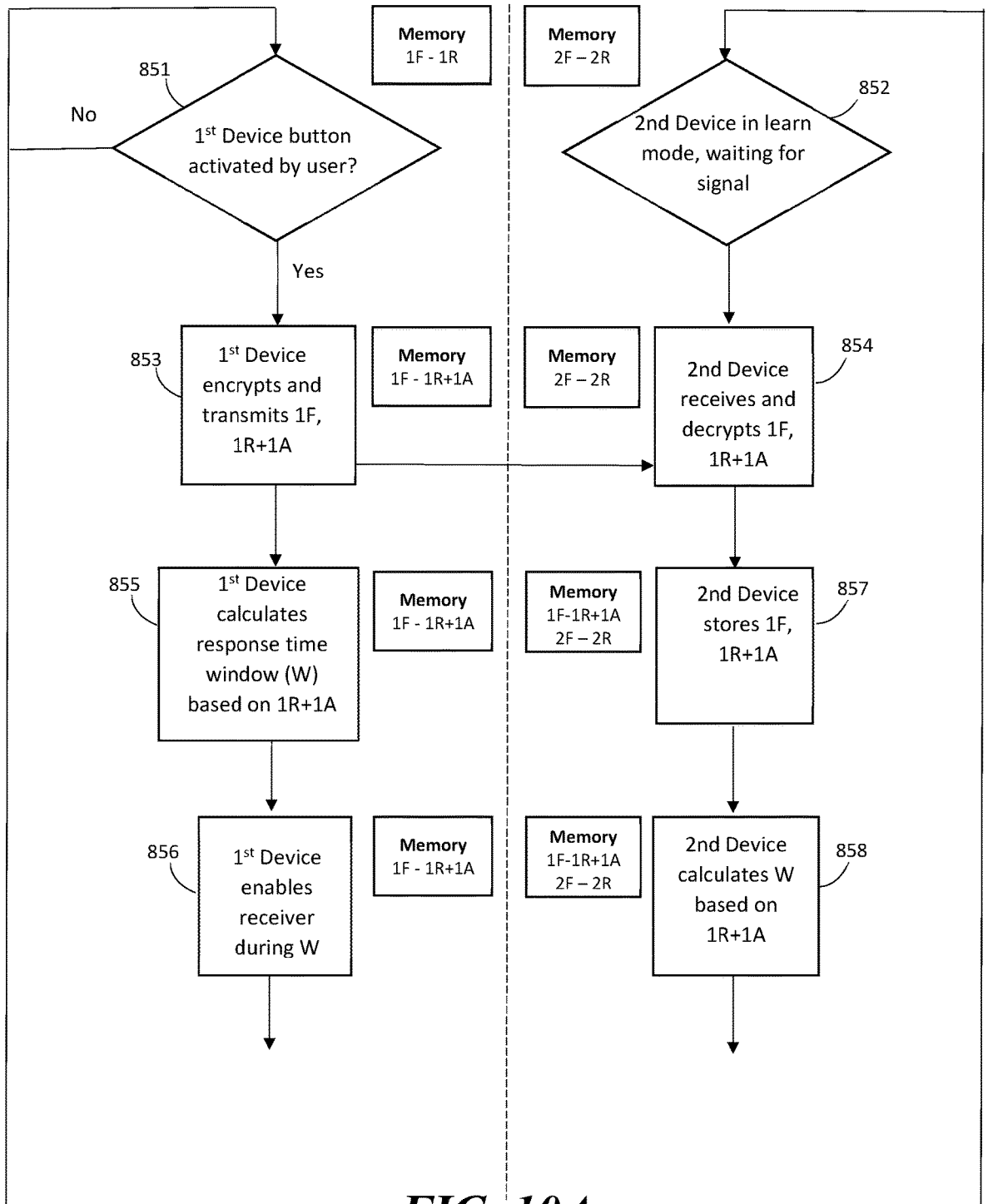
FIGS. 10A-C are flow diagrams showing another example communication flow between a first device and a second device during a learning or pairing sequence.
Figure 10B:
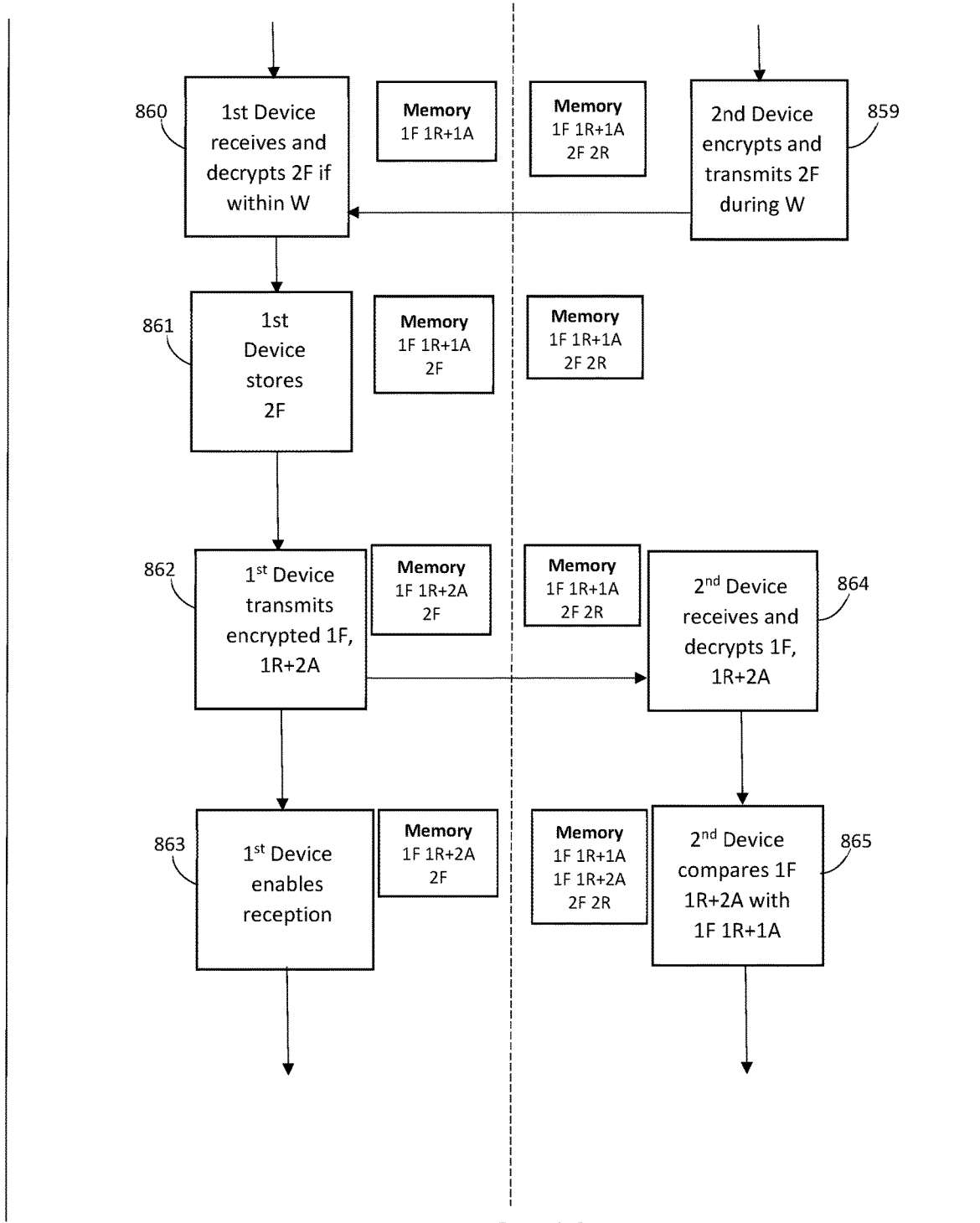
Figure 10C:
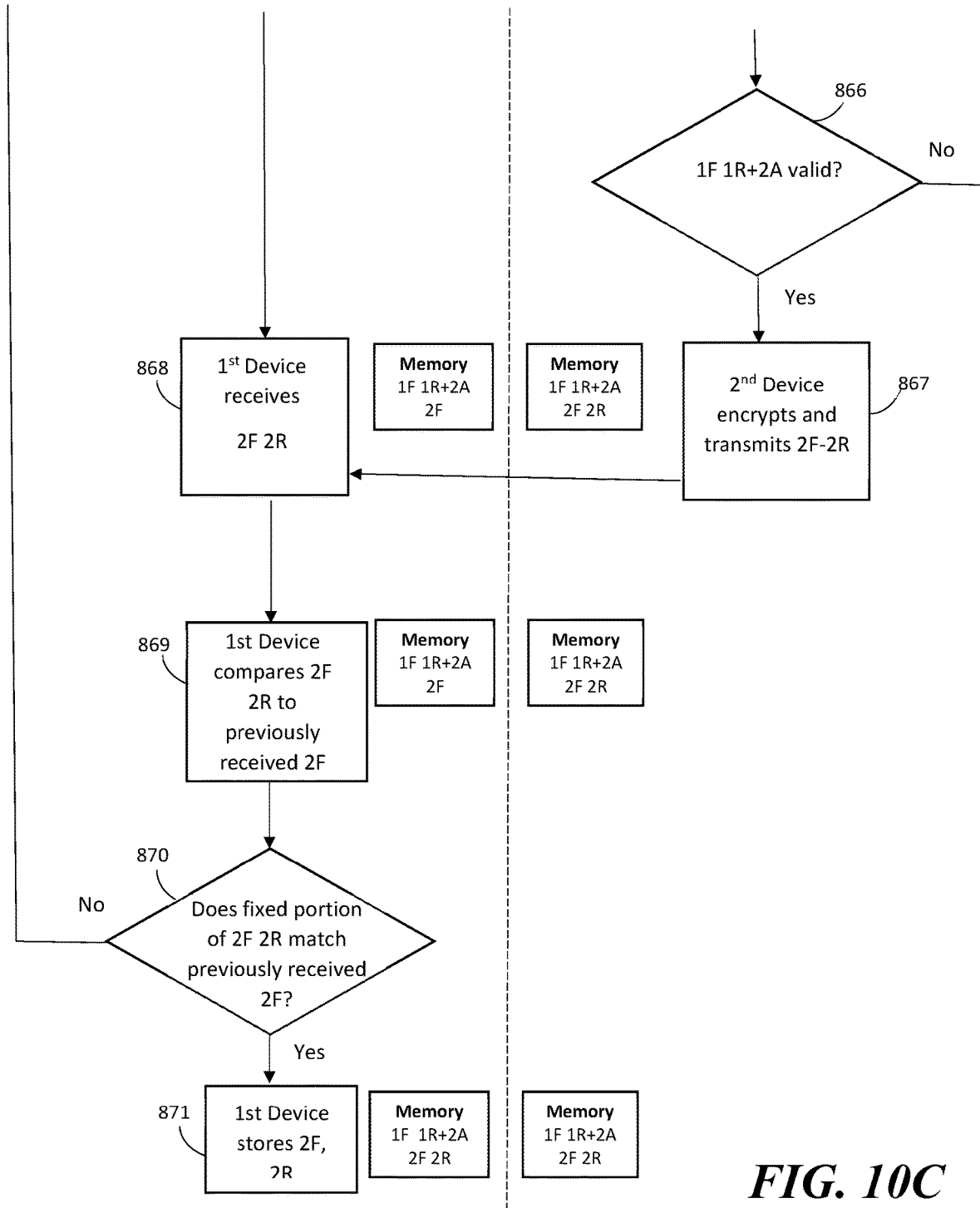

FIGS. 10A-C illustrate one example of a specific method of pairing a first device to a second device corresponding to the more general method illustrated in FIGS. 5A-C. In this example, a first device (e.g. a user-actuated device) and a second device (e.g. an operator device for carrying out a specific action) are synchronized in order to recognize and validate signals shared between the devices on both ends. Throughout FIGS. 10A-C, "1F" refers to a first fixed code, "1R" refers to a first rolling code, "2F" refers to a second fixed code unrelated to 1F, "2R" refers to a second fixed code unrelated to 1R. "1A," "2A," and "3A" each refer to an "adder" that represents a value added to the rolling code or one or more rolls of the rolling code. 1A, 2A, 3A may be the same or different. Each of these values are not necessarily the same as those in FIGS. 9A-C.

The pairing process begins when the first device is activated (such as by a user pressing a button on the device) (step 851) while a second device has been placed in "learn" mode (step 852) (e.g. by pressing a button or switching a lever associated with the second device). To begin, the first device contains within its memory a first fixed (1F) and first variable code (in this case rolling code 1R) that represent initial values or values from previous operation of the first device, and the second device contains a second fixed code (2F) and second variable code (in this case rolling code 2R) that represent initial values or values from previous operation. The fixed codes are each associated with and identify their respective devices, while the rolling codes are independent from one another. When the first device is activated, it generates a first encrypted message from the first fixed code and a modified version of the first rolling code (1F 1R+1A) (step 853), and determines based on at least a portion of the first rolling code or the first encrypted message a time window (W) in which to expect a response from the second device (step 855). The time window may be defined by values within the first rolling code or first encrypted message, or may be calculated therefrom based on an algorithm. A first device receiver is enabled during the time window to receive the response from the second device (step 856).

Meanwhile, the second device receives the first encrypted message while the second device is in the learn mode (step 854) and stores in the second device's memory the decrypted first fixed and first variable codes (1F 1R+1A) from the first encrypted message (step 857) or portions thereof. The second device determines a time window, based on the first encrypted message and/or first rolling code, in which to transmit a response (step 858). The time window determined by the second device may be the same as or within W determined by the first device at step 855, and may be determined in the same or a different manner. The second device then transmits a response comprising an encrypted version of the second fixed code (2F) and a second rolling code (2R) within the determined time window (step 859). Optionally a second rolling code that is independent from the first rolling code may be included in the second encrypted message. The second rolling code may, for instance, begin with a minimum value (such as 00). If the second encrypted message is received by the first device within the time period W calculated for response by the first device, the second message is decrypted (step 860) and the first device stores the second fixed code (and optional second variable code if sent) (step 861). If the response from the first device is not received within the time window, the message is ignored and the pairing process ceases, with the first and second devices returning to steps 851 and 852, respectively.

After receiving within the time window W the response from the second device and storing associated values, and either being set to learn mode by activation of a switch or receipt of a learning indicator from the second device, the first device then transmits a third encrypted message including at least the first fixed code (1F) and a changed version of the first changing code (1R+2A) (step 862). The first device also enables a receiver of the first device in anticipation of receiving further communications from the second device. In some embodiments, this step of enabling reception in the first device (step 863) may include an associated time window derived from the third message.

When the second device receives and decrypts the third encrypted message (step 864), it validates the message by comparing (step 865) the first fixed code and the changed versions of the first changing code (1F 1R+2A) to expected values from stored code values from the first encrypted message (1F 1R+1A) (step 866). If the second device determines that the codes from the third encrypted message (1F 1R+2A) are valid (step 866), the second device then transmits in response to validating the third encrypted message a fourth encrypted message including the second fixed code and a second changing code (2F 2R) (step 867).

The first device receives the fourth encrypted message (step 868) and validates the fourth message by comparing the fixed code of the fourth message to the previously-received fixed code (step 869). If the fixed codes are the same, indicating that both came from the second device, and the fourth message is determined to be valid (step 870), the first device stores the second fixed code and the second rolling code (2F 2R) (step 871). The first and second devices now have stored in their respective memories matching first fixed/rolling and second fixed/rolling code pairs (1F 1R+2A and 2F 2R) that may be used as initial values (1F 1R and 2F 2R) in an operation such as that shown in FIGS. 9A-9C.

Learn mode may operate on the same frequency as operation mode, and may operate on multiple frequencies. In some embodiments the first device and the second device communicate wirelessly in the operation mode and/or the learn mode via one or more frequencies, channels, bands, and radio physical layers or protocols including but not limited to, for example, 300 MHz-400 MHz, 900 MHz, 2.4 GHz, Wi-Fi/WiLAN, Bluetooth, Bluetooth Low Energy (BLE), 3GPP GSM, UMTS, LTE, LTE-A, 5G NR, proprietary radio, and others. In other embodiments, the first device and the second device communicate in the operation mode and/or the learn mode via a wired connection and various protocols including but not limited to two (or more) wire serial communication, Universal Serial Bus (USB), Inter-integrated Circuit (I²C) protocol, Ethernet, control area network (CAN) vehicle bus, proprietary protocol, and others. In some embodiments, the maximum distance between the first device and second device may vary between learn mode and operation mode, while in other modes the maximum range will be the same in both modes due to variation in range from interference.

While there has been illustrated and described particular embodiments of the present invention, those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A method of operation by a first device communicating with a second device to effect an action by the second device, the method comprising:
    transmitting from the first device a first encrypted message that includes at least a first fixed code and a first changing code;
    receiving by the first device a response from the second device, wherein the response comprises a second encrypted message including a second fixed code and a second changing code that is independent from the first changing code;

validating by the first device the response by comparing the second fixed code and the second changing code to second stored code values;

in response to validating the response, transmitting by the first device a third encrypted message including at least the first fixed code and a changed version of the second changing code, wherein the third encrypted message is configured to effect performance of an action by the second device.

2. An apparatus configured to communicate with a second device to effect an action by the second device, the apparatus comprising:

a controller circuit;

a transmitter in operative communication with the controller circuit;

a receiver in operative communication with the controller circuit;

a user input device in operative communication with the controller circuit;

wherein the controller circuit is configured to:

in response to detecting an input at the user input device, control the transmitter to transmit a first encrypted message that includes at least a first fixed code and a first changing code;

receive through the receiver a response from the second device, wherein the response comprises a second encrypted message including a second fixed code and a second changing code that is independent from the first changing code;

validate the response by comparing the second fixed code and the second changing code to second stored code values from a memory circuit;

in response to validating the response, control the transmitter to transmit a third encrypted message including at least the first fixed code and a changed version of the second changing code, wherein the third encrypted message is configured to effect performance of an action by the second device.

3. The method of claim 1, further comprising determining, by the first device before the receiving, a first time window in which to expect the response from the second device based on at least a portion of the first encrypted message.

4. The method of claim 3, further comprising enabling a receiver of the first device to receive a transmission from the second device within the first time window.

5. The method of claim 4, wherein enabling the receiver of the first device comprises turning on the receiver.

6. The method of claim 4, wherein enabling the receiver comprises commanding the receiver to process incoming transmissions.

7. The method of claim 3, further comprising determining if the response from the second device was received within the first time window.

8. The method of claim 1 wherein the first fixed code uniquely identifies the first device and the second fixed code uniquely identifies the second device.

9. The method of claim 1 wherein the second stored code values includes a previous fixed code and a previous changing code from a previous communication between the first and second devices.

10. The method of claim 9 wherein comparing the second fixed code and the second changing code to the second stored code values includes determining whether the second fixed code matches the previous fixed code and the second changing code corresponds to the previous changing code.

11. The method of claim 9 wherein validating includes retrieving the previous fixed code and the previous changing code from a memory of the first device.

12. The method of claim 1 wherein transmitting from the first device the first encrypted message includes wirelessly transmitting the first encrypted message using a radio frequency signal.

13. The method of claim 1 wherein the first device includes an in-vehicle transmitter and the second device includes a movable barrier operator.

14. The apparatus of claim 2 wherein the controller circuit is configured to determine a first time window in which to expect the response from the second device based on at least a portion of the first encrypted message.

15. The apparatus of claim 14 wherein the controller circuit is configured to enable the receiver to receive a transmission from the second device within the first time window.

16. The apparatus of claim 15 wherein the controller circuit is configured to enable the receiver by turning on the receiver.

17. The apparatus of claim 15 wherein the controller circuit is configured to enable the receiver by commanding the receiver to process incoming transmissions.

18. The apparatus of claim 14 wherein the controller circuit is configured to determine whether the response from the second device was received within the first time window.

19. The apparatus of claim 2 wherein the first fixed code uniquely identifies the first device and the second fixed code uniquely identifies the second device.

20. The apparatus of claim 2 wherein the second stored code values include a previous fixed code and a previous changing code from a previous communication with the second device.

21. The apparatus of claim 20 wherein the controller circuit is configured to compare the second fixed code and the second changing code to the second stored code values by determining whether the second fixed code matches the previous fixed code and the second changing code corresponds to the previous changing code.

22. The apparatus of claim 20 wherein the controller circuit is configured to retrieve the previous fixed code and the previous changing code from the memory circuit.

23. The apparatus of claim 2 wherein the transmitter is configured to wirelessly transmit the first encrypted message via a radio frequency signal.

24. A non-transitory computer readable medium having stored thereon instructions that when executed by a controller circuit of a first device cause the controller circuit to perform operations comprising:

transmitting from the first device a first encrypted message that includes at least a first fixed code and a first changing code;

receiving by the first device a response from the second device, wherein the response comprises a second encrypted message including a second fixed code and a second changing code that is independent from the first changing code;

validating by the first device the response by comparing the second fixed code and the second changing code to second stored code values;

in response to validating the response, transmitting by the first device a third encrypted message including at least the first fixed code and a changed version of the second changing code, wherein the third encrypted message is configured to effect performance of an action by the second device.

25. The non-transitory computer readable medium of claim 24, wherein the operations further include determining, by the first device before the receiving, a first time window in which to expect the response from the second device based on at least a portion of the first encrypted message.

26. The non-transitory computer readable medium of claim 25, wherein the operations further include enabling a receiver of the first device to receive a transmission from the second device within the first time window.

27. The non-transitory computer readable medium of claim 26, wherein enabling the receiver of the first device comprises turning on the receiver.

28. The non-transitory computer readable medium of claim 26, wherein enabling the receiver comprises commanding the receiver to process incoming transmissions.

29. The non-transitory computer readable medium of claim 25, wherein the operations further include determining if the response from the second device was received within the first time window.

30. The non-transitory computer readable medium of claim 24 wherein the first fixed code uniquely identifies the first device and the second fixed code uniquely identifies the second device.

31. The non-transitory computer readable medium of claim 24, wherein the second stored code values include a previous fixed code and a previous changing code from a previous communication between the first and second devices.

32. The non-transitory computer readable medium of claim 31, wherein comparing the second fixed code and the second changing code to the second stored code values includes determining whether the second fixed code matches the previous fixed code and the second changing code corresponds to the previous changing code.

33. The non-transitory computer readable medium of claim 31, wherein validating includes retrieving the previous fixed code and the previous changing code from a memory of the first device.

34. The non-transitory computer readable medium of claim 24, wherein transmitting from the first device the first encrypted message includes wirelessly transmitting the first encrypted message using a radio frequency signal.

35. The non-transitory computer readable medium of claim 24, wherein the first device includes an in-vehicle transmitter and the second device includes a movable barrier operator.

* * * * *